(12) United States Patent
Antonelli

(10) Patent No.: US 9,376,316 B2
(45) Date of Patent: Jun. 28, 2016

(54) METAL HYDRIDES AND THEIR USE IN HYDROGEN STORAGE APPLICATIONS

(71) Applicant: University of Glamorgan Commercial Services Ltd., Wales (GB)

(72) Inventor: David Antonelli, Wales (GB)

(73) Assignee: USW COMMERCIAL SERVICES LTD., Wales (GB)

( * ) Notice: Subject to any disclaimer, the term of this patent is extended or adjusted under 35 U.S.C. 154(b) by 111 days.

(21) Appl. No.: 13/715,007

(22) Filed: Dec. 14, 2012

(65) Prior Publication Data

US 2013/0181162 A1      Jul. 18, 2013

Related U.S. Application Data

(60) Provisional application No. 61/621,221, filed on Apr. 6, 2012, provisional application No. 61/570,977, filed on Dec. 15, 2011.

(51) Int. Cl.
*C01B 3/00* (2006.01)
*C01B 6/00* (2006.01)

(52) U.S. Cl.
CPC ............... *C01B 3/0078* (2013.01); *C01B 3/001* (2013.01); *C01B 3/0015* (2013.01); *C01B 6/00* (2013.01); *Y02E 60/327* (2013.01); *Y02E 60/328* (2013.01)

(58) Field of Classification Search
CPC .................................................... C01B 3/0078
USPC ........................................................ 252/184
See application file for complete search history.

(56) References Cited

U.S. PATENT DOCUMENTS

| | | | |
|---|---|---|---|
| 5,906,792 A | 5/1999 | Schulz et al. | |
| 2001/0051130 A1 | 12/2001 | Jensen et al. | |
| 2004/0105805 A1 | 6/2004 | Zidan | |
| 2004/0229090 A1* | 11/2004 | Davis et al. | 429/17 |
| 2005/0180916 A1* | 8/2005 | Autrey et al. | 423/658.2 |
| 2007/0025908 A1 | 2/2007 | Sandrock et al. | |
| 2008/0138675 A1* | 6/2008 | Jang et al. | 429/17 |
| 2009/0227808 A1 | 9/2009 | Kim et al. | |
| 2010/0022791 A1 | 1/2010 | Ihm et al. | |
| 2010/0036145 A1 | 2/2010 | Kim et al. | |
| 2010/0247424 A1* | 9/2010 | Mao et al. | 423/648.1 |
| 2011/0201834 A1 | 8/2011 | Kim et al. | |
| 2013/0181162 A1* | 7/2013 | Antonelli | 252/184 |

FOREIGN PATENT DOCUMENTS

| | | |
|---|---|---|
| EP | 0283359 A1 | 9/1988 |
| EP | 0374015 A2 | 6/1990 |
| EP | 2098530 A1 | 9/2009 |
| EP | 2154105 A1 | 2/2010 |
| GB | 1577830 A | 10/1980 |
| KR | 20100031446 A | 3/2010 |
| WO | WO-2007015597 A1 | 2/2007 |
| WO | WO-2008032985 A1 | 3/2008 |
| WO | WO-2008094007 A1 | 8/2008 |
| WO | WO-2010072002 A1 | 7/2010 |
| WO | WO 2010072002 A1 * | 7/2010 |

OTHER PUBLICATIONS

Hoang et al. Windsor University, 2009.*
Sakintuna et al., Metal Hydride Materials for Solid Hydrogen Storage: A Review. International Journal of Hydrogen Energy, 32, 1121-1140, 2007.
Skipper et al., The Kubas Interaction in M(II) (M = Ti, V, Cr) Hydrazine-Based Hydrogen Storage Materials: A DFT Study, Dalton Trans., 41(28), 8515-8523, 2012.
Hamaed et al., Hydride-Induced Amplification of Performance and Binding Enthalpies in Chromium Hydrazide Gels for Kubas-Type Hydrogen Storage, J. Am. Chem. Soc., 133, 15434-15443, 2011.
Hoang et al., Design and Synthesis of Vanadium Hydrazide Gels for Kubas-Type Hydrogen Adsorption: A New Class of Hydrogen Storage Materials, J. Am. Chem. Soc., 132(33), 11792-11798, 2010.
Schulzke, et al., The Unusual Stability of Homoleptic Di- and Tetravalent Chromium Alkyls, *Organometallics*, 3810-3816, 2002.
Matuso, et al., First-principles Studies of Complex Hydride $YMn_2H_6$ and Its Synthesis from Metal Hydride $YMn_2H_{4.5}$, Applied Physics Letters, American Institute of Physics, 98:22:221908, 2011.
Gamo, et al., Formation and Properties of Titanium—manganese Alloy Hydrides, International Journal of Hydrogen Energy, Elseview Science Publishers B.V.,10:1:39-47, 1985.
Ozin, et al., Synthesis of Ligand-free Transition-metal Dihydrides in Low-temperature Matrixes: Manganese Dihydride MnH2, Journal of the American Chemical Society, 106:3:807-809, 1984.
International Search Report issued in PCT/GB2014/051825 on Oct. 8, 2014.
Alberola, et al., Bis[(Trimethylsilyl]Manganese: Structural Variations of Its Solvent-Free and TMEDA-, Pyridine-, and Dioxane-Complexed Forms, Organometallics, 2009, 28, 2112-2118.
Andersen, et al., Bis(Neopentyl)-, Bis(trimethylsilylmethyl)- and Bis(2-methyl-2-phenyl-propyl)-magnesium, J.C.S. Dalton, 1977, 809-811.
Andersen, et al., Neopentyl, Neophyl, and Trimethylsilylmethyl Compounds of Manganese, Manganese(II) Dialkyls; Manganese (II) Dialkyl Amine Adducts; Tetra-alkylmanganate(II) Ions and Lithium Salts, Manganese IV) Tetra-alkyls, J.C.S. Dalton, 1976, 2204-2211.
Andersen, et al., The Molecular Structure of Monomeric Base-Free Bis(neopentyl)manganese by Gas Electron Diffraction, J. Chem. Soc., Chem. Commun., 1985, 1807-1808.
Andrews, Matrix Infrared Spectra and Density Functional Calculations of Transition Metal Hydrides and Dihydrogen Complexes, Chem. Soc. Rev., 2004, 33, 123-132.
Badding, et al., High-Pressure Chemistry of Hydrogren in Metals: in Situ Study of Iron Hydride, Science, 1991, 253, 421-424.
Balabanov, et al., Ab Initio Study of Structure and Spectra of $MnH_2$, $MnH_2^-$, and $MnH_3$, J. Phys. Chem. A, 2002, 106, 6839-6843.
Barker, et al., Silylmethyl and Related Complexes, Part 6. Preparation, Properties, and Crystal and Molecular Structure of Tris[bis(trimethylsilyl)methyl]-chromium(III); the Chemistry of Related Compounds of Titanium(III) Vanadium(III), Zirconium(IV), and Hafnium(IV), J.C.S. Dalton, 1978, 734-740.
Buijink, et al., Electron-Deficient Vanadium Alkyl Complexes: Synthesis and Molecular Structure of the Vanadium(III) Dinitrogen Complex $[(Me_3CCH_2)_3V]_2(\mu-N_2)$, Organometallics, 1993, 2004-2005.

(Continued)

*Primary Examiner* — Mark Eashoo
*Assistant Examiner* — M. Reza Asdjodi
(74) *Attorney, Agent, or Firm* — Blank Rome LLP

(57) ABSTRACT

This disclosure relates to novel metal hydrides, processes for their preparation, and their use in hydrogen storage applications.

25 Claims, 63 Drawing Sheets

(56) References Cited

OTHER PUBLICATIONS

Cahiez, et al., Organomangaense(II) Reagents XVII: Preparation of Organomanganese Bromide Compounds in Either: An Efficient and Economic Alternative to Organomanganese Iodide Compounds for Synthetic Applications, Tetrahedron Letters, 1989, 30:27, 3545-3546.

Cahiez, et al., Reactivity of Organomanganese(II) Reagents: II. A New, Convenient Preparation of Alkyl, Alkenyl, and Alkynyl Ketones via Organomangaese(II) Iodides, Synthesis Communications, 1977, 130-133.

Cahiez, et al., Salt Effects on the Reactivity and the Stability of Organomanganese Reagents, Tetrahedron Letters, 1998, 39, 849-852.

Cahiez et al., Chemistry of Organomanganese(II) Compounds, Chem. Rev., 2009, 109:3, 1435-1476.

Cantrell, Phase Composition and The Effect of Thermal Cycling for VHx, $V_{0.995}C_{0.005}H_x$, and $V_{0.975}Zr_{0.020}C_{0.005}H_x$, J. Alloys and Compounds, Feb. 1-14, 1999, available online at http://hdl.handle.net/2014/17065.

Chertihin, et al., Infrared Spectra of FeH, $FeH_2$, and $FeH_3$ in Solid Argon, J. Phys. Chem., 1995, 99, 12131-12134.

Chertihin, et al., Reactions of Laser Ablated Ti Atoms with Hydrogen During Condensation in Excess Argon, Infrared Spectra of the TiH, $TiH_2$, $TiH_3$, and $TiH_4$ Molecules, J. Am. Chem. Soc., 1994, 116, 8322-8327.

Coates, et al., Some t-Butylmagnesium and Related Complexes, Reactions Between Hydrides and Organomagnesium Compounds, J. Chem. Soc. (A), 1968, 514-518.

Dilts, et al., The Nature of Soluble Copper(I) Hydride, Journal of the American Chemical Society, 1968, 90:21, 5769-5772.

Dolgoplosk, et al., Preparation of π-Alkenyl and π-Organometallic Compounds of Transition Metals and Study of their Properties, Organic Chemistry, 1978, Plenum Publishing Corporation, 2315-2328.

Eckert, et al., IV.D.1 Hydrogen Storage Material with Binding Intermediate Between Physisorption and Chemisorption, FY 2007 Annual Progress Report, DOE Hydrogen-Program, 587-592.

El-Kurdi, Homoleptic Alkyl- and Aryl-Complexes of Transition Metals (Ti, Zr, Hf, Nb, and Cr) and Tetra-organyloxyvanadium-(V) and -(IV) Complexes, Inaugural-Dissertation, Dept. Biology, Chemistry and Pharmacy, Freie Universitat Berlin, Sep. 2010.

Fedotov, et al., Atomic Ordering in the hcp Cobalt Hydrides and Deuterides, Journal of Alloys and Compounds, 1999, 291, 1-7.

Fischer, et al., Reinvestigation of Arylmanganese Chemistry—Synthesis and Molecular Structures of $[(thf)_4Mg(\mu-Cl)_2Mn(Br)Mes]$, $[Mes(thf)Mn(\mu-Mes)]_2$, and $(MnPh_2)_\infty$ (Ph = $C_6H_5$; Mes = Mesityl, 2,4,6-$Me_3C_6H_2$), Journal of Organometallic Chemistry, 2009, 694, 1107-1111.

Friour, et al., Organomanganous Reagents: IX, Preparation of Various Halogenated, Alkoxylated, Aryloxylated, and Arylsulfenylated Ketones from Correspondingly Functionalized Carboxylic Acid Chlorides or Anyhdrides, Synthesis Communications, 1984, 37-40.

Gambarotta, et al., A Homoleptic Arylmanganese (II) Complex: Synthesis and Structure of a Thermally Stable Trinuclear Mesitylmanganese (II) Complex, J. Chem. Soc., Chem. Commun., 1983, 1128-1129.

King, Structure and Bonding in Homelpetic Transition Metal Hydride Anions, Coordination Chemistry Reviews 2000, 200-202, 813-829.

Klose, et al., Insertion Reactions of Isocyanides and Nitriles into Unsupported Iron-Aryl Bonds: The Synthesis of a Dimeric Iron(II) Homeleptic Iminoacyl Complex, Organometallics, 1993, 12, 2414-2416.

Korsgen, et al., The Identification of the $FeH_2$ Radical in the Gas Phase by Infrared Spectroscopy, J. Chem. Phys. 1996, 104:12, 4859-4861.

Korsgen, et al., The Infrared Spectrum of $FeH_2$, Studied in the Gas Phase by Laser Magnetic Resonance, Journal of Chemical Physics, 1999, 110:8, 3861-3869.

Love, et al., A Non-Metallocene Hydride of Titanium(III), J. Chem. Soc., 1999, 121, 6843-6849.

Meunier, et al., Synthesis and Characerization of Titanium Hydride Thin Films Obtained by Reactice Cathodic Sputtering, Materials Science and Engineering, 1993, B18, 303-307.

Miller, et al., Laser Photoelectron Spectroscopy of $MnH_2^-$, $FeH_2^-$, $CoH_2^-$, and $NiH_2^-$: Determination of the Electron Affinities for the Metal Dihydrides, J. Chem. Phys., 1996, 84:8, 4127-4131.

Mowat, et al., Elimination Stabilized Alkyls, Part I. Chromium, Molybdenum, Tungsten and Vanadium, J.C.S. Dalton, 1972, 533-542.

Noh, et al., Rhenium Oxohalides: Synthesis and Crystal Structures of $ReO3Cl(THF)2$, $ReOCl_4(THF)$, $Re_2O_3Cl6(THF)_2$, and $Re_2O_3Cl_6(H_2O)_2$, The Royal Society of Chemistry, Dalt. Trans., 2007, 674-679.

Ozin, et al., The Photoreverisble Oxidative-Addition, Reductive-Elimination Reactions Fe + $H_2$ ↔ $FeH_2$ in Low-Temperature Martrices, J. Phys. Chem. 1984, 88, 645-648.

Peddada, et al., Hydride Precipitation in Vapor Deposited Ti Thin Films, J. Mater. Res., 1993, 8:2, 291-296.

Rathman, et al., Amazing Base-Mesityllithium, MESLi, Fine, Specialty & Performance Chemicals, 2003, 6-8.

Rubinovitz, et al., The Photochemical Fe + $H_2$ Reaction in Ar and Kr Matrices by Irradiation in the Visible Region, J. Phys. Chem., 1986, 90, 1940-1944.

Stepien, Formation of Cobalt Hydrides in Low Temperature Field Evaporation, Optica Applicata, 2005, XXXV:3, 363-368.

Takashi, Reaction of Titanium Trichloride with Amines, Notes, 1967, 40, 4, 9-1000.

Van Zee, et al., High Spin Molecules: ESR and Optical Spectroscopy of MnH (7Σ) and $MnH_2$ ($^6A_1$) at 4° K, J. Chem. Phys. 1978, 69:5, 1869-1875.

Van Zee, et al., $MnF_2$ and $MnH_2$ Molecules (S=5/2): "Extra" Lines in Their ESR Spectra, Chemical Physics Letters, 1979, 64:2, 325-327.

Wang, et al., Matrix Infrared Spectra and Density Functional Theory Calculations of Manganese and Rhenium Hydrides, J. Phys. Chem. A, 2003, 107, 4081-4091.

Zucchini, et al., Synthesis and Properties of Some Titanium and Zirconium Benzyl Derivatives, Journal of Organometallic Chemistry, 1971, 26, 357-372.

* cited by examiner

METAL HYDRIDES AND THEIR USE IN HYDROGEN STORAGE APPLICATIONS

This application claims the benefit of U.S. Provisional Application Nos. 61/570,977, filed Dec. 15, 2011, and 61/621,221, filed Apr. 6, 2012, each of which is incorporated by reference in its entirety.

FIELD OF THE INVENTION

The present invention relates to novel metal hydrides, processes for their preparation, and their use in hydrogen storage applications.

BACKGROUND OF THE INVENTION

The enormous demands placed on the world's fossil fuel reserves have led to concerns regarding global warming, energy security and environmental pollution. Researchers continue to seek alternative fuel sources. Molecular hydrogen is ideal in this regard because it is lightweight, abundant, has more than three times the energy density by mass than currently used hydrocarbon fuels such as gasoline, and its only combustion product (water) is environmentally benign. Despite the advances made in fuel cell technology and hydrogen production, storage remains a great hurdle. See, e.g., R. H. Wiswall et al., Science, 186, 1158, 1974; S. Orimo et al., Chem. Rev., 107, 4111, 2007, and L. K. Heung, On-board Hydrogen Storage System Using Metal Hydride, HYPOTHESIS II, 1, 1997. Using current technology, hydrogen storage has a low energy storage density by volume relative to hydrocarbon fuels. Therefore, with all other factors being equal, in order to store the same amount of energy, hydrogen storage requires a much larger and heavier storage tank than hydrocarbon fuel storage.

Gravimetric capacity is a measure of the amount of hydrogen that can be stored per unit mass of the storage system. Volumetric capacity is a measure of the amount hydrogen that can be stored per unit volume of the storage system. The United States Department of Energy (DOE) has set targets for hydrogen storage. The 2017 target set by the DOE for hydrogen storage is 5.5 wt. % and 40 kg/m$^3$ volumetric adsorption for a fully reversible system operating near room temperature. The ultimate goals are 7.5 wt % and 70 kg/m$^3$.

To date no technology has satisfied all the requirements set out by the DOE. Some technologies being considered involve the use of chemical carriers such as alloys, adsorbents such as amorphous carbons (see, e.g., R. Yang et al., J. Am. Chem. Soc., 131, 4224, 2009), zeolites (see, e.g., A. Pacula, et al., J. Phys. Chem. C, 112, 2764, 2008) and metal organic frameworks (MOFs) (see, e.g., K. M. Thomas, Dalton Trans., 1487, 2009; S. S. Kaye et al., J. Am. Chem. Soc., 129, 14176, 2007, and N. L. Rosi et al., Science, 300, 1127, 2003).

The use of metal hydrides, such LiH and NaAlH$_4$ is thwarted by heat management issues and problems with slow kinetics and/or reversibility. For example, when hydrogen reacts with magnesium or a sodium-aluminum alloy to give a metal hydride such as MgH$_2$ and NaAlH$_4$, significant amounts of heat are given off. When this heat is produced, a cooling step must be carried out to prevent a significant rise in temperature in the system, and this cooling step constitutes an energy loss to the system. Furthermore, heating is typically necessary to remove the hydrogen when required. This is an artifact of the high enthalpies of hydrogen binding (>60 kJ/mol) typical of hydrides such as MgH$_2$ and NaAlH$_4$.

Compression techniques have been used to increase gas pressure and improve the energy storage density by volume for hydrogen. This allows for the storage tanks to be smaller. However, compressing hydrogen requires a significant amount of energy, often accounting for as much as 30% of the stored energy. Furthermore, large pressure vessels are required for such compression techniques.

Another technique for storing hydrogen involves converting hydrogen gas to liquid hydrogen. This technique requires cryogenic storage because hydrogen has a very low boiling point (−252.88° C.). The liquefaction of hydrogen requires a large amount of energy to maintain these extremely low temperatures. Furthermore, the storage tank for liquid hydrogen requires complex and expensive insulation in order to prevent the liquid hydrogen from evaporating. In addition, liquid hydrogen has a lower energy density by volume than hydrocarbon fuels, such as gasoline, by a factor of about 4.

Physisorption materials, such as amorphous carbons and metal organic frameworks (MOFs), achieve promising storage capacities at temperatures of 77 K, but typically lose approximately 90% of their performance at room temperature due to low heats of adsorption (typically 5-13 kJ/mol H$_2$). See, e.g., A. Dailly et al., J. Phys. Chem. B, 110, 1099, 2006, J. Rowsell et al., Angew. Chem., Int. Ed., 2005, 4670, 2005. In order to achieve the DOE target under ambient conditions, the ideal H$_2$ binding energy is predicted to be in the range of 20-30 kJ/mol per hydrogen molecule See, e.g., R. Lochan et al., Phys. Chem. Chem. Phys., 8, 1357, 2006.

Moreover, energy production costs for the preparation of hydrogen storage materials may be an important factor. There is, therefore, a need for improved, lower cost materials that can be used as hydrogen storage systems.

SUMMARY OF THE INVENTION

The present invention relates to novel metal hydrides and their use in hydrogen storage applications. The inventor has surprisingly found that transition metal hydride frameworks (e.g., VH$_4$, VH$_3$, TiH$_3$, MnH$_2$, and FeH$_2$) may be prepared that interact with hydrogen to form solid state hydrides (such as the hypervalent hydrides TiH$_5$, TiH$_7$ and VH$_7$) and can reversibly release hydrogen, thereby acting as materials for hydrogen storage. Without wishing to be bound to any particular theory, the inventor theorizes that the hydride ligands of the metal hydrides described herein (e.g., TiH$_3$) act as lightweight structural features, rather than as a high-enthalpy source of stored hydrogen as in all other hydrides used for hydrogen storage, thereby supporting a microporous network of metal (e.g., Ti) binding sites for further chemisorption of hydrogen. The metal hydrides described herein have a low molecular weight and are stable as bulk solids at room temperature (i.e., exhibit low pyrophoricity and reduced air sensitivity), which are important features for practical hydrogen storage. Furthermore, all components used in the synthesis of the metal hydrides described herein may be recycled.

The metal hydrides of the present invention are capable of absorbing molecular hydrogen (H$_2$) in an amount of at least 2.0% (e.g., from about 2.0% to about 8.0%, from about 8.0% to about 12.0%, or higher) based upon 100% total weight of the metal hydride without molecular hydrogen stored in it.

In one embodiment of the present invention relates to a metal hydride of the formula (I):

$$M^1(M^2)_z H_x R_y \qquad (I)$$

wherein

M$^1$ is a first metal selected from titanium, vanadium, chromium, manganese, iron, cobalt, nickel, copper, and, optionally, mixtures thereof;

M² is one or more additional metals, which have a total content of z (e.g., one or more doping metals, such as zirconium, niobium, molybdenum, technetium, ruthenium, rhodium, palladium, silver, cadmium, hafnium, tantalum, tungsten, rhenium, osmium, iridium, platinum, gold, and mercury);

R, if present, is an organic group;

x is about 0.5 to about 4.5 (e.g., about 0.5 to about 3.6 or about 0.5 to about 3.3);

y is 0 to about 0.5, and z is 0 to about 0.2 (e.g., 0 to about 0.1 or 0 to about 0.05);

wherein when M¹ is vanadium, x is at least about 2 or at least about 1.9, and when M¹ is copper, x is at least 1.0 or at least about 1.5.

In one embodiment, z is 0.

In another embodiment, the metal hydride of Formula (I) is not 1,4-bis(titanium (IV) hydride) phenoxide.

In another embodiment, the present invention relates to a metal hydride of formula (IA):

$$M^1H_xR_y \qquad (IA)$$

wherein

M¹ is selected from titanium, vanadium, chromium, manganese, iron, cobalt, nickel, copper and, optionally, mixtures thereof;

R, if present, is an organic group;

x is about 0.5 to about 3.6 (e.g., about 0.5 to about 3.3); and y is 0 to about 0.5, wherein when M¹ is vanadium, x is at least about 2 or at least about 1.9.

In one embodiment of the metal hydride of formula (IA), when M¹ is copper, x is at least 1.0 or at least about 1.5.

In another embodiment, the present invention relates to a metal hydride of formula (IB):

$$M^1H_xR_y \qquad (IB)$$

wherein

M¹ is selected from vanadium, chromium, manganese, cobalt, nickel, and, optionally, mixtures thereof;

R, if present, is an organic group;

x is about 0.5 to about 3.6 (e.g. about 0.5 to about 3.3); and y is 0 to about 0.5, wherein when M¹ is vanadium, x is at least about 2 or at least about 1.9.

In one embodiment of the metal hydride of formula (IB), when M¹ is copper, x is at least 1.0

In another embodiment, the present invention relates to a metal hydride of formula (II):

$$M^1H_xR_y \qquad (II)$$

wherein

M¹ is selected from titanium, vanadium, chromium, manganese, iron, cobalt, nickel, copper, and, optionally, mixtures thereof;

R, if present, is an organic group;

x is about 0.5 to about 3.6 (e.g. about 0.5 to about 3.3); and y is 0 to about 0.5, wherein (1) the metal hydride is capable of absorbing hydrogen (H₂) in an amount of at least 2.0% (e.g., from about 2.0% to about 8.0%, from about 8.0% to about 12.0%, or higher) (based upon 100% total weight of the metal hydride without hydrogen stored in it), and (2) when M¹ is vanadium, x is at least about 2 or at least about 1.9.

In one embodiment of the metal hydride of formula (II), when M¹ is copper, x is at least 1.0

Another embodiment of the present invention relates to a metal hydride of formula (III):

$$M^1H_xR_y \qquad (III)$$

wherein

M¹ is selected from titanium, vanadium, chromium, manganese, iron, cobalt, nickel, copper, and, optionally, mixtures thereof;

R, if present, is an organic group;

x is about 0.5 to about 3.6 (e.g. about 0.5 to about 3.3); and y is 0 to about 0.5, wherein the metal hydride has a surface area of about 2 m²/g or greater; and when M¹ is vanadium, x is at least about 2 (e.g., at least 1.9).

In one embodiment of the metal hydride of formula (III), when M¹ is copper, x is at least 1.0

In one embodiment, M¹ in a metal hydride of formula (I), (IA), (II) or (III) is not copper, titanium or iron. For example, in an embodiment of the invention, the metal hydride is a metal hydride of formula (IB).

In one embodiment of any metal hydride described herein, y is less than about 0.4, such as less than about 0.3, less than about 0.2, less than about 0.1 or less than about 0.05. In one embodiment, y is about 0 to about 0.4, such as about 0 to about 0.3, about 0 to about 0.25, about 0 to about 0.2, about 0 to about 0.1, or about 0 to about 0.05.

In one embodiment of any metal hydride described herein, R, if present, is selected from alkyl, silylated alkyl, alkenyl, arylalkyl and aryl.

In one embodiment of any metal hydride described herein, R, if present, is selected from (trimethylsilyl)methyl, bis(trimethylsilyl)methyl, mesityl (or a group of formula (V) below where R¹ is any organic group), allyl, 1,3-dimethyl allyl, 1,3-diethyl allyl (or another 1,3-disubstituted allyl where the substituents are organic groups), neopentyl, 2,2,2-dimethylphenylpropyl, benzyl, benzyl substituted on its aromatic ring with one or more groups (for example, methoxide or norborane) at its meta and para positions, aryl, aryl substituted on its aromatic ring with one or more groups (for example, methoxide or norborane) at its meta and para positions, and combinations thereof. In one embodiment, R is a silylated alkyl group, such as bis(trimethylsilyl)methyl.

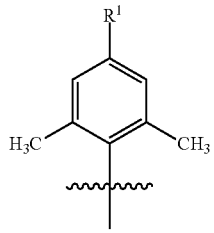

Formula (V)

In another embodiment R, if present, is selected from (trimethylsilyl)methyl, bis(trimethylsilyl)methyl, mesityl, allyl, 1,3-dimethyl allyl, benzyl, and combinations thereof. In one embodiment, R is a silylated alkyl group, such as bis(trimethylsilyl)methyl.

In additional embodiments of any of the hydrides described herein R, when present: (i) is bound to the metal center via a carbon atom in the R group; and/or (ii) does not contain an aromatic ring; and/or (iii) is such that it allows the metal hydride to be capable of absorbing hydrogen (H₂) in an amount of at least 2.0% (e.g., from about 2.0% to about 8.0%, from about 8.0% to about 12.0%, or higher) (based upon 100% total weight of the metal hydride without hydrogen stored in it).

In additional embodiments of any of the hydrides described herein R, when present, is not a polymeric group.

In another embodiment, the present invention relates to a metal hydride selected from $TiH_a$, $VH_b$, $CrH_c$, $CrH_d$, $MnH_e$, $FeH_f$, $CoH_g$, $NiH_h$ and $CuH_i$, wherein
each of a, b, and c is independently from about 2.4 to about 3.6;
each of d, e, f, g, and h is independently from about 1.6 to about 2.4;
i is about 0.8 to about 1.2,
the metal hydride has a surface area of about 2 $m^2/g$ or greater; and
the metal hydride optionally contains one or more organic groups.

In yet another embodiment, the present invention relates to a metal hydride selected from $TiH_a$, $VH_b$, $CrH_c$, $CrH_d$, $MnH_e$, $FeH_f$, $CoH_g$, $NiH_h$ and $CuH_i$, wherein
each of a, b, and c is independently from about 2.7 to about 3.3;
each of d, e, f, g, and h is independently from about 1.8 to about 2.2;
i is about 0.9 to about 1.1;
the metal hydride has a surface area of about 2 $m^2/g$ or greater; and
the metal hydride optionally contains one or more organic groups.

In one embodiment, any metal hydride described herein contains one or more organic groups up to a total content of 0.5 moles per mole of metal.

In yet another embodiment, the present invention relates to a metal hydride selected from $TiH_{(a-y)}R_y$, $VH_{(b-y)}R_y$, $CrH_{(c-y)}R_y$, $CrH_{(d-y)}R_y$, $MnH_{(e-y)}R_y$, $FeH_{(f-y)}R_y$, $CoH_{(g-y)}R_y$, $NiH_{(h-y)}R_y$, and $CuH_{(i-y)}R_y$, wherein
each of a, b, and c is independently from about 2.4 to about 3.6;
each of d, e, f, g, and h is independently from about 1.6 to about 2.4;
i is about 0.5 to about 1.2;
each occurrence of R, if present is, independently, an organic group (e.g., a monovalent organic group);
each occurrence of y is, independently, 0 to about 0.5 (e.g., 0 to about 0.25 or 0 to about 0.1); and
the metal hydride has a surface area of about 2 $m^2/g$ or greater.

In yet another embodiment, the present invention relates to a metal hydride selected from $TiH_{(a-y)}R_y$, $VH_{(b-y)}R_y$, $CrH_{(c-y)}R_y$, $CrH_{(d-y)}R_y$, $MnH_{(e-y)}R_y$, $FeH_{(f-y)}R_y$, $CoH_{(g-y)}R_y$, $NiH_{(h-y)}R_y$, and $CuH_{(i-y)}R_y$, wherein
each of a, b, and c is independently from about 2.7 to about 3.3;
each of d, e, f, g, and h is independently from about 1.7 to about 2.2;
i is about 0.7 to about 1.1;
each occurrence of R, if present, is independently, an organic group (e.g., a monovalent organic group);
each occurrence of y is, independently, 0 to about 0.5 (or 0 to about 0.1); and
the metal hydride has a surface area of about 2 $m^2/g$ or greater.

In another embodiment, the present invention relates to a metal hydride selected from $TiH_3$, $VH_3$, $CrH_3$, $CrH_2$, $MnH_2$, $FeH_2$, $CoH_2$, $NiH_2$ and $CuH$, wherein
the metal hydride has a surface area of about 2 $m^2/g$ or greater; and
the metal hydride optionally contains one or more organic groups.

In one embodiment, the metal hydride is a hydride of titanium. For example, in one embodiment, the metal hydride is $TiH_{(a-y)}(CH(Si(CH_3)_3)_2)_y$, wherein a is about 2.5 to about 3.3 (e.g., about 2.7 to about 3.3, such as about 3.0) and y is 0 to about 0.5 (e.g., 0 to about 0.1). In another embodiment, the metal hydride is $TiH_{2.78}(CH(Si(CH_3)_3)_2)_{0.22}$. In a further embodiment, the metal hydride is $TiH_{2.55}(CH(Si(CH_3)_3)_2)_{0.45}$.

In one embodiment, the metal hydride is a hydride of vanadium. For example, in one embodiment, the metal hydride is $VH_{(b-y)}(CH(Si(CH_3)_3)_2)_y$, wherein b is about 2.7 to about 3.3 (e.g., about 3.0) and y is 0 to about 0.5 (e.g., 0 to about 0.1).

In one embodiment, the metal hydride is a hydride of manganese. For example, in one embodiment, the metal hydride is $MnH_{(e-y)}(CH(Si(CH_3)_3)_2)_y$, wherein e is about 1.7 to about 2.2 (e.g., about 2.0) and y is 0 to about 0.5 (e.g., 0 to about 0.1). In another embodiment, the metal hydride is $MnH_{(e-y)}(Mesityl)_y$, wherein e is about 1.7 to about 2.2 (e.g., about 2.0) and y is 0 to about 0.5 (e.g., 0 to about 0.1). In a further embodiment, the metal hydride is $MnH_{(e-y)}(neopentyl)_y$, wherein e is about 1.7 to about 2.2 (e.g., about 2.0) and y is 0 to about 0.5 (e.g., 0 to about 0.1). In a yet further embodiment, the metal hydride is $MnH_{(e-y)}(CH_2Si(CH_3)_3)_y$ (i.e. the R group is a trimethylsilylmethyl group) wherein e is about 1.7 to about 2.2 (e.g., about 2.0) and y is 0 to about 0.5 (e.g., 0 to about 0.1)

In another embodiment, the present invention relates to a metal hydride of formula (IV):

$$VH_xR_y \quad (IV)$$

wherein
R, if present, is an organic group;
x is about 2.5 to about 3.3 (e.g., from about 2.8 to about 3.2, such as from about 2.9 to about 3.1); and
y is 0 to about 0.5 (e.g., about 0 to about 0.1).

In another embodiment, the present invention relates to a metal hydride of the formula $VH_x^aR_y$, wherein R, if present, is an organic group, $x^a$ is about 3.5 to about 4.5 (e.g., from about 3.75 to about 4.25, such as from about 3.8 to about 4.2, from about 3.9 to about 4.1, or about 4); and y is 0 to about 0.5 (such as from 0 to about 0.25, such as from 0 to about 0.1).

In another embodiment, the present invention relates to a metal hydride of the formula $VH_x^bR_y$, wherein R, if present, is an organic group, $x^b$ is about 2.5 to about 3.5 (e.g., from about 2.75 to about 3.25, such as from about 2.8 to about 3.2, from about 2.9 to about 3.1, or about 3); and y is 0 to about 0.5 (such as from 0 to about 0.25, such as from 0 to about 0.1).

In one embodiment, a metal hydride of vanadium has a surface area of less than about 1.00 $m^2/g$, such as less than about 0.75 $m^2/g$, such as about 0.5 $m^2/g$. In one embodiment, a metal hydride of vanadium has a surface area of greater than 0.35 $m^2/g$ (e.g., between about 0.4 and about 15 $m^2/g$, such as between about 0.4 and about 10 $m^2/g$).

In another embodiment, the present invention relates to a metal hydride of the formula $TiH_x^cR_y$, wherein R, if present, is an organic group, $x^c$ is about 2.5 to about 3.5 (e.g., from about 2.75 to about 3.25, such as from about 2.8 to about 3.2, from about 2.9 to about 3.1, or about 3); and y is 0 to about 0.5 (such as from 0 to about 0.25, such as from 0 to about 0.1).

In another embodiment, the present invention relates to a metal hydride of the formula $MnH_x^dR_y$, wherein R, if present, is an organic group, $x^d$ is about 1.5 to about 2.5 (e.g., from about 1.75 to about 2.25, such as from about 1.8 to about 2.2, from about 1.9 to about 2.1, or about 2); and y is 0 to about 0.5 (such as from 0 to about 0.25, such as from 0 to about 0.1).

In another embodiment, the present invention relates to a metal hydride of the formula $FeH_{x^e}R_y$, wherein R, if present, is an organic group, $x^e$ is about 1.5 to about 2.5 (e.g., from about 1.75 to about 2.25, such as from about 1.8 to about 2.2, from about 1.9 to about 2.1, or about 2); and y is 0 to about 0.5 (such as from 0 to about 0.25, such as from 0 to about 0.1).

In one embodiment, y in any of the formulas described herein is less than about 0.4, such as less than about 0.3, less than about 0.2, less than about 0.1 or less than about 0.05. In one embodiment, y is about 0 to about 0.4, such as about 0 to about 0.3, about 0 to about 0.25, about 0 to about 0.2, about 0 to about 0.1, or about 0 to about 0.05. In another embodiment, y is from about 0.01 to about 0.4. In yet another embodiment, y is from about 0.01 to about 0.3, about 0.25, about 0.2, about 0.1, or about 0.05.

In one embodiment, R in any of the formulas described herein, when present, is selected from (trimethylsilyl)methyl, bis(trimethylsilyl)methyl, mesityl, allyl, 1,3-dimethyl allyl, benzyl, neopentyl, and combinations thereof. In one embodiment, R is a silylated alkyl group, such as bis(trimethylsilyl)methyl.

In another embodiment, any of the metal hydrides described herein has a surface area of about 0.05 $m^2/g$ or greater, such as from about 0.05 to about 2 $m^2/g$, about 1 $m^2/g$, about 0.5 $m^2/g$, or about 0.2 $m^2/g$. In another embodiment, any of the metal hydrides described herein has a surface area of less than about 1.00 $m^2/g$, such as less than about 0.75 $m^2/g$, such as about 0.5 $m^2/g$.

In yet another embodiment, any of the metal hydrides described herein permits hydrogen ($H_2$) to diffuse between lammelai of the metal hydride.

In one embodiment, the metal hydride of the present invention is $MnH_{1.8-2.0}(bis(trimethylsilyl)methyl)_{0-0.2}$.

In one embodiment, the metal hydride of formula (IV) is $VH_{2.8-3.0}bis(trimethylsilyl)methyl)_{0-0.2}$. For example, in another embodiment, the metal hydride of formula (IV) is $VH_{2.9-3.0}(bis(trimethylsilyl)methyl)_{0-0.1}$. In another embodiment, the metal hydride of formula (IV) is $VH_3$.

In another embodiment, any of the metal hydrides described herein may contain a transition metal in more than one oxidation state (e.g., Ti(II)/Ti(III), V(II)/V(III) or Mn(II)/Mn(IV)).

For example, the metal hydride may be of the formula $(M^1(II)H_a/M^1(III)H_b)R_y$ (Formula A) (e.g., $(Ti(II)H_a/Ti(III)H_b)R_y$) wherein a is about 2 (e.g., about 1.8 to about 2.2), b is about 3 (e.g., about 2.8 to about 3.2), R is an organic group and y is 0 to about 0.5, and wherein the metal hydride (i) has a surface area of about 2 $m^2/g$ or greater and/or (ii) is capable of absorbing hydrogen ($H_2$) in an amount of at least 2.0% (e.g., from about 2.0% to about 8.0%, from about 8.0% to about 12.0%, or higher) (based upon 100% total weight of the metal hydride without hydrogen stored in it).

For further example, the metal hydride may be of the formula B $(M^1(II)H_a/M^1(IV)H_c)R_y$ (Formula B) (e.g., $(Mn(II)H_a/Mn(IV)H_c)R_y$) wherein a is about 2 (e.g., about 1.8 to about 2.2), c is about 4 (e.g., about 3.8 to about 4.2), R is an organic group and y is 0 to about 0.5, and wherein the metal hydride (i) has a surface area of about 2 $m^2/g$ or greater and/or (ii) is capable of absorbing hydrogen ($H_2$) in an amount of at least 2.0% (e.g., from about 2.0% to about 8.0%, from about 8.0% to about 12.0%, or higher) (based upon 100% total weight of the metal hydride without hydrogen stored in it).

For further example, the metal hydride may be of the formula $(M^1(III)H_b/M^1(IV)H_c)R_y$ (Formula C) wherein b is about 3 (e.g., about 2.8 to about 3.2), c is about 4 (e.g., about 3.8 to about 4.2), R is an organic group and y is 0 to about 0.5, and wherein the metal hydride (i) has a surface area of about 2 $m^2/g$ or greater and/or (ii) is capable of absorbing hydrogen ($H_2$) in an amount of at least 2.0% (e.g., from about 2.0% to about 8.0%, from about 8.0% to about 12.0%, or higher) (based upon 100% total weight of the metal hydride without hydrogen stored in it).

In certain embodiments $M^1$ in Formula A, B or C is selected from titanium, vanadium, chromium, manganese, iron, cobalt, nickel, copper (e.g., titanium and vanadium).

In one embodiment, any of the metal hydrides described herein are capable of absorbing molecular hydrogen ($H_2$) in an amount of at least 2.0% (e.g., from about 2.0% to about 8.0%, from about 8.0% to about 12.0%, or higher) (based upon 100% total weight of the metal hydride without hydrogen stored in it). In another embodiment, the metal hydride is capable of absorbing molecular hydrogen ($H_2$) in an amount of from about 2.0, 2.5, 3.0, or 3.5% to about 4.0, 4.5, 5.0, 5.5, 6.0, 6.5, or 7.0%. In another embodiment, the metal hydride is capable of absorbing molecular hydrogen ($H_2$) in an amount of from about 8.0, 8.5 or 9.0% to about 11.0, 11.5 or 12%.

In one embodiment of any of the metal hydrides described herein, the metal hydride is capable of coordinating with $H_2$. For example, in one embodiment of any of the metal hydrides described herein, the metal hydride is capable of coordinating with $H_2$ via a Kubas interaction.

The metal hydrides herein preferably have sufficient microporosity to permit $H_2$ to move in and out of the metal hydride framework to the active binding sites. The diffusion mechanism may be due to a sufficiently high surface area and/or permitted movement between lammelai. For example, in one embodiment, the metal hydride may have a BET surface area (measured by nitrogen adsorption) of up to 500 $m^2/g$ (e.g., from about 2 $m^2/g$ to about 500 $m^2/g$ or from about 10 $m^2/g$ to about 500 $m^2/g$) and include pores less than about 20 Å (e.g., from about 1 to about 20 Å). While, in general, a higher surface area permits greater $H_2$ storage capacity, it has been discovered that a $VH_3$ material with a relatively low surface area (~0.11 $m^2/g$, BET measurement) absorbs $H_2$ will little or no kinetic barrier, suggesting that diffusion of $H_2$ in this material is not dependent on its surface area. Without wishing to be bound by any particular theory, the $VH_3$ material may permit $H_2$ movement between lammelai, or by hopping from one V center to the next. Furthermore, it is theorized that a significant loss of performance due to sintering may not occur in the $VH_3$ material, since the diffusion of $H_2$ in the $VH_3$ material may not be dependent on its surface area. In contrast, in prior storage materials, sintering often results in a reduction in the surface area of the storage materials and hence their ability to permit $H_2$ to diffuse through them.

In one embodiment, the present invention relates to a metal hydride storage material comprising a metal hydride of any of the embodiments described herein, where the material has sufficient microporosity to permit: (i) $H_2$ to diffuse in and out of the material and the active binding sites of the metal hydride; (ii) the metal to coordinate with $H_2$ via a Kubas interaction; and (iii) absorption of $H_2$ in an amount of about 2.0% to about 12.0% (based upon 100% total weight of the metal hydride without hydrogen stored in it). The metal hydride storage material may be incorporated into the hydrogen storage system described herein.

In yet another embodiment, any of the metal hydrides described herein is crystalline, such as crystalline $VH_3$.

In one embodiment, the metal hydrides described herein are amorphous or substantially amorphous (e.g., contain less than about 20% crystallinity, such as less than about 10%, less than about 5%, less than about 2.5%, less than about 1% or less than about 0.5% crystallinity) as measured by X-ray diffraction using a Cu Kα radiation (40 kV, 40 mA) source. Metal hydrides having closed pack structures are desirable due to their higher volumetric densities, so long as they permit diffusion of $H_2$ to the metal binding sites within them. Where the closed pack structure of a metal hydride does not permit diffusion of $H_2$ to the metal binding sites, the metal hydride preferably does not have a closed pack structure. The metal hydride may be in the form of a gel or solid.

In one embodiment, any of the metal hydrides described herein is a solid (e.g., a bulk solid), for example, a stable bulk solid at room temperature.

Another embodiment of the present invention is a hydride of a period 4 transition metal (such as titanium, vanadium, chromium, manganese, iron, cobalt, nickel, copper, or mixture thereof) having a surface area of about 2 $m^2/g$ or greater and capable of coordinating with $H_2$ via a Kubas interaction. In one embodiment, the molar ratio of hydrogen to period 4 transition metal in the hydride is from about 0.5 to about 3.3. The hydride may contain a minor amount (e.g., up to 0.5 moles total) of one or more organic groups (e.g., bis(trimethylsilyl)methyl groups) per mole of period 4 transition metal.

In another embodiment, any of the metal hydrides described herein may contain a minor amount (e.g., up to 0.5 moles total) of an impurity selected from phosphines (e.g., trimethylphosphine), ethers, water or more preferably alcohols, amines, sulfides, nitrides, and combinations thereof. The phosphine (e.g., trimethylphosphine), ether, or more preferably alcohol, amine and sulfide residues may remain from their use in the synthesis of the metal hydride or may be formed as byproducts during the synthesis. In one embodiment, any of the metal hydrides of the present invention may contain less than about 5.0 wt %, less than about 4.0 wt %, less than about 3.0 wt %, less than about 2.0 wt %, less than about 1.0 wt %, less than about 0.75 wt %, less than about 0.5 wt %, less than about 0.4 wt %, less than about 0.3 wt %, less than about 0.25 wt %, less than about 0.2 wt %, less than about 0.1 wt %, less than about 0.05 wt % or less than about 0.01 wt % of a phosphine (e.g., trimethylphosphine), ether, water, or more preferably alcohol, amine, sulfide or nitride residue, or a combination thereof. In one embodiment, the metal hydride is free or substantially free of a phosphine (e.g., trimethylphosphine), ether, water or more preferably alcohol, amine, sulfide or nitride residue, or a combination thereof. In addition, in embodiments of the invention where impurities are found, the metal hydrides described herein may also contain minor amounts (e.g., up to 0.5 moles total) of metal hydroxides (M-OH) and metal ethers (M-O-M) from the hydrolysis of metal alkyl species with residual water contained within the reaction mixture.

In certain embodiments, any of the metal hydrides of the present invention contain less than about 5.0 wt % of lithium or magnesium, or a combination thereof. These lithium and magnesium residues may remain from their use in the synthesis of the metal hydride. For example, any of the metal hydrides of the present invention may contain less than about 4.0 wt %, less than about 3.0 wt %, less than about 2.0 wt %, less than about 1.0 wt % or less than about 0.75 wt % of lithium or magnesium or a combination thereof. In another embodiment, any of the metal hydrides of the present invention contain less than about 0.5 wt % of lithium or magnesium, or a combination thereof. For example, any of the metal hydrides of the present invention may contain less than about 0.4 wt %, less than about 0.3 wt %, less than about 0.25 wt %, less than about 0.2 wt %, less than about 0.1 wt %, less than about 0.05 wt % or less than about 0.01 wt % of lithium or magnesium or a combination thereof. In one embodiment, the metal hydride is free or substantially free of lithium or magnesium, or a combination thereof.

The metal hydrides of the present invention may contain halogen. For instance, the metal hydride may contain less than about 10.0 wt % of a halogen (such as $Br^-$, $Cl^-$, or $I^-$). These halogen residues may remain from their use in the synthesis of the metal hydride (for instance, from the use of a Grignard reagent). For example, any of the metal hydrides of the present invention may contain less than about 7.5 wt %, less than about 5 wt %, less than about 4.0 wt %, less than about 3.0 wt %, less than about 2.0 wt %, less than about 1.0 wt % or less than about 0.75 wt % of halogen. In another embodiment, any of the metal hydrides of the present invention contain less than about 0.5 wt % of halogen. For example, the metal hydride may contain less than about 0.4 wt %, less than about 0.3 wt %, less than about 0.25 wt %, less than about 0.2 wt %, less than about 0.1 wt %, less than about 0.05 wt % or less than about 0.01 wt % of halogen. In one embodiment, the metal hydride is free or substantially free of halogen.

In another embodiment, the present invention relates to a process for preparing a metal hydride according to any of the embodiments described herein (e.g., a metal hydride suitable for use in hydrogen storage), said process comprising (i) hydrogenating an alkyl transition metal compound (e.g., a monohaptoalkyl containing transition metal compound); (ii) applying a vacuum to the product of step (i); and optionally, (iii) hydrogenating the product obtained in step (ii); and (iv) applying a vacuum to the product of step (iii).

In one embodiment, the transition metal ($M^1$) is selected from titanium, vanadium, chromium, manganese, iron, cobalt, nickel, copper, and mixtures thereof. In one embodiment, the transition metal is titanium. The alkyl transition metal compound may have the formula $M^1R$, $M^1R_2$, $M^1R_3$, or $M^1R_4$, where each R group is an alkyl group (e.g., mesityl or (bis-trimethylsilyl)methyl). In one embodiment, the alkyl transition metal compound is a monohapto mesityl or monohapto (bis-trimethylsilyl)methyl compound (e.g., Ti(CH(SiMe$_3$)$_2$)$_3$ or V(CH(SiMe$_3$)$_2$)$_3$). In one embodiment, the alkyl transition metal compound is a mesityl compound (e.g., Mn(mesityl)$_2$). In additional embodiments, the transition metal complex (e.g., $M^1R$, $M^1R_2$, or $M^1R_3$) may contain a mixture of different alkyl groups (i.e., each R group may independently be a different alkyl group). For example, the transition metal complex may be Ti(CH$_2$SiMe$_3$)$_2$(CH(SiMe$_3$)$_2$) or Ti(CH$_2$SiMe$_3$)(CH(SiMe$_3$)$_2$)$_2$. In yet another embodiment, the alkyl transition metal compound may be complexed with nitrogen. For instance, the alkyl transition metal compound may be [(Me$_3$CCH$_2$)$_3$V]$_2$(μ-N$_2$).

In one embodiment, step (i) further comprises isolating the hydrogenated product (e.g., by filtration) prior to step (ii).

In one embodiment, the hydrogenation in step (i) is conducted at a hydrogen pressure of between about 1 bar and about 200 bar, such as between about 1 bar and about 150 bar, about 1 bar and about 125 bar or about 1 bar and about 100 bar. In additional embodiments, the hydrogenation in step (i) is conducted at a hydrogen pressure of about 1 bar, about 5 bar, about 10 bar, about 15 bar, about 20 bar, about 25 bar, about 30 bar, about 40 bar, about 50 bar, about 60 bar, about 70 bar, about 80 bar, about 90 bar, or about 100 bar.

In one embodiment, step (i) is conducted at a temperature of from about 15° C. to about 100° C., such as from about 20° C. to about 50° C., from about ambient temperature (e.g., from about 25° C.) to about 40° C., or from about 20° C. to about 30° C. In one embodiment, step (i) is conducted at ambient temperature.

In one embodiment, step (i) is conducted in the absence of solvent. In another embodiment, step (i) is conducted in an organic solvent (e.g., an aromatic or non-aromatic organic solvent). In one embodiment, step (i) is conducted in a solvent selected from toluene and tetrahydrofuran. In one embodiment, step (i) is conducted in a dialkylether solvent, such as diethyl ether. In one embodiment, step (i) is conducted in an aromatic solvent, such as toluene. In one embodiment, step (i) is conducted in an aliphatic solvent such as a hydrocarbon solvent e.g., pentane, hexane, heptane, octane, and combinations thereof. In one embodiment, step (i) is conducted in a solvent selected from toluene, diethyl ether, petroleum ether, and combinations thereof. Preferably, the solvent in step (i) is anhydrous.

In one embodiment, step (ii) is conducted at a temperature of from about 20° C. to about 250° C., such as from about 25° C. to about 200° C. or from about 25° C. to about 150° C. (e.g., ambient temperature or 25° C.). In one embodiment, step (ii) is conducted at about 25° C. In another embodiment, step (ii) is conducted at about 50° C. In a further embodiment, step (ii) is conducted at about 100° C. In yet another embodiment, step (ii) is conducted at about 150° C.

In one embodiment, step (ii) is performed for a period of time from about 1 to about 10 hours, such as from about 2 to about 10 hours, e.g., for about 8 hours.

In one embodiment, step (iii) is conducted at a temperature of from about 20° C. (e.g., ambient temperature or about 25° C.) and about 250° C., such as from about 50° C. to about 200° C., from about 100° C. to about 200° C. or from about 150° C. to about 200° C. In one embodiment, step (iii) is conducted at about 150° C. In another embodiment, step (iii) is conducted at about 180° C.

In one embodiment, step (iii) is performed for a period of time from about 1 to about 10 hours, such as from about 2 to about 10 hours or from about 2 to about 6 hours, e.g., for about 2 hours or for about 6 hours.

In one embodiment, the hydrogenation in step (iii) is conducted at a hydrogen pressure of between about 1 bar and about 200 bar, such as between about 1 bar and about 150 bar, about 1 bar and about 125 bar or about 1 bar and about 100 bar. In additional embodiments, the hydrogenation in step (i) is conducted at a hydrogen pressure of about 1 bar, about 5 bar, about 10 bar, about 15 bar, about 20 bar, about 25 bar, about 30 bar, about 40 bar, about 50 bar, about 60 bar, about 70 bar, about 80 bar, about 90 bar, or about 100 bar.

In one embodiment, step (iii) is conducted in the absence of solvent. In another embodiment, step (iii) is conducted in an organic solvent (e.g., an aromatic or non-aromatic organic solvent). In one embodiment, step (iii) is conducted in a solvent selected from toluene and tetrahydrofuran. In one embodiment, step (iii) is conducted in a dialkylether solvent, such as diethyl ether. In one embodiment, step (iii) is conducted in an aromatic solvent, such as toluene. In one embodiment, step (iii) is conducted in an aliphatic solvent such as a hydrocarbon solvent e.g., pentane, hexane, heptane, octane, and combinations thereof. In one embodiment, step (i) is conducted in a solvent selected from toluene, diethyl ether, petroleum ether, and combinations thereof. Preferably, the solvent in step (iii) is anhydrous.

In one embodiment step (iv) is conducted at a temperature of from about 20° C. (e.g., ambient temperature or about 25° C.) to about 250° C., such as from about 50° C. to about 200° C., from about 100° C. to about 200° C. or from about 150° C. to about 200° C. In one embodiment, step (iv) is conducted at about 150° C.

In one embodiment, step (iv) is performed for a period of time from about 1 to about 10 hours, such as from about 2 to about 10 hours or from about 2 to about 6 hours, e.g., for about 2 hours or about 6 hours.

In a preferred embodiment, step (iii) is conducted at about 150° C. for about 2 to about 6 hours at a hydrogen pressure of about 80 bar. In another preferred embodiment, step (iv) is conducted at about 150° C. under a vacuum (about $10^{-3}$ torr) of about for about 2 hours.

In a preferred embodiment, the process comprises steps (i)-(iv) (i.e., step (iii) and (iv) are not optional and form part of the process).

In another embodiment, the present invention relates to a method of storing hydrogen, the method comprising:
providing a metal hydride according to any of the embodiments described herein (e.g., a metal hydride of formula (I));
adding hydrogen to the metal hydride; and
allowing the hydrogen to coordinate to the metal hydride.

In another embodiment, the present invention relates to a method of storing hydrogen in a storage system, the method comprising:
providing a metal hydride according to any of the embodiments described herein (e.g., a metal hydride of formula (I)) in a system;
adding hydrogen to the metal hydride in the storage system; and
allowing the hydrogen to coordinate to the metal hydride in the storage system.

In one embodiment, the storage system is a hydrogen storage tank with the metal hydride in the storage tank. The storage tank may comprise one or more openings in a wall of the storage tank. Fluids, such as hydrogen gas, can pass into and out of the storage tank through the one or more openings. The system may further comprise one or more valves which control the passage of fluids through the one or more openings. The one or more valves can be used to release pressure inside the storage tank by opening said one or more valves and allowing fluids to pass out of the storage tank through the one or more openings. The system may also further comprise a compressor (e.g., a gas compressor) for adding hydrogen into the storage tank.

In additional embodiments, the method of storing hydrogen further comprises releasing the hydrogen from the metal hydride (e.g., a metal hydride in a storage system). In one embodiment, the hydrogen is released from the metal hydride by reducing the pressure of the hydrogen in the storage system.

Yet another embodiment of the present invention relates to a hydrogen storage system comprising a storage system and a metal hydride within the storage system, wherein the metal hydride is encompassed by any of the embodiments described herein (e.g., a metal hydride of formula (I)).

The metal hydrides of the present invention may be useful in other applications, such as, but not limited to, propellants, battery technologies, sorbents, olefin polymerization catalysts and sensors.

A propellant is a material that is used to move or propel an object, such as a jet or rocket. A propellant may comprise a fuel and an oxidizer. The fuel may be, for example, gasoline, jet fuel or rocket fuel. When the metal hydrides of the present invention are used in a propellant, the propellant further comprises hydrogen. The hydrogen may coordinate to a metal center present in the metal hydride of the present invention. In one embodiment, the hydrogen is in liquid form. In a preferred embodiment, the propellant further comprises an oxidizer, for example, liquid oxygen. In one embodiment, the propellant is used to propel a jet or a rocket.

A battery comprises one or more electrochemical cells, which convert stored chemical energy into electrical energy. The metal hydrides of the present invention may be used to coordinate to and store a compound in a battery. In a preferred embodiment, the compound that is stored is hydrogen. In one embodiment, the battery converts energy stored in the hydrogen into electrical energy. In one embodiment, the present invention relates to a battery comprising a vanadium hydride of the present invention (e.g., a vanadium hydride as described herein, such as, for example, a compound of formula $VH_x{}^aR_y$, wherein R is an organic group, $x^a$ is about 3.5 to about 4.5 (e.g., from about 3.75 to about 4.25, such as from about 3.8 to about 4.2, from about 3.9 to about 4.1, or about 4); and y is 0 to about 0.5 (such as from 0 to about 0.25, such as from 0 to about 0.1).

A sorbent is a material that is used to absorb a liquid or a gas. The metal hydrides of the present invention may be used as a sorbent to absorb a liquid or a gas. For example, the metal hydrides of the present invention may be used to absorb hydrogen. In one embodiment, the hydrogen is liquid form. In another embodiment, the hydrogen is in the form of a gas.

Another embodiment is a catalyst system for polymerization of olefins comprising a metal hydride of the present invention. The catalyst system may further comprise a support.

Yet another embodiment is a process comprising polymerizing or copolymerizing olefins (e.g., ethylene, propylene) carried out in the presence of a catalyst system of the present invention.

A sensor is used to detect a substance or to measure a physical quantity. The sensor gives a signal that the substance has been detected or gives a signal representing the measurement of the physical quantity. The signal can be read by an observer or by an instrument.

The metal hydrides of the present invention may be used in a sensor. For example, the metal hydrides of the present invention may be used to detect hydrogen, e.g., in a system. In one embodiment, the metal hydrides of the present invention measure the amount of hydrogen that is present in a system. In one embodiment, the hydrogen is in liquid form. In another embodiment, the hydrogen is in the form of a gas.

An aspect of the invention is a metal hydride according to independent claim 1. Embodiments of this aspect are described in dependent claims 2 to 17 and claims 19 to 25.

Another aspect of the invention is a metal hydride according to independent claim 18. Embodiments of this aspect are described in dependent claims 19 to 25.

Another aspect of the invention is a metal hydride storage material according to independent claim 26.

A further aspect of the invention is a process according to independent claim 27. Embodiments of this aspect are described in dependent claims 28 to 30.

A further aspect of the invention is a metal hydride according to independent claim 31.

Another further aspect of the invention is a method according to independent claim 32. Embodiments of this aspect are described in dependent claim 33.

A yet further aspect of the invention is a hydrogen storage system according to independent claim 34. Embodiments of this aspect are described in dependent claims 35 and 36.

DETAILED DESCRIPTION OF THE INVENTION

Definitions

Figure 1:
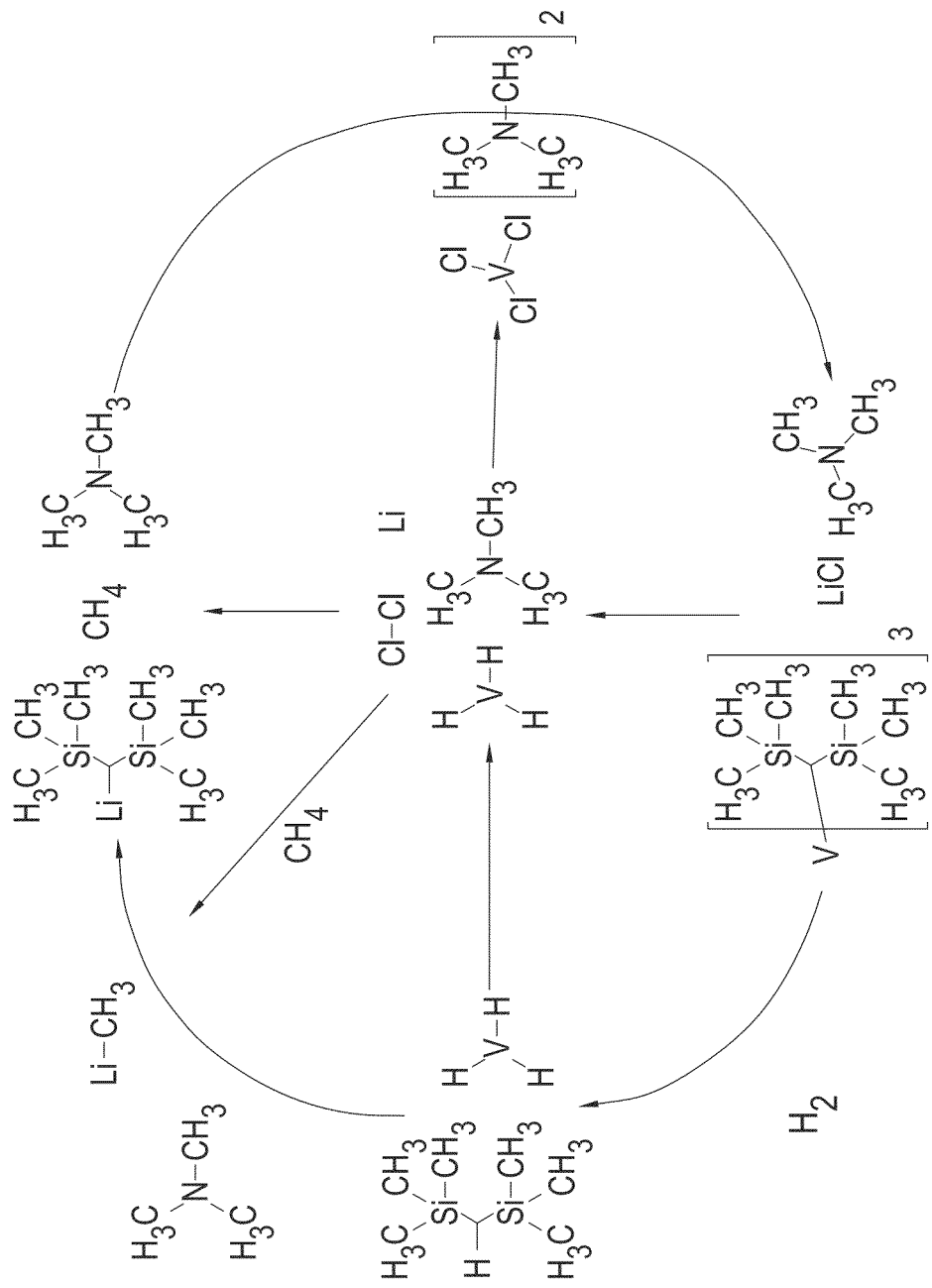
FIG. 1 depicts a proposed synthetic scheme for the renewable production of $VH_3$.

Unless defined otherwise, all technical and scientific terms used herein generally have the same meaning as commonly understood by one of ordinary skill in the art to which this invention belongs.

The term "comprising" is open ended and, in connection with a composition, refers to the elements recited. The term "comprising" as used in connection with the compositions described herein can alternatively cover compositions "consisting essentially of" or "consisting of" the recited components.

The term "coordinate" as used here is not limited to a specific type of interaction between a metal center and hydrogen. For example, in one embodiment, the interaction between a metal center and hydrogen is a Kubas interaction.

The term "Kubas interaction" refers to hydrogen bound in a non-dissociative manner as a dihydrogen molecule to a transition metal center. In a Kubas interaction, free d-electrons of a metal centre interact with hydrogen. Specifically, where the metal centre has a low coordination number, the dihydrogen shares both of its σ-bonding electrons with the metal centre, and the metal centre back donates electrons by overlap of its π symmetry d-orbital with the empty antibonding σ* empty orbital of the dihydrogen. This results in a lengthening of the H—H bond (without rupture) and a shift to a lower wavenumber for the H—H resonance (see, e.g. *J. Am. Chem. Soc.*, 119, 9179-9190, 1997).

The term "organic group" refers to any carbon containing group that may be present in the metal hydride following hydrogenation of the transition metal center. For example, the organic group may be a solvent used in the formation of the metal hydride that has not been fully removed during the synthesis process (e.g., THF or diethyl ether). Another example of an organic ligand may be a ligand (e.g., bis(trimethylsilyl)methyl, mesityl or neopentyl) that is not fully removed from the metal center during formation of the metal hydride. The organic ligand may also be a compound (e.g., a protic compound, such as methanol) that is added to the metal hydride in order to increase microporosity of the metal hydride structure (e.g., by forming bridging methoxide ligands within the structure), thereby facilitating $H_2$ moving in and out of the metal hydride.

As used herein, the term "alkyl" refers to a straight or branched chain saturated hydrocarbon moiety. In one embodiment, the alkyl group is a straight chain saturated hydrocarbon. Unless otherwise specified, the "alkyl" or "alkylene" group contains from 1 to 24 carbon atoms. Representative saturated straight chain alkyl groups include, e.g., methyl, ethyl, n-propyl, n-butyl, n-pentyl, and n-hexyl. Representative saturated branched alkyl groups include, e.g., isopropyl, sec-butyl, isobutyl, tert-butyl, neopentyl, and isopentyl.

The term "silylated alkyl" refers to an alkyl group as defined above, in which one or more carbon atoms have been replaced by silicon atoms. Representative examples include, e.g., (trimethylsilyl)methyl and bis(trimethylsilyl)methyl.

The term "alkenyl" refers to a straight or branched chain hydrocarbon moiety having one or more carbon-carbon double bonds. In one embodiment, the alkenyl group contains 1, 2, or 3 double bonds and is otherwise saturated. Unless otherwise specified, the "alkenyl" group contains from 2 to 24 carbon atoms. Alkenyl groups include both cis and trans isomers. Representative straight chain and branched alkenyl groups include, e.g., allyl, 1,3-dimethylallyl, 1,3-diethyl allyl, ethylenyl, propylenyl, 1-butenyl, 2-butenyl, iso-butylenyl, 1-pentenyl, 2-pentenyl, 3-methyl-1-butenyl, 2-methyl-2-butenyl, and 2,3-dimethyl-2-butenyl.

The term "aryl" refers to an aromatic monocyclic, bicyclic, or tricyclic hydrocarbon ring system. Unless otherwise specified, the "aryl" group contains from 6 to 14 carbon atoms. Examples of aryl moieties include, e.g., phenyl, naphthyl, anthracenyl, and pyrenyl.

The term "arylalkyl" refers to an aryl group bound to an alkyl group, where the alkyl group is bound to the metal center (e.g., benzyl).

Metal Hydrides

In an embodiment, any of the metal hydrides described herein has a surface area of less than about 1.00 m$^2$/g, such as less than about 0.75 m$^2$/g, such as about 0.5 m$^2$/g.

In another embodiment, the metal hydride described herein has a surface area of about 2 m$^2$/g or greater, such as about 5 m$^2$/g or greater, about 7.5 m$^2$/g or greater, about 10 m$^2$/g or greater, about 25 m$^2$/g or greater, about 50 m$^2$/g or greater, about 75 m$^2$/g or greater, about 100 m$^2$/g or greater, about 150 m$^2$/g or greater, about 200 m$^2$/g or greater, about 250 m$^2$/g or greater, about 275 m$^2$/g or greater, about 300 m$^2$/g or greater, about 350 m$^2$/g or greater, about 400 m$^2$/g or greater, about 450 m$^2$/g or greater or about 500 m$^2$/g or greater.

In one embodiment, the surface area is greater than about 16 m$^2$/g. In another embodiment, the surface area is greater than about 17.5 m$^2$/g. In yet another embodiment, the surface area is greater than about 38.5 m$^2$/g. In yet another embodiment, the surface area is greater than about 40 m$^2$/g. In yet another embodiment, the surface area is greater than 5.4 m$^2$/g. In yet another embodiment, the surface area is greater than 15.5 m$^2$/g. In yet another embodiment, the surface area is greater than 38.2 m$^2$/g.

In other embodiments, the surface area is from about 2 m$^2$/g to about 1000 m$^2$/g, such as from about 10 m$^2$/g to about 750 m$^2$/g, from about 50 m$^2$/g to about 500 m$^2$/g, from about 100 m$^2$/g to about 500 m$^2$/g, from about 250 m$^2$/g to about 500 m$^2$/g, from about 300 m$^2$/g to about 500 m$^2$/g, or from about 300 m$^2$/g to about 400 m$^2$/g.

In one embodiment, the metal hydride is of Formula (I) and x is about 0.5 to about 4.5. In another embodiment, x is about 0.5 to about 3.6. In another embodiment, x is about 0.5 to about 3.3. In another embodiment, x is about 0.9 to about 3.1. In another embodiment, x is about 0.9 to about 1.1. In another embodiment, x is about 1.8 to about 2.2. In another embodiment, x is about 2.7 to about 3.3. In one embodiment, x is about 1. In another embodiment, x is about 2. In a further embodiment, x is about 3.

In one embodiment, the metal hydride is of Formula (IA) and x is about 0.5 to about 3.6. In another embodiment, x is about 0.5 to about 3.3. In another embodiment, x is about 0.9 to about 3.1. In another embodiment, x is about 0.9 to about 1.1. In another embodiment, x is about 1.8 to about 2.2. In another embodiment, x is about 2.7 to about 3.3. In one embodiment, x is about 1. In another embodiment, x is about 2. In a further embodiment, x is about 3.

In one embodiment, the metal hydrides described herein are amorphous or substantially amorphous (e.g., with little (e.g., nanoscopic order) or no long range order in the position of the atoms in the hydride structure). In one embodiment, the metal hydrides described herein are in the form of a gel.

In one embodiment, the metal hydrides described herein are mesoporous (e.g., have a pore diameter between about 2 and about 50 nm). In another embodiment, the metal hydrides described herein are microporous (e.g., have a pore diameter less than about 2 nm, such as less than about 1 nm).

In additional embodiments, the metal hydride compounds described herein contain less than about 40 wt % of an organic group. For example, the metal hydride compounds described herein may contain less than about 35 wt %, less than about 30 wt %, less than about 25 wt %, less than about 20 wt %, less than about 15 wt %, less than about 10 wt %, less than about 5 wt %, less than about 2.5 wt %, less than about 1 wt %, less than about 0.5 wt %, or less than about 0.1 wt % of an organic group.

In further embodiments, the metal hydrides described herein exhibit a gravimetric hydrogen absorption between about 1 and about 10 wt. % (e.g., between about 1 and about 8 wt. % or between about 3 and about 8 wt. %) when measured at 298 K, based on the total weight of the metal hydride.

In one embodiment, the metal hydride is not 1,4-bis(titanium (IV) hydride) phenoxide (4-H$_3$TiOC$_6$H$_4$OTiH$_3$). In another embodiment, the metal hydride is not TiCr$_2$H$_2$O$_{2.02}$. In another embodiment, the metal hydride is not TiCrMnH$_{2.75}$ FIG. 1 depicts a proposed synthetic scheme for the renewable production of VH$_3$. The scheme described in FIG. 1 also applies to the renewable production of TiH$_3$. All reactions are essentially quantitative and no purification steps are required except for removal of LiCl (e.g., by filtration), removal of NMe$_3$ and diethyl ether (e.g., by evaporation), and isolation of the metal hydride (e.g., VH$_3$) from the reaction solvent (e.g., toluene), by, e.g., filtration. LiCl may be recycled to generate Li and Cl$_2$, which may be used with recycled TMS$_2$CH$_2$ to regenerate TMS$_2$CHLi by generation of MeLi (from methane+Cl$_2$+Li) and direct deprotonation of the silane in diethyl ether and NMe$_3$. To initiate the cycle, TMS$_2$CHCl may be made directly and cheaply on a large scale from TMSCl, BuLi, and CH$_2$Cl$_2$ in one pot and converted with Li to TMS$_2$CHLi. Spent metal hydride (such as VH$_3$) can be recovered and reconverted to VCl$_3$ cheaply using Cl$_2$ and H$_2$.

Figure 2:
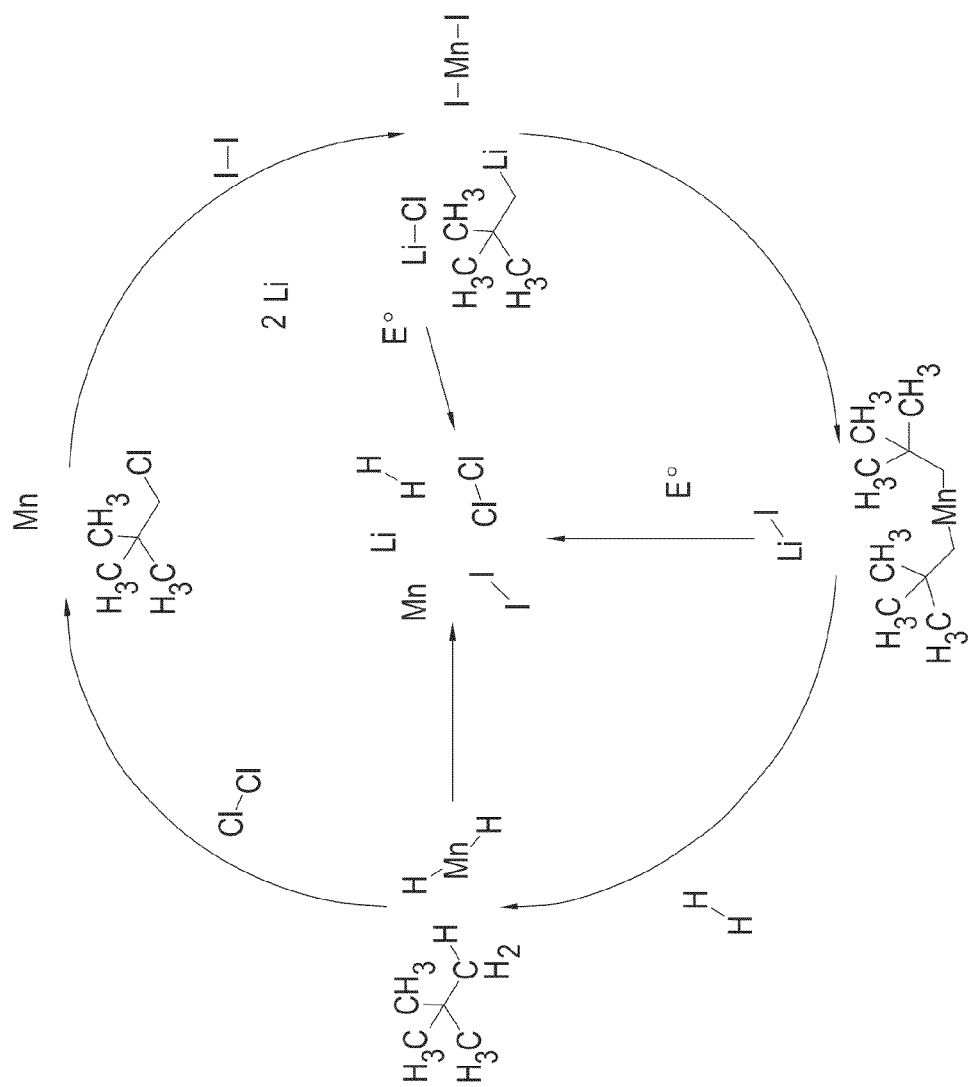
FIG. 2 depicts a proposed synthetic scheme for the renewable production of $MnH_2$.

FIG. 2 depicts a proposed synthetic scheme for the renewable production of MnH$_2$. All reactions are essentially quantitative and no purification steps are required except for removal of LiCl or LiI (by filtration), evaporation of diethyl ether, and filtration of the metal hydride (i.e., MnH) from the reaction solvent (e.g., toluene). LiX (X=Cl, I) may be recycled to generate Li and X$_2$ (X=Cl, I), which can be used with recycled t-BuCH$_3$ to quantitatively regenerate t-BuCH$_2$Cl, which affords t-BuCH$_2$Li, and MnI$_2$ from Mn and I$_2$.

In another embodiment, the present invention relates to a process for preparing a metal hydride according to any of the embodiments described herein (e.g., a metal hydride suitable for use in hydrogen storage). The process comprises (i) hydrogenating an alkyl transition metal compound (e.g., a monohaptoalkyl containing transition metal compound); (ii) applying a vacuum to the product of step (i); and optionally, (iii) hydrogenating the product obtained in step (ii); and (iv) applying a vacuum to the product of step (ii) or (iii). FIG. 1 shows a proposed synthetic cycle for the renewable production of $VH_3$. All reactions shown in FIG. 1 are essentially quantitative. The only purification steps required involve filtration (e.g., of lithium chloride) evaporation of reactants and/or solvent (e.g., triethylamine and/or diethyl ether) and isolation of the metal hydride (e.g., $VH_3$) from a reaction solvent (e.g., toluene) by filtration. Thus, no complicated purification steps are required.

The alkyl transition metal compounds may be prepared by methods known in the art. See, for example, Gambarotta et al., *J. Chem. Soc., Chem. Commun.* 1983, 1128-1129 (describing preparation of arylmanganese complex); Buijink, et al., *Organometallics* 1993, 12, 2004-2005 (describing preparation of the alkyl transition metal compound [$(Me_3 CCH_2)_3V]_2(\mu-N_2)$); and Dolgoplosk et al., *Izvestiya Akademiya Nauk SSSR, Seriya Khimicheskaya*, No. 11, p. 2498-2513 (November 1977).

In another embodiment, the present invention relates to a method of storing hydrogen comprising providing a metal hydride according to any of the embodiments described herein (e.g., a metal hydride of formula (I)), adding hydrogen to the metal hydride, and allowing the hydrogen to coordinate to the metal hydride. The storing of hydrogen may be carried out in a storage system.

One embodiment of a storage system suitable for hydrogen storage is a pressure vessel. For example, the pressure vessel may hold the metal hydride of the present invention at a temperature of up to 200° C., e.g., from about 0 to about 150° C., from about 0 to about 50° C., from about 10 to about 30° C. or from about 20 to about 25° C. In one embodiment, the storage system is substantially free of oxygen.

Hydrogen may be added to the storage system (e.g., a pressure vessel) and stored using the metal hydrides of the present invention. In one embodiment, no heating is required when adding hydrogen to the pressure vessel for storage.

The amount of hydrogen that can be stored by the metal hydrides of the present invention is proportional to the pressure in the storage system. For example, at higher pressures, more hydrogen can be stored by the metal hydrides of the present invention. The pressure in the storage system may be increased by adding hydrogen to the storage system. Without wishing to be bound by any particular theory, the inventor theorizes that as the pressure is increased, the number of Kubas interactions per metal centre may increase. For example, when the metal hydride is a vanadium hydride such as $VH_3$, one hydrogen molecule coordinated to the titanium (e.g., by a Kubas interaction) affords $VH_5$. Two hydrogen molecules coordinated to the titanium (e.g., by Kubas interactions) affords $VH_7$. For further example, when the metal hydride is a titanium hydride such as $TiH_3$, one hydrogen molecule coordinated to the titanium (e.g., by a Kubas interaction) affords $TiH_5$. Two hydrogen molecules coordinated to the titanium (e.g., by Kubas interactions) affords $TiH_7$.

In certain embodiments, the solid state hydride formed following interaction of a metal hydride of the present invention with hydrogen is hypervalent (e.g., $VH_7$ formed following interaction of hydrogen with $VH_3$, $CuH_5$ formed following interaction of hydrogen CuH and $NiH_6$ formed following interaction of hydrogen $NiH_2$).

In further embodiments, any of the metal hydrides described herein optionally contain one or more additional metals (e.g., a metal other than titanium, vanadium, chromium, manganese, iron, cobalt, nickel, and copper). For example, the metal hydride may contain one or more additional metals selected from aluminum, beryllium, boron, calcium, lithium, magnesium and combinations thereof. In an alternate embodiment, the metal hydride may contain one or more additional metals (e.g., a metal other than titanium, vanadium, chromium, manganese, iron, cobalt, nickel, and copper) wherein the one or more additional metals is a period 5 or period 6 transition metal that forms a hydride upon treatment with hydrogen. In one embodiment, any of the metal hydrides described herein may optionally contain one or more additional period 5 transition metals. For example, the metal hydride may contain one or more additional metals selected from zirconium, niobium, molybdenum, technetium, ruthenium, rhodium, palladium, silver, and combinations thereof. In another embodiment, the metal hydride may contain one or more additional metals selected from zirconium, niobium, molybdenum, technetium, ruthenium, rhodium, palladium, silver, cadmium, hafnium, tantalum, tungsten, rhenium, osmium, iridium, platinum, gold, mercury, and combinations thereof. The one or more additional metals may be present in an amount of about 20 wt % or less, such as about 10 wt % or less, about 5 wt % or less, about 1 wt % or less, such as about 0.75 wt % or less, about 0.5 wt % or less, about 0.25 wt % or less, about 0.1 wt % or less, about 0.05 wt % or less. In one embodiment, the metal hydrides described herein contain no additional metal.

The hydrogen pressure in the system may be increased using a compressor, such as a gas compressor, which pumps hydrogen into the system. Preferably, the hydrogen pressure in the system is increased to about 30 atm or more. For example, the hydrogen pressure in the system may be increased to from about 30 atm to about 500 atm, from about 50 atm to about 200 atm, or from about 75 atm to about 100 atm.

The system preferably has a temperature of (or operates at) up to 200° C., more preferably −200° C. to 150° C. (e.g., −100° C. to 150° C.), more preferably −200° C. to 100° C., more preferably 0° C. to 50° C., more preferably 10° C. to 30° C., and even more preferably 20° C. to 25° C. The system is preferably free of oxygen to prevent the oxidation of metal in the system. In one embodiment, the method of storing and releasing hydrogen in a system of the present invention is preferably carried out without adding heat to and/or cooling the system.

In a further embodiment, the hydrogen is released from the storage system. For example, this may be accomplished by reducing the pressure of hydrogen in the system. In one embodiment, no heating is required in order to release the hydrogen from the metal hydride. For example, a valve in the storage system may be opened to allow hydrogen gas to escape from the system, thus decreasing the pressure in the storage system. In one embodiment, about 100% of the stored hydrogen is released. In additional embodiments, greater than about 50%, greater than about 55%, greater than about 60%, greater than about 70%, greater than about 75%, greater than about 80%, greater than about 90%, greater than about 95%, greater than about 97.5%, greater than about 99% or greater than about 99.5% of the hydrogen is released. The step of releasing the hydrogen pressure in the system may be carried out by allowing hydrogen gas to escape from the system, thus decreasing the hydrogen pressure. For instance, the step of releasing the hydrogen pressure may decrease the hydrogen pressure in the system to 100 atm or less (such as to 50 atm or less, 30 atm or less, or 20 atm or less).

Hydrogen may be added or released from the system at any point throughout the entire pressure gradient of the system without any adverse effects to the storage capacity of the system. In certain embodiments, hydrogen may be added or released from the system any number of times without any adverse effect to the storage capacity of the system. For example, the system can be filled with hydrogen and emptied of hydrogen at least 100, such as at least 200, at least 500, at least 1000 or at least 1500 times without a significant decrease in the storage capacity of the system.

In one embodiment, the storage system (e.g. pressure vessel) is a fuel tank in a vehicle, such as a truck or automobile.

Figure 3:
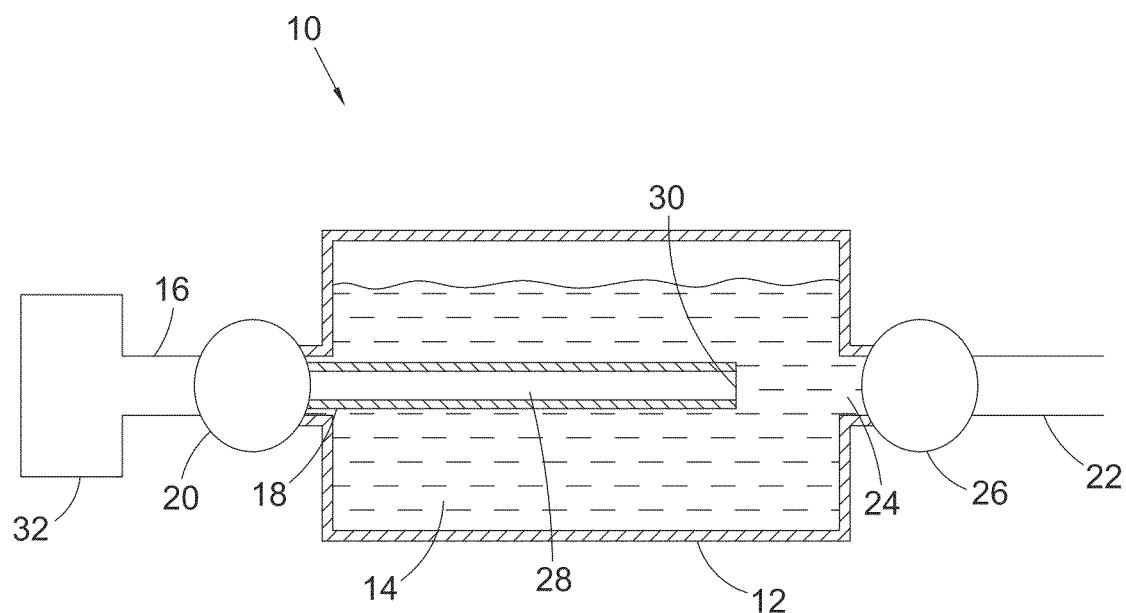
FIG. 3 depicts a cross-sectional view of one embodiment of a system for storing hydrogen.
Figure 4:
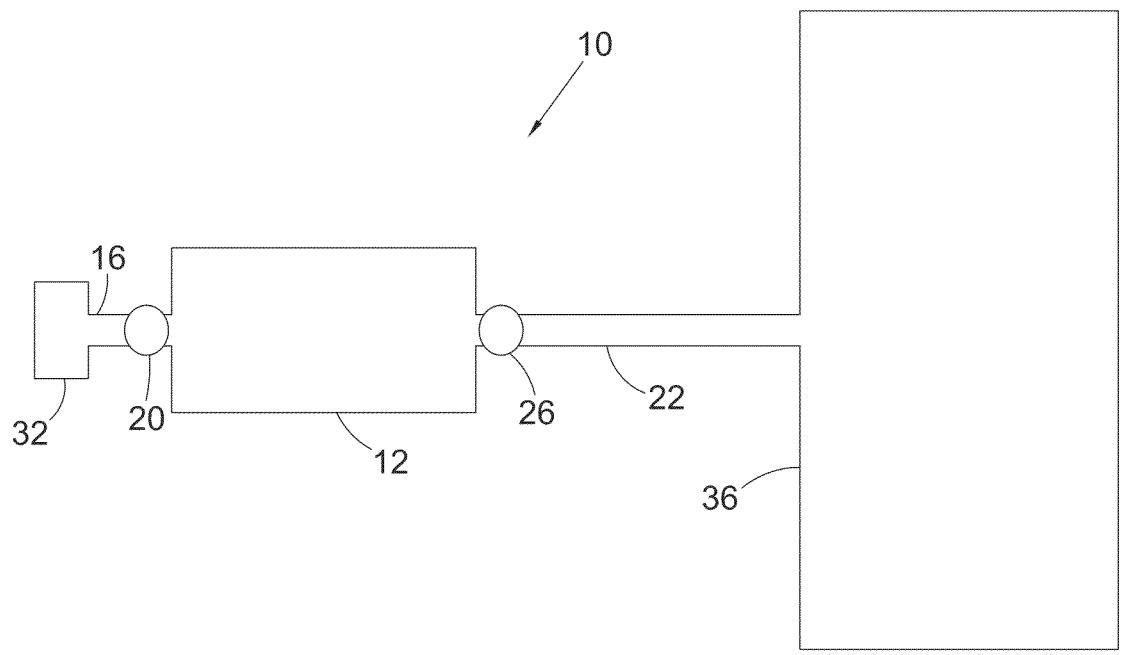
FIG. 4 depicts an embodiment of the storage system attached to a hydrogen fuel cell.

FIG. 3 depicts an embodiment of a storage system useful in the present invention. FIG. 4 depicts an embodiment of the storage system attached to a hydrogen fuel cell. The system 10 comprises a tank body 12 which is made of a material that is impermeable to hydrogen gas, thus preventing undesired leaking of the hydrogen gas out of the tank body 12. For example, the tank body 12 is made of metal, such as, e.g., steel or aluminum. Alternatively, the tank body 12 is made of a composite material, such as a composite of fibreglass and aramid. In another embodiment, the tank body 12 is made of a carbon fibre with a liner. The liner may be a polymer liner, such as a thermoplastic liner or a metal liner, such as a steel liner or an aluminum liner.

The metal hydride 14 of the present invention is present inside the tank body 12. In FIG. 3, the metal hydride 14 is in a gel form. The metal hydride 14 may partially fill or totally fill the tank body 12.

A first passage 16 leads to a first opening 18 in the wall of the tank body 12. A first valve 20 controls the flow of hydrogen gas through the first opening 18.

A second passage 22 extends from a second opening 24 in the wall of the tank body 12. A second valve 26 controls the flow of hydrogen gas through the second opening 24.

The first valve 20 and the second valve 26 can be any type of valve that controls the flow of hydrogen gas through the first opening 18 and the second opening 24, respectively. For example, the first valve 20 and the second valve 26 can be ball valves or gate valves.

In one embodiment, hydrogen is added to the system 10 as follows. A gas compressor 32 pumps hydrogen gas into the first passage 16. The first valve 20 is opened to allow the hydrogen gas to flow through the first opening 18 and into the tank body 12.

A passage tube 28 is in gaseous communication with the first opening 18 and extends into the interior of the tank body 12. The passage tube 28 facilitates the distribution of the hydrogen gas to the metal hydride 14. In one embodiment, the passage tube 28 is made of a material that is permeable to the hydrogen gas. This allows the hydrogen gas to pass through the wall of the passage tube 28 and into contact with the metal hydride 14. The passage tube is also preferably made of a material that is impermeable to the metal hydride 14, thus preventing the metal hydride 14 from entering into the interior of the passage tube 28. The passage tube 28 preferably opens into the interior of the tank body 12. The opening of the passage tube 28 is preferably covered with a filter 30 which prevents the metal hydride 14 from entering into the interior of the passage tube 28.

When the compressor 32 pumps hydrogen gas into the tank body 12, there is an increase of the hydrogen pressure inside the tank body 12. When the hydrogen pressure inside the tank body is increased, the metal hydride 14 is able to coordinate with a greater amount of hydrogen. Preferably, the increase in pressure causes an increase in the number of Kubas interactions per metal centre in the metal hydride 14. After the desired amount of hydrogen has been added to the system, the valve 20 is closed.

When desired, hydrogen may be released from the system 10 as follows. The second valve 26 is opened, which allows hydrogen gas to flow out of the tank body 12 through the second opening 24. When hydrogen gas flows out of the tank body through the second opening 24, there is a decrease in pressure inside the tank body 12. When the pressure is decreased inside the tank body 12, the metal hydride 14 releases hydrogen. For example, the decrease in pressure may cause a decrease in the number of Kubas interactions per metal centre of the metal hydride 14.

Hydrogen that is released by the metal hydride 14 can flow out of the tank body 12 through the second opening 24. As shown in FIG. 4, the hydrogen can flow through the second passage 22 to a fuel cell 36. The fuel cell 36 preferably uses hydrogen as a fuel and oxygen as an oxidant to produce electricity.

In an alternative embodiment, the storage system of the present invention comprises a storage tank with a single opening. In this embodiment, hydrogen flows both into and out of the storage tank through the single opening. A valve is used to control the flow of hydrogen through the opening. Since the enthalpies of $H_2$ binding are moderate to thermodynamically neutral and binding may be controlled by pressure, the tank may not need an exotic heat management system for most applications, unlike many prior hydrogen storage systems.

In one embodiment, the system is portable. As such, the system can be transported to a filling station to be filled with hydrogen. After being filled with hydrogen, the system can then be transported to a site where the hydrogen energy is to be used. Applications for this system include, but are not limited to, vehicles, airplanes, homes, buildings, and barbecues.

EXAMPLES

The present invention will now be further described by way of the following non-limiting examples. In applying the disclosure of these examples, it should be kept clearly in mind that the examples are merely illustrative of the present invention and should not be construed as limiting the scope of the invention in any way as many variations and equivalents that are encompassed by the present invention will become apparent to those skilled in the art upon reading the present disclosure.

All chemicals were purchased from Sigma-Aldrich and used as is. Grade 6.0 hydrogen was obtained from Praxair, Canada or Air Liquide, UK. $VCl_3(N(C_2H_5)_3)_{0.78}$ and $TiCl_3(N(C_2H_5)_3)_{0.67}$ may be prepared according to the procedure described in Takashi et al., *Bull. Chem. Soc. Japan*, 40, 999, 1967. $LiCH(SiMe_3)_2$ was prepared by reaction of $(Me_3Si)_2CHCl$ with lithium in diethyl ether at 40° C. (see, e.g., Davidson et al., *J. Chem. Soc. Dalton Trans.*, 2268, 1976; Hudson et al., *J. Chem. Soc. Dalton Trans.*, 2369-2375, 1976; and Collier et al., *J. Organomet. Chem.*, 25(1), C36-C38, 1970).

$V(CH(SiMe_3)_2)_3$ and $Ti(CH(SiMe_3)_2)_3$ may be prepared as dark oils by reaction of $VCl_3(N(C_2H_5)_3)_{0.78}$ and $TiCl_3(N(C_2H_5)_3)_{0.67}$ with $LiCH(SiMe_3)_2$, respectively, using the procedure described in, e.g., Baker et al., *J. Chem. Soc. Dalton*, 734, 1978 (the procedure was modified to replace trimethylamine with triethylamine).

Nitrogen adsorption and desorption data were collected on a Micromeritics ASAP 2010™.

Elemental analysis (EA) was conducted using a Perkin-Elmer Series II CHNO/S 2400 Analyzer, calibrated with an acetanilide standard. Samples for EA were loaded in a glove box, using tin capsules.

Infrared spectroscopy was conducted on a Brucker Vector 22 instrument using Nujol or a Perkin Elmer Spectrum RX1 using KBr discs.

Thermo-gravimetric analysis was conducted on a Mettler Toledo TGA SDTA 851e, using helium (99.99%) as a purging gas at a rate of 30 mL/min Samples were held at 25° C. for 30 minutes before heating to 550° C. at a rate of 5° C./min.

X-Ray diffraction (XRD) analysis was performed using three different arrangements. In the first, a small amount of powder was placed in small capillaries (1 mm or 0.2 mm in diameter) and the X-ray diffraction spectrum was taken using a Bruker Discover diffractometer with a Vantec 500 2D detector using Co $K_\alpha$ radiation. The X-ray beam was limited using a 0.2 mm collimator. In the second, larger amounts of powder were placed inside a glove box on a thin glass plate using 2 sided tape. This glass plate was then positioned in an O-ring sealed X-ray transparent holder. The X-ray spectrum was taken using a Bruker DaVinci diffractometer with Cu $K_\alpha$ radiation. Due to limitations with the seal in this second setup, the counting time was limited to 40 minutes. In the third, the measurement was performed on a Siemens D-500 diffractometer using a CuK$\alpha$ radiation (40 kv, 40 mA) source. The step size was 0.02° and the counting time was 0.3 seconds for each step. Diffraction patterns were recorded in the range of 1.5-52° 2θ. Samples for XRD analysis were placed in a sealed glass capillary tube to protect them from air and moisture during the analysis.

X-Ray photoelectron spectroscopy (XPS) was performed on a PHI-5500 spectrometer using monochromated Al $K_\alpha$ radiation. The positions of the peaks were referenced to surface C—C or C—H bound at 284.8 eV. The powder was placed on the XPS holder inside an argon filled glove box and transferred under argon into the XPS intro chamber. For insulating materials, an electron flooding gun was used to compensate for the surface charges. The different chemical contributions for each spectrum were obtained using CasaXPS.

Hydrogen adsorption isotherms were obtained using a computer controlled commercial Gas Reaction Controller™ manufactured by Advanced Materials Corporation, Pittsburgh, Pa. The isotherm recorded at 298 K and 140 bar, was obtained on a Hy-Energy PCT Pro machine. High purity hydrogen (99.9995% purity) was used as the adsorbent. Skeletal densities were collected using a Quantachrome Ultrapycnometer housed in an argon filled glove box. A pre-weighed portion of sample is loaded into the cell under inert conditions and the volume of the system (sample+cell) is then determined. The skeletal volume of the sample is the difference between the volume of (sample+cell) and the volume of empty cell. Skeletal density is calculated by using the sample mass divided by the sample volume. In the $H_2$ adsorption-desorption experiments a high level of reversibility was observed for all samples across the whole range of pressures. Samples were run at liquid nitrogen temperature (77 K), liquid argon temperature (87 K), and room temperature (298 K) to 85 bar on the Advanced Materials instrument and up to 141 bar on the PCT Pro machine. Isotherms were measured first at room temperature and then at 77 K or 87 K and the temperature was kept constant by keeping the sample chamber in liquid $N_2$, liquid Ar, or water. In the Advanced Materials instrument the sample weight and skeletal density were used to determine the volume of the sample in the sample chamber, which is then subtracted from the sample chamber volume to provide an accurate void space volume. When the skeletal density was used for the gravimetric hydrogen uptake measurement, the compressed hydrogen within the pores was treated as part of the sample chamber volume and subtracted. Therefore, only the hydrogen contained in or beneath the walls of the structure was be recorded by the PCI instrument. This gravimetric value is termed the adsorption or excess storage. When the bulk density was used the hydrogen in the pores of the sample was automatically included in the calculation without any further correction factors and the final value termed the total storage or absolute storage, which represents all hydrogen contained in the sample, including the compressed gas in the voids and the hydrogen adsorbed on or beneath the walls of the structure. Gravimetric densities were recorded as read from the isotherms while volumetric densities were calculated from the adsorption data and the skeletal or bulk density, depending on the desired value. The excess volumetric storage is typically calculated from the excess storage and the bulk density and gives a measure of the gas adsorbed on or in the solid phase of the material scaled across the entire volume occupied by the sample including the void space.

True volumetric adsorption is defined as the amount of hydrogen adsorbed on or in a given volume of the solid portion of the sample. This may be calculated from the excess storage data and the skeletal density, thereby allowing a comparison between volumetric adsorption values of the solid phase alone from one sample to another without having to correct for the different textural void space in each material.

Enthalpies of adsorption were calculated using a variant of the Clapeyron-Clausius equation (I) using both 77 K and 87 K hydrogen excess storage data.

$$\ln\left(\frac{P_1}{P_2}\right) = \Delta H_{ads} \cdot \frac{T_2 - T_1}{R \cdot T_2 \cdot T_1} \qquad (I)$$

in which Pn is the pressure for the isotherm n, and Tn is the temperature for the isotherm n. R is the gas constant.

Pressure as a function of the amount adsorbed is determined using an exponential fit for each isotherm; the first 10-11 points of the isotherms were picked up and fit to the exponential equation. This exponential equation provides an accurate fit over the pressure up to 1 MPa with the goodness of fit ($R^2$) above 0.99. The corresponding $P_1$ and $P_2$ values at a certain amount of $H_2$ adsorbed at both temperatures can be obtained by the simulated exponential equation. Inputting these numbers into equation (I), adsorption enthalpies can be calculated.

Example 1

Vanadium Hydride Samples

Example 1a $VH_3$

Synthesis

Bis(trimethylsilyl)methyl lithium (0.9260 g, 5.57 mmol) in 50 mL of diethyl ether was added dropwise to a dark purple suspension of $VCl_3(NEt_3)_{0.78}$ (0.4384 g, 1.856 mmol) at 298 K. The reaction mixture turned dark green. The reaction was stirred for three hours then all the volatiles were removed in vacuo ($10^{-3}$ torr). The green/brown oil was extracted with 50 mL of 40-60° C. petroleum ether and filtered to afford a light precipitate and brown solution. The solution was concentrated and dried in vacuo ($10^{-3}$ torr) overnight to afford V(CH(SiMe$_3$)$_2$)$_3$ as a brown oil.

50 ml of toluene was added to 0.4164 g (1.85 mmol) of V(CH(SiMe$_3$)$_2$)$_3$ and the mixture was stirred to afford a dark green/brown solution. Hydrogen gas grade 6.0 was bubbled through the solution at room temperature. The color changed to black over 24 hours, during which time black particles may precipitate. The toluene was removed and the resulting black solid was dried in vacuo ($10^{-3}$ torr) at room temperature for 4 hours to afford sample Va-100.

Further Hydrogenation of Sample Va-100

A sample of Va-100 was added to a computer controlled commercial Gas Reaction Controller™ manufactured by Advanced Materials Corporation, Pittsburgh, Pa. The sample was placed under hydrogen at a pressure of 85 bar, during which the temperature was maintained at 100° C. for 2 hours followed by a 2 hour evacuation ($10^{-3}$ torr) at 100° C. to afford Va-100-$H_2$-2 hrs. The weight of sample Va-100-$H_2$-2 hrs decreased by approximately 35% during the process.

Sample Va-150-$H_2$-2 hrs was obtained using a similar process at a hydrogen pressure of 85 bar, during which the temperature was maintained at 150° C. for 2 hours followed by a 2 hour evacuation ($10^{-3}$ torr) at 100° C. The weight of sample Va-150-$H_2$-2 hrs decreased by approximately 22% during the process.

Sample Characterization

Figure 5:
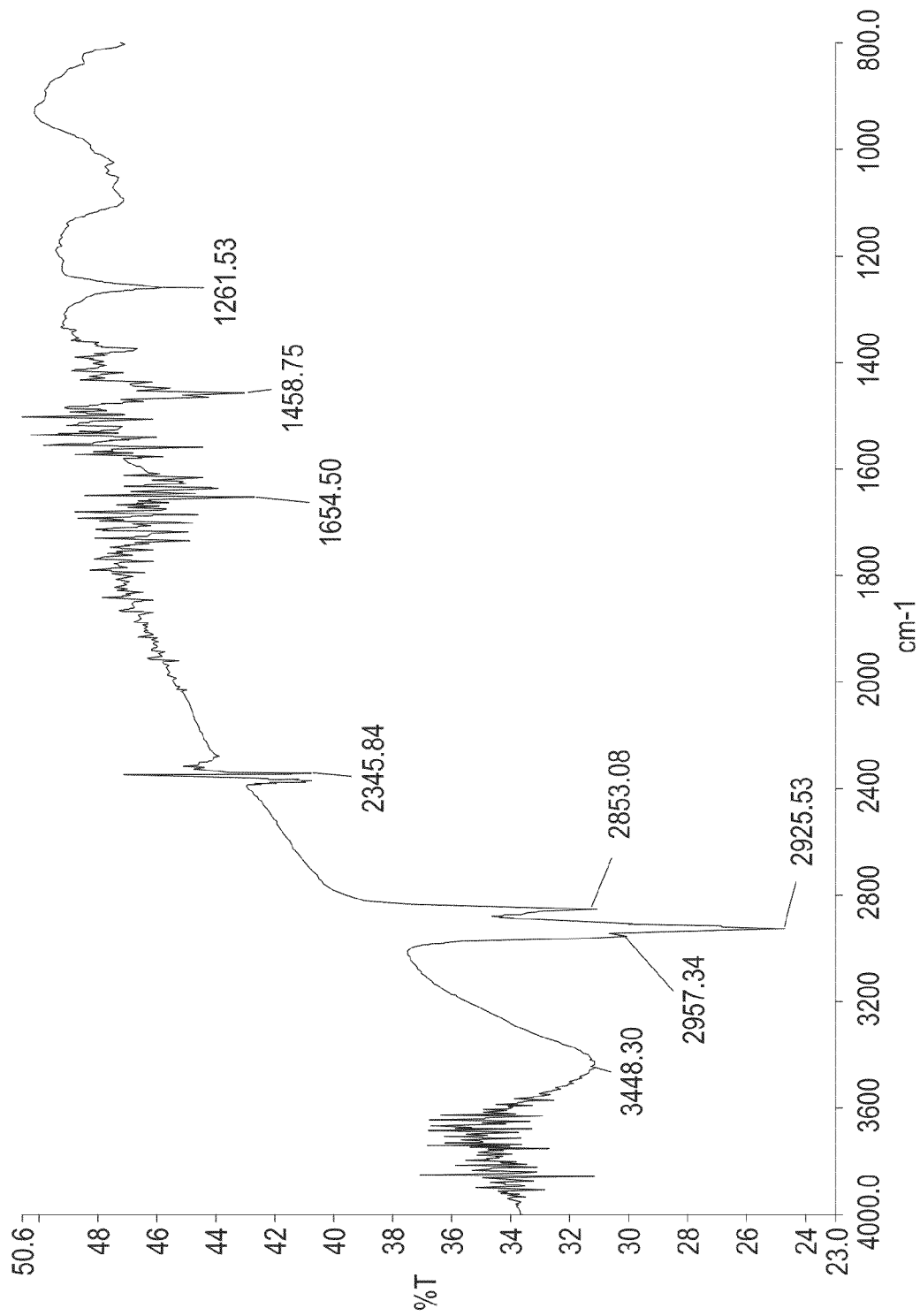
FIG. 5 depicts an IR spectrum of vanadium hydride sample Va-100.
Figure 6:
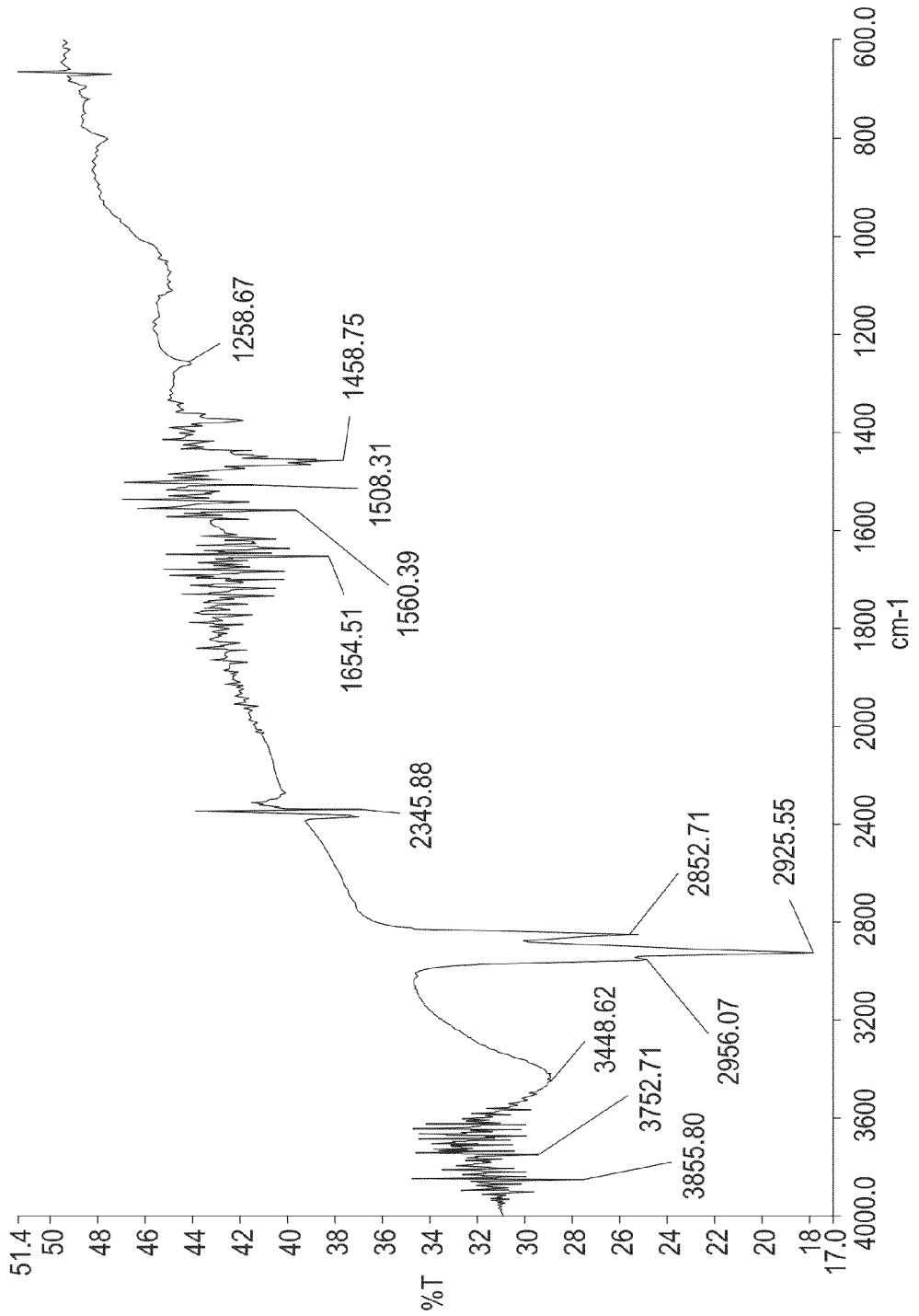
FIG. 6 depicts an IR spectrum of vanadium hydride sample Va-100-$H_2$-2 hrs.
Figure 7:
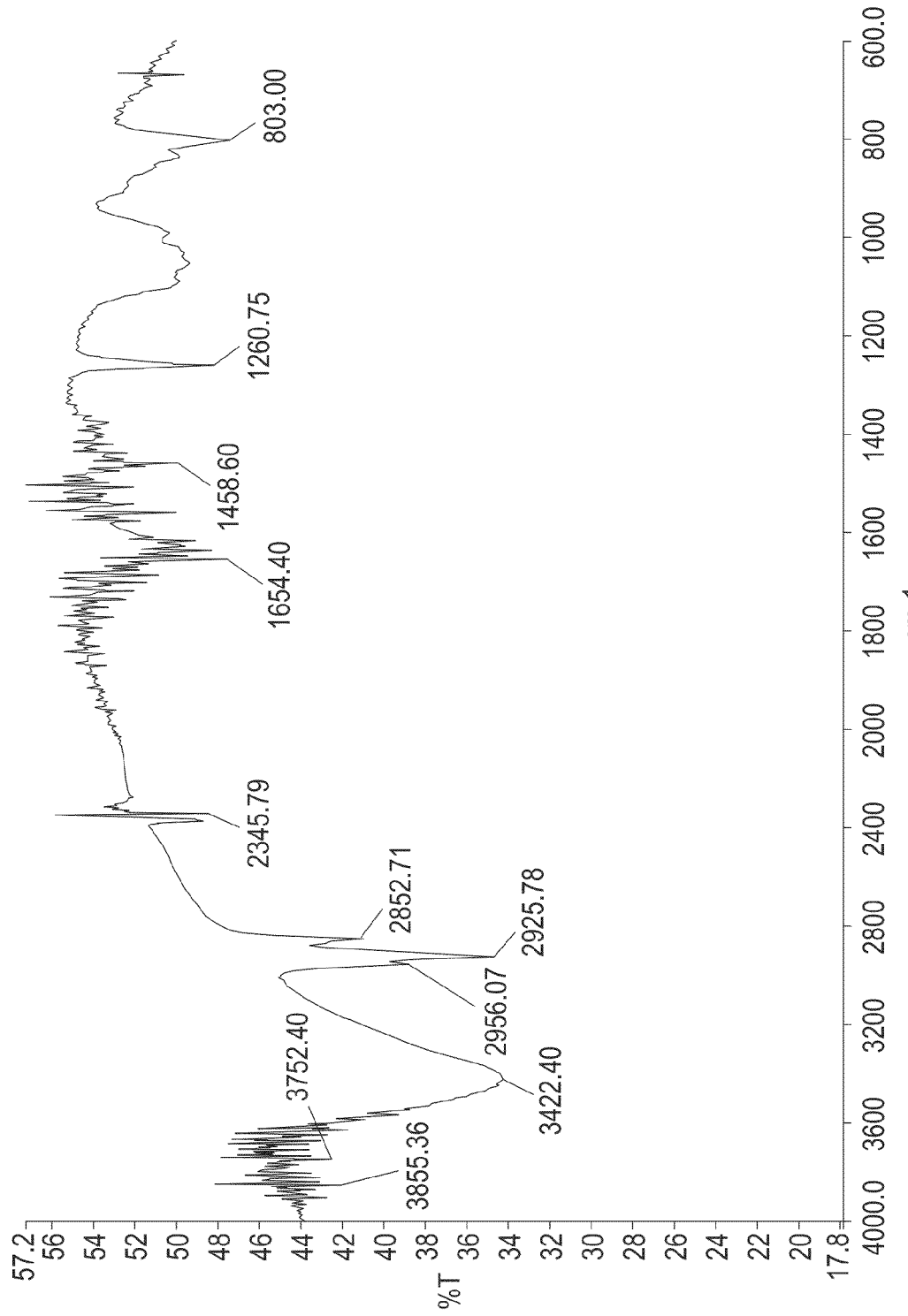
FIG. 7 depicts an IR spectrum of vanadium hydride sample Va-150-$H_2$-2 hrs.
Figure 8:
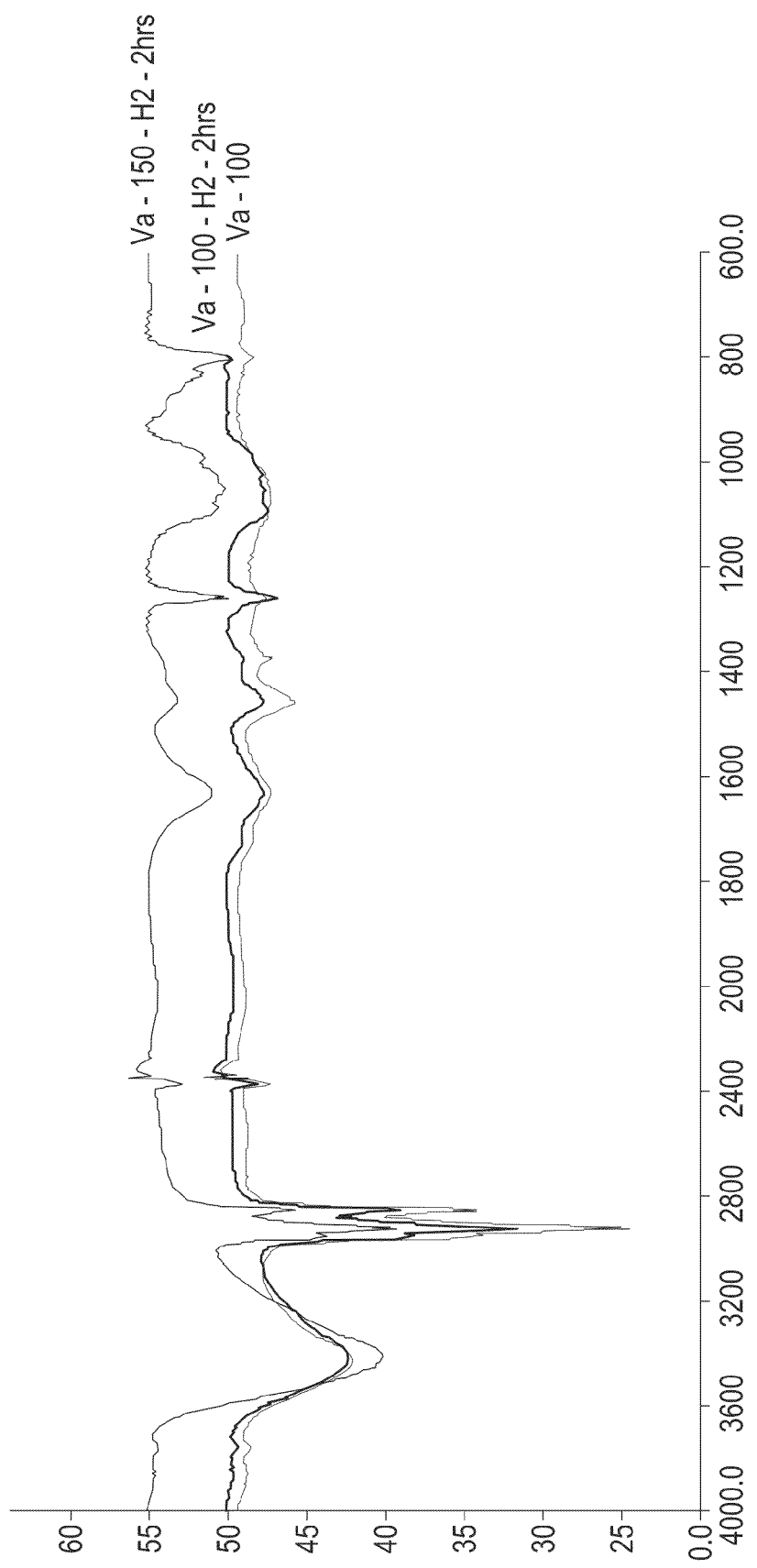
FIG. 8 depicts an IR spectrum of vanadium hydride samples Va-100, Va-100-$H_2$-2 hrs and Va-150-$H_2$-2 hrs.

Infra-red (IR) spectra for samples Va-100, Va-100-$H_2$-2 hrs and Va-150-$H_2$-2 hrs are shown in FIGS. 5-7, respectively. A combined IR spectrum for all three samples is shown in FIG. 8.

Sample Va-100 possesses a Brunauer-Emmett-Teller (BET) surface area of 2.96 $m^2/g$.

Figure 8A:
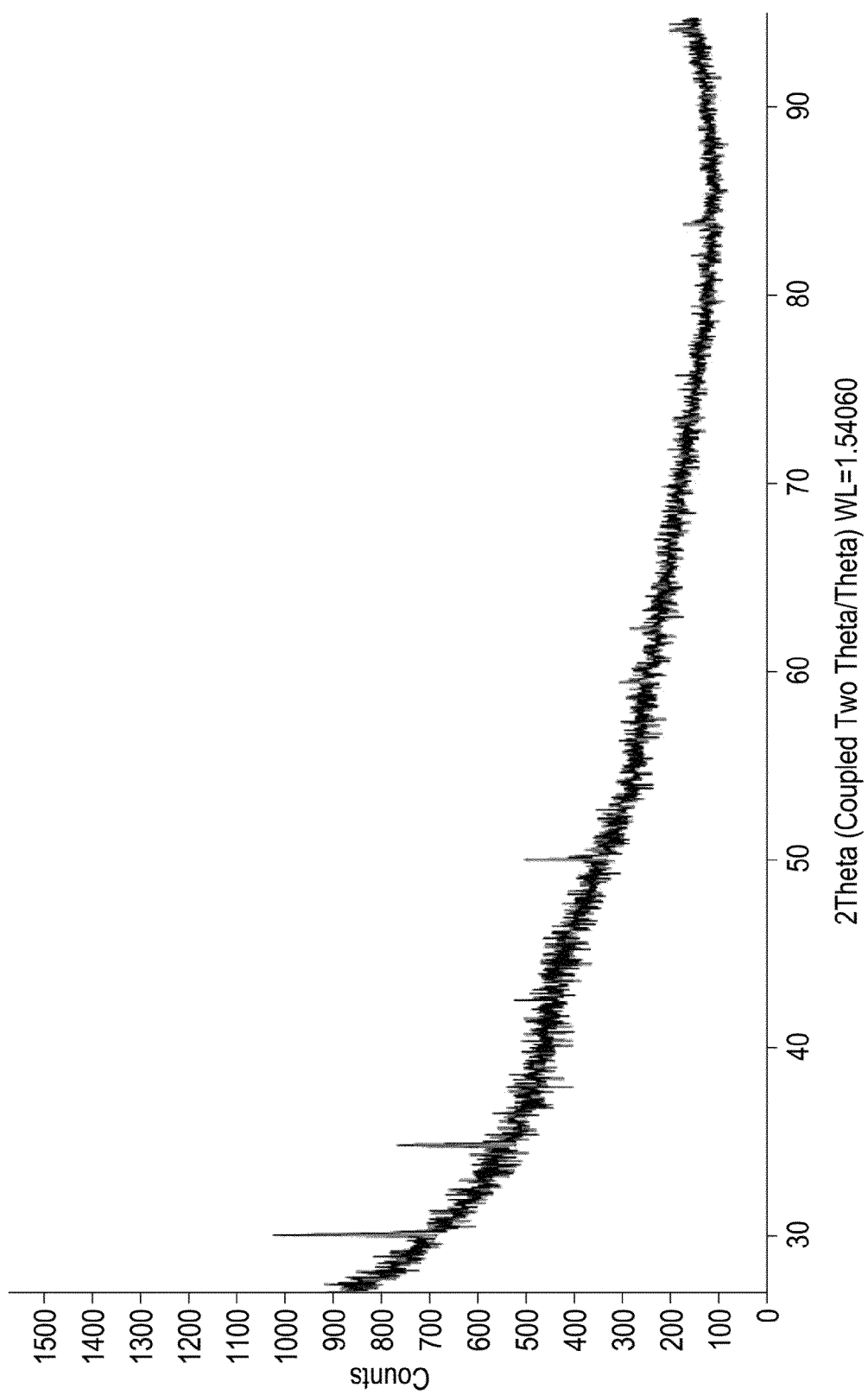
FIG. 8A depicts the X-ray powder diffraction (XRPD) spectrum for vanadium hydride sample Va-150-$H_2$-2 hrs.

FIG. 8A depicts the X-ray powder diffraction (XRPD) spectrum for vanadium hydride sample Va-150-$H_2$-2 hrs. As can be seen from FIG. 8A, sample Va-150-$H_2$-2 hrs has reflections in the 30-95° 2θ region which may be indexed to $Li_6V(II)Cl_8$ arising from minor contamination caused by trace amounts of lithium chloride impurity. The rest of the material does not give rise to any reflections suggesting that the principal vanadium based phase is amorphous with no long-range order.

Figure 8B:
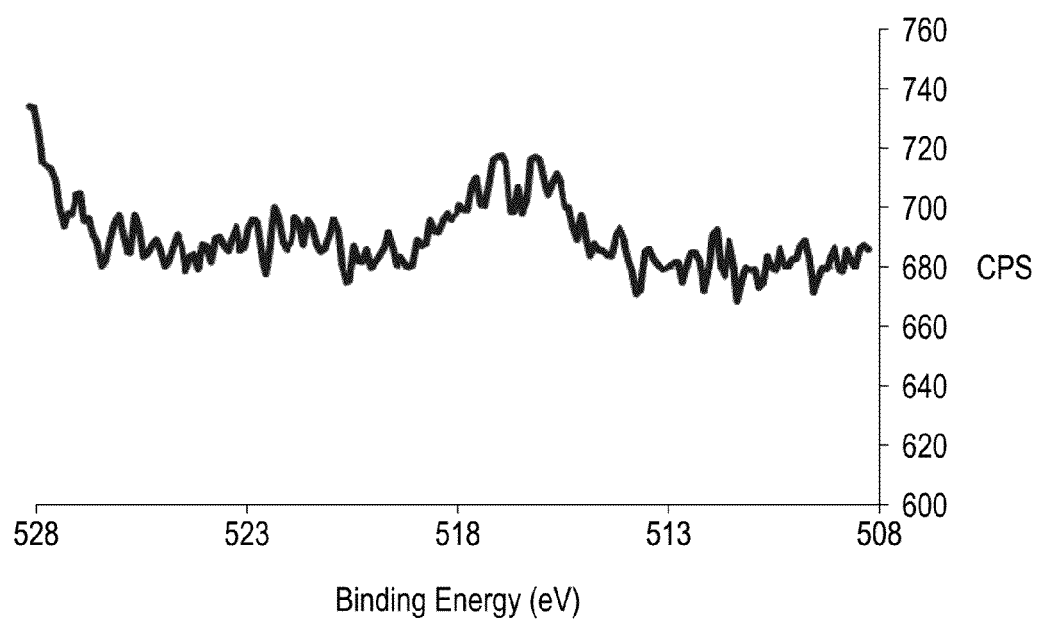
FIG. 8B depicts the X-ray photoelectron spectroscopy (XPS) spectrum (2p1/2 and 2p3/2 region) for vanadium hydride sample Va-150-$H_2$-2 hrs.

FIG. 8B depicts the X-ray photoelectron spectroscopy (XPS) spectrum (2p 3/2, 1/2 region) for vanadium hydride sample Va-150-$H_2$-2 hrs. The small emissions at 515 and 522.7 eV correspond to a V(III) species (see, e.g., Horvath et al., *Z. Anorg. Allg. Chem.*, 483, 181, 1981), however the broad nature of the emissions suggests that several vanadium environments may be present, which is expected from the amorphous nature of the material. The formation of V(IV) and V(II) in small amounts due to oxidative disproportionation cannot be ruled out on the basis of this broad emission, as has been observed previously for vanadium hydrazide species (see, e.g., Tuan et al., *J. Am. Chem. Soc.*, 132, 11792-11798, 2010).

Hydrogen Adsorption-Desorption Studies

Figure 9:
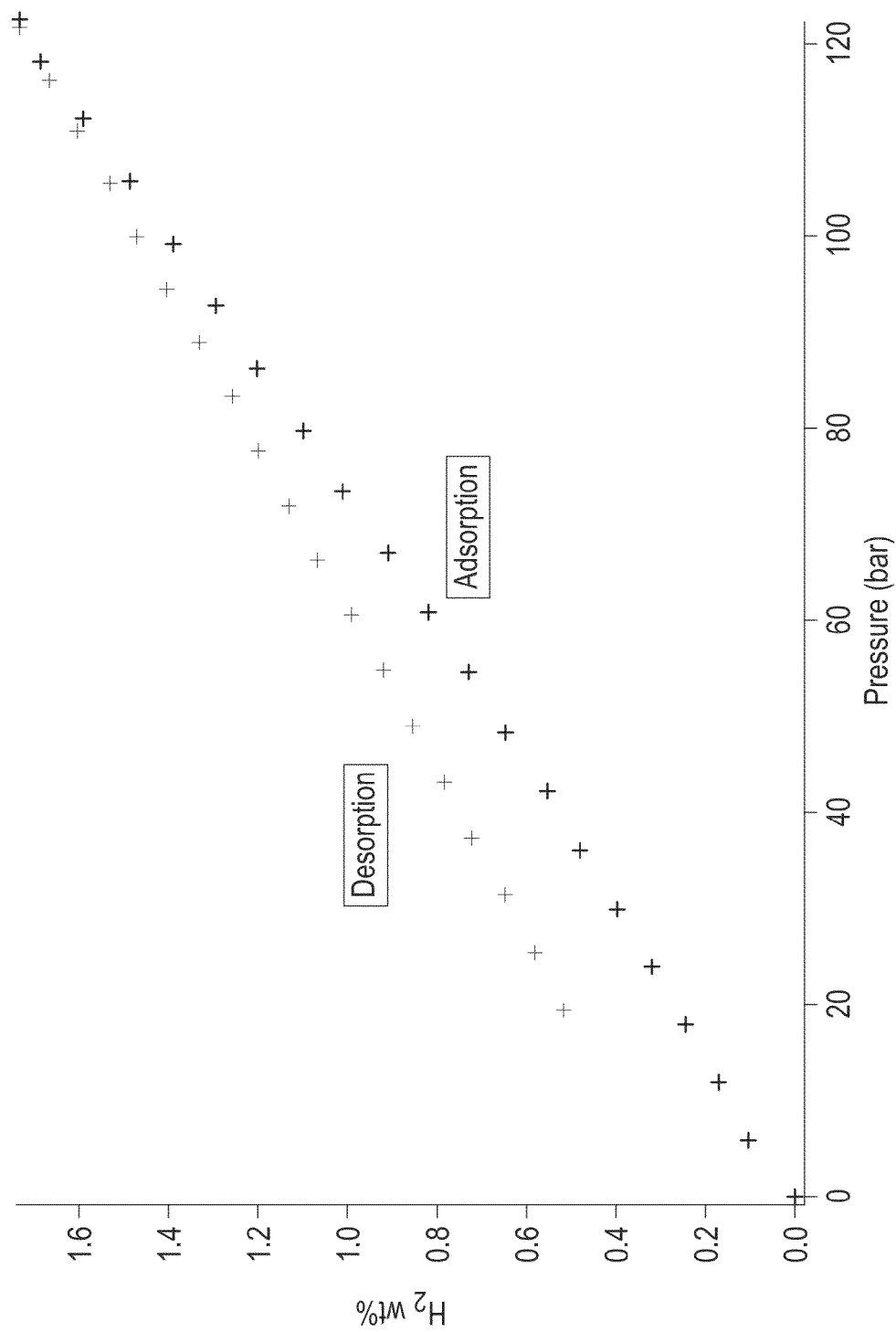
FIG. 9 depicts a hydrogen adsorption-desorption isotherm for vanadium hydride sample Va-100.
Figure 10:
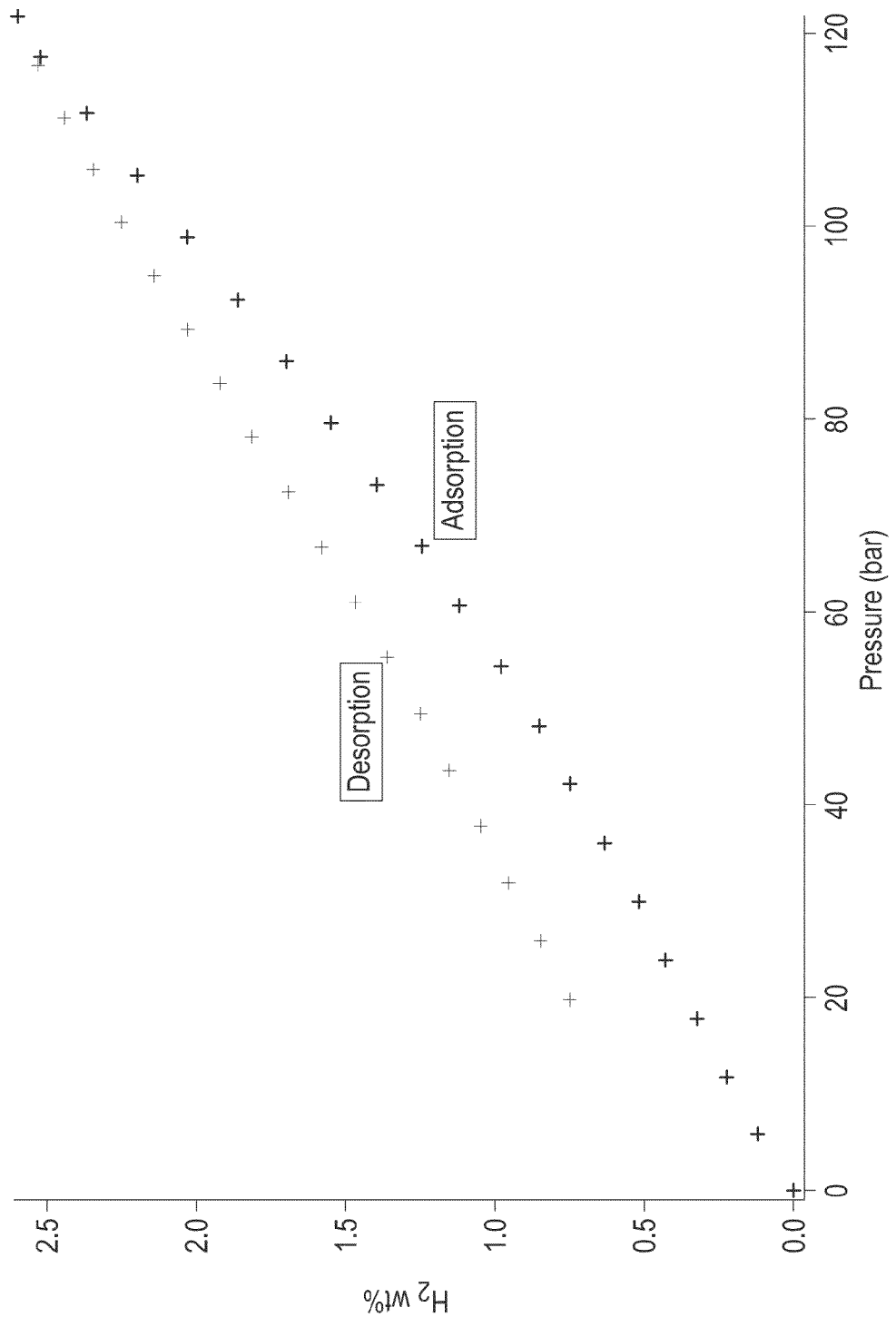
FIG. 10 depicts a hydrogen adsorption-desorption isotherm for vanadium hydride sample Va-100-$H_2$-2 hrs.
Figure 11:
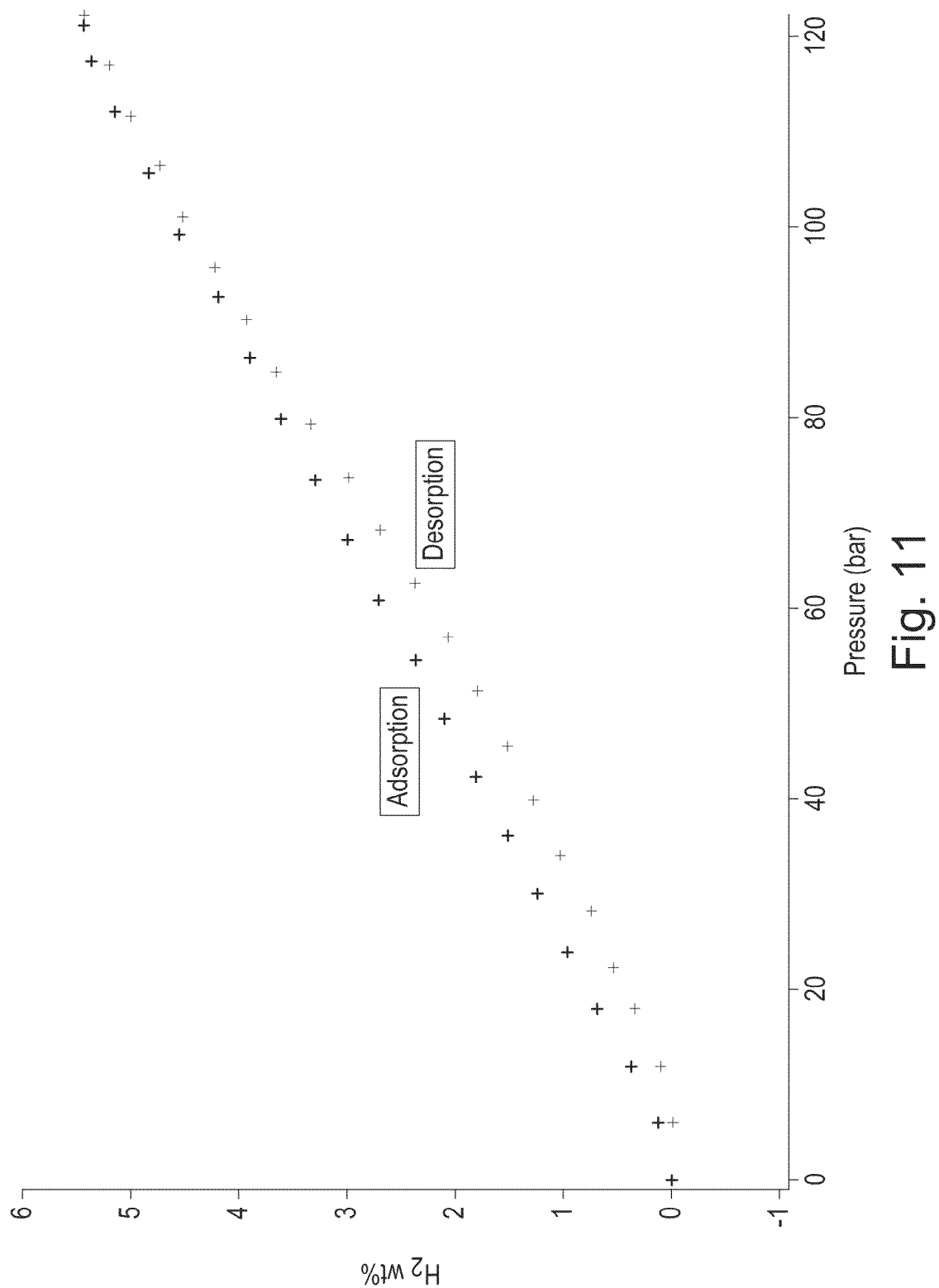
FIG. 11 depicts a hydrogen adsorption-desorption isotherm for vanadium hydride sample Va-150-$H_2$-2 hrs.

The hydrogen adsorption-desorption excess isotherms for samples Va-100, Va-100-$H_2$-2 hrs and Va-150-$H_2$-2 hrs are shown in FIGS. 9-11.

The gravimetric adsorption (without saturation) of sample Va-100 is 1.7 wt. % at 298 K. As can be seen from FIG. 9, there is some hysteresis between the adsorption and desorption isotherms.

The gravimetric adsorption (without saturation) of sample Va-100-$H_2$-2 hrs is 2.6 wt. % at 298 K. As can be seen from FIG. 10, there is some hysteresis between the adsorption and desorption isotherms.

The gravimetric adsorption (without saturation) of sample Va-150-$H_2$-2 hrs is 5.42 wt. % at 298 K. As can be seen from FIG. 11, there is a slight hysteresis between the adsorption and desorption isotherms. Sample Va-150-$H_2$-2 hrs shows reversible adsorption and desorption up to 100 bar over 10 cycles, with an average gravimetric adsorption of 5.3 wt. % per cycle.

Example 1b $VH_3$ 

Synthesis

Bis(trimethylsilyl)methyl lithium (4.2805 g, 25.76 mmol) in 50 mL of diethyl ether was added dropwise to a dark purple suspension of $VCl_3(NEt_3)_{0.78}$ (2.0292 g, 8.59 mmol) at 298 K. The reaction mixture turned dark green. The reaction was stirred for three hours then volatiles were removed in vacuo ($10^{-3}$ torr). The resulting green/brown oil was extracted with 50 mL of 40-60° C. petroleum ether and filtered to afford a light precipitate and a brown solution. The solution was concentrated and dried in vacuo ($10^{-3}$ torr) for two hours to afford tris[bis(trimethylsilyl)methyl]vanadium (III) as a brown oil.

Tris[bis(trimethylsilyl)methyl]vanadium (III) in 50 mL of toluene was stirred under hydrogen gas for 5 days. A small amount of dark brown precipitate formed. The toluene was removed and the resulting dark brown solid was dried in vacuo ($10^{-3}$ torr) at 100° C. for four hours to afford a black solid. The black solid was then transferred to a stainless steel sample holder and hydrogenated in the solid state using the Hy-Energy PCT-Pro Sieverts apparatus. This was done at 85 bar $H_2$ and 100° C. for four hours, followed by 150° C. for ten hours. The sample was then evacuated at 100° C. for 6 hours to afford a black solid. The material was then further hydrogenated in the solid state to remove more additional hydrocarbon from the material via hydrogenolysis. The sample was hydrogenated at 85 bar $H_2$ at 150° C. for 24 hours followed by evacuation ($10^{-3}$ torr) at 200° C. for 12 hours. A further solid-state hydrogenation was carried out at 85 bar $H_2$ and 200° C. for 14 hours followed by evacuation ($10^{-3}$ torr) at 100° C. for two hours to afford sample Va-200-24 h-$H_2$ as a black air moisture sensitive powder.

Sample Characterization

Figure 11A:
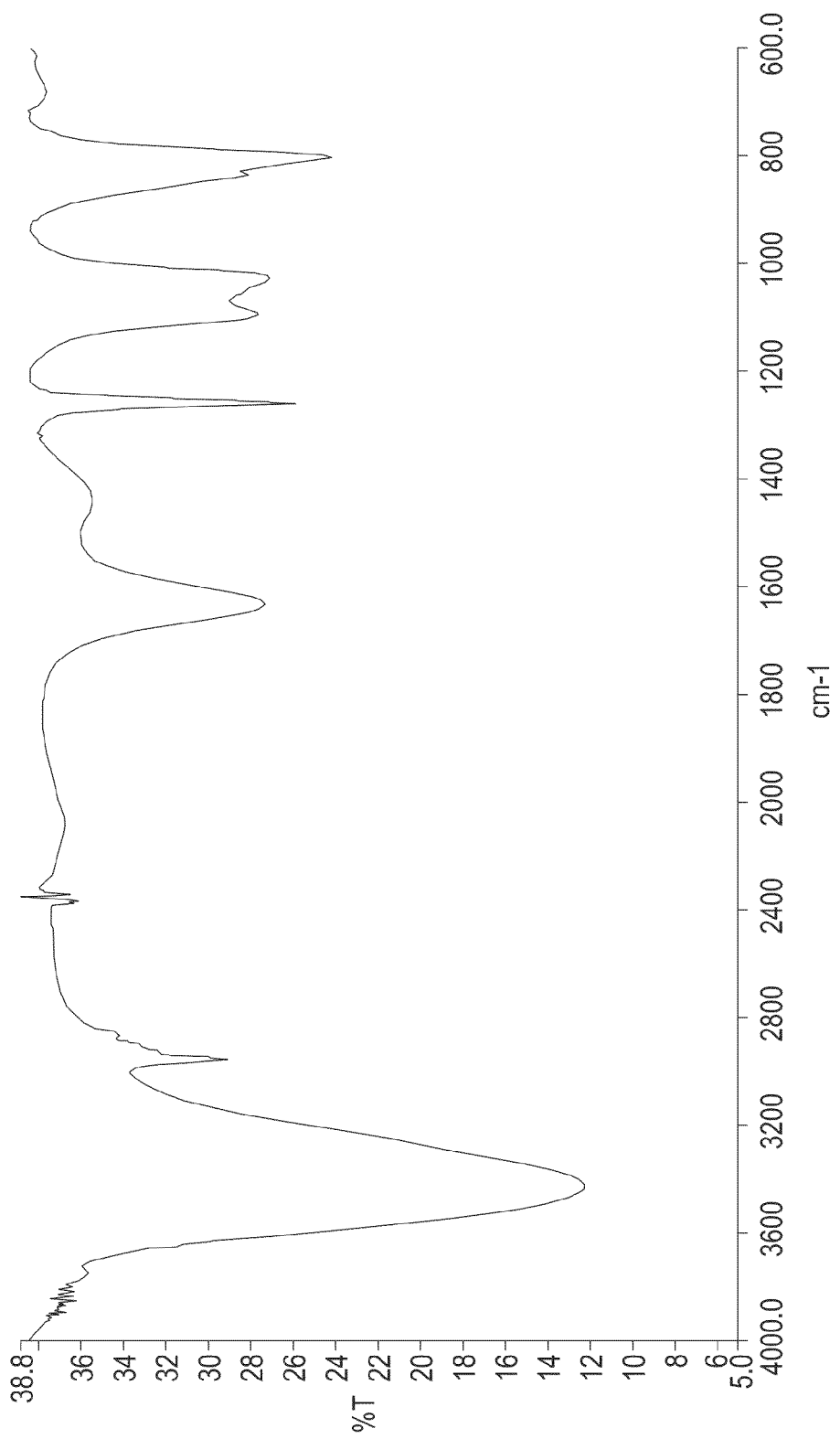
FIG. 11A depicts an IR spectrum of vanadium hydride sample Va-200-24 h-$H_2$.

An infra-red (IR) spectrum for sample Va-200-24 h-$H_2$ is shown in FIG. 11A. The stretch at 1633 $cm^{-1}$ corresponds to a V-H stretch. Sample Va-200-24 h-$H_2$ possesses a Brunauer-Emmett-Teller (BET) surface area of 0.14 $m^2/g$.

Figure 11B:
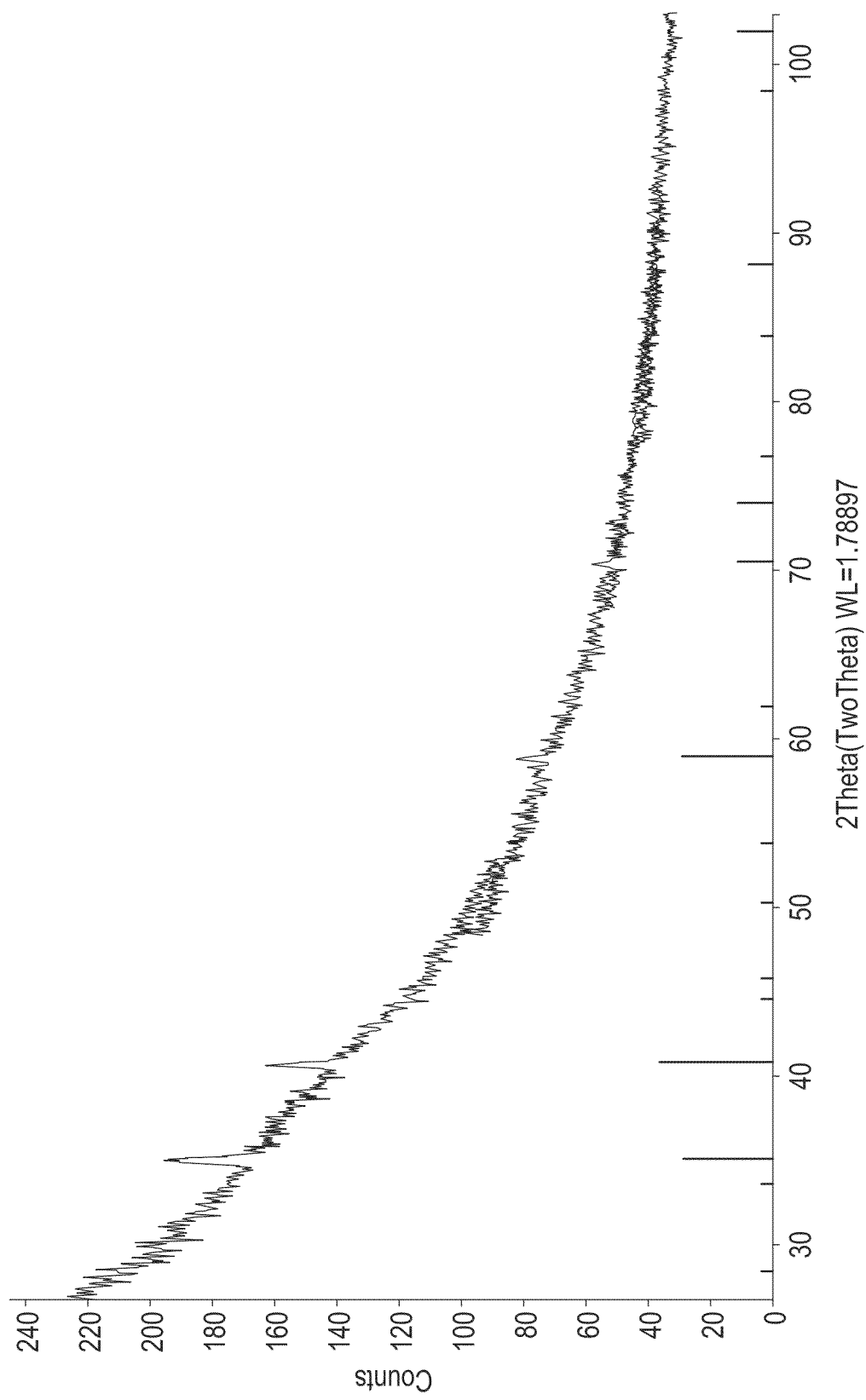
FIG. 11B depicts the X-ray powder diffraction (XRPD) spectrum for vanadium hydride sample Va-200-24 h-$H_2$.

FIG. 11B depicts the X-ray powder diffraction (XRPD) spectrum for vanadium hydride sample Va-200-24 h-$H_2$. As can be seen from FIG. 11B, sample Va-200-24 h-$H_2$ has reflections in the 30-95° 2θ region which may be indexed to $Li_6V(II)Cl_8$ arising from minor contamination caused by trace amounts of lithium chloride impurity. The rest of the material does not give rise to any reflections suggesting that the principal vanadium based phase is amorphous with no long-range order.

Figure 11C:
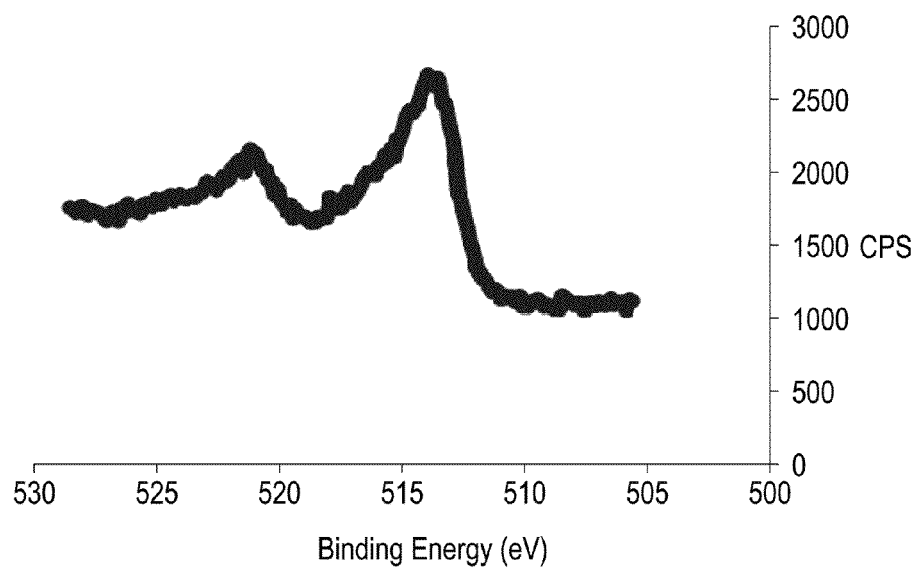
FIG. 11C depicts the X-ray photoelectron spectroscopy (XPS) spectrum (2p1/2 and 2p3/2 region) for vanadium hydride sample Va-200-24 h-$H_2$.

FIG. 11C depicts the X-ray photoelectron spectroscopy (XPS) spectrum (2p 3/2, 1/2 region) for vanadium hydride sample Va-200-24 h-$H_2$. The small emissions at 515.24 and 522.2 eV correspond to a V(III) species (see, e.g., Horvath et al., *Z. Anorg. Allg. Chem.*, 483, 181, 1981), however the broad nature of the emissions suggests that minor amount of V(IV) and V(II) may also be present. The presence of a V(II) environment in the XPS spectrum corresponds to the reflection for $Li_6V(II)Cl_8$ seen in the XRPD (arising from trace LiCl impurities).

Hydrogen Adsorption-Desorption Studies

Figure 11D:
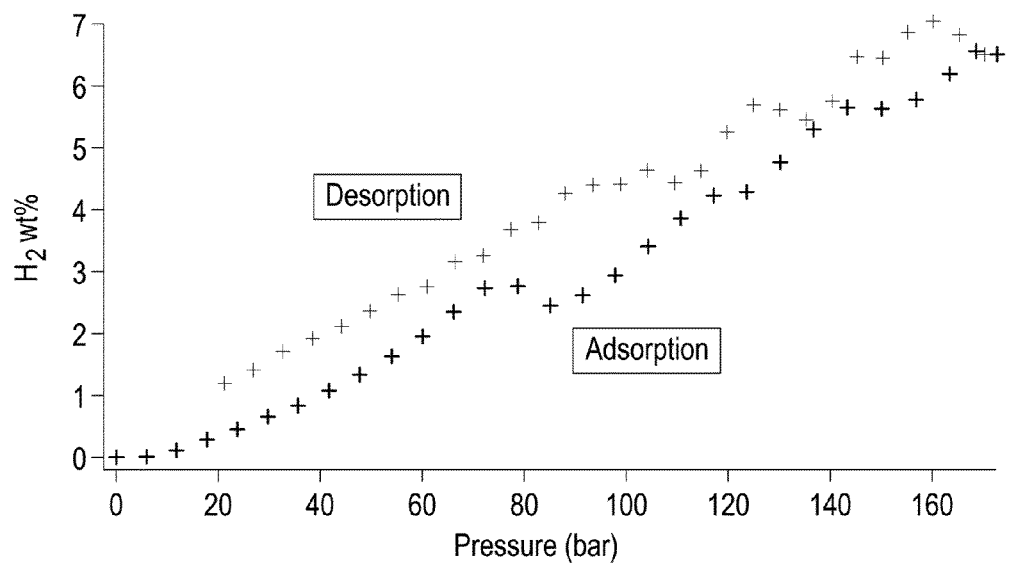
FIG. 11D depicts a hydrogen adsorption-desorption isotherm for vanadium hydride sample Va-200-24 h-$H_2$.

The hydrogen adsorption-desorption excess isotherm for sample Va-200-24 h-$H_2$ is shown in FIG. 11D. The adsorption isotherm reaches a capacity of 6.5 wt % at 170 bar and 298 K without saturation. A capacity of 5.4 wt % (desorption branch) is observed at 120 bar which is consistent with the vanadium hydride sample Va-150-$H_2$-2 hrs. There is only a small degree of hysteresis between the adsorption and desorption isotherms. The adsorption isotherm is linear with some fluctuation, likely due to temperature fluctuations during the measurement. The low surface area of the material and the linear adsorption isotherm without saturation strongly suggests that the mechanism of hydrogen storage is via a Kubas interaction, not physisorption. The capacity of sample Va-200-24 h-$H_2$ surpasses the US Department of Energy's (DOE) 2017 target for gravimetric capacity (5.5 wt %).

Without wishing to be bound by theory, Applicant's theorize that failure to carry out the vacuum step at 200° C., even with hydrogenation for 24 h, does not adequately remove residual triethylamine from the synthesis mixture. Triethylamine can coordinate to V(III) and may explain the formation of waxy black solids with significantly more residual hydrocarbon (as determined by IR and weight loss), and lower hydrogen storage performance, than samples prepared with longer vacuum times before initial treatment with $H_2$ in toluene (such as sample Va-100). Residual triethylamine from the starting material may bind to the vanadium sites until later stages of the synthesis, thereby retarding the solid state hydrogenation steps. This theory is consistent with the observation that heating the sample to 200° C. in vacuo before the final hydrogenation step at 200° C. generates a free-flowing solid with high hydrogen storage performance: i.e., heating the sample to 200° C. in vacuo is required to remove the coordinated triethylamine. Once desorbed, the vanadium sites are free to coordinate to $H_2$, the necessary first step of M-C bond hydrogenolysis.

Example 1c $VH_4$

Synthesis

Phenyllithium (51.24 mmol, 25.62 mL of a 2.0M solution in dibutylether) was stirred at room temperature. $VCl_4$ (2.47 g, 12.81 mmol) was added dropwise via a syringe. The reaction mixture turned dark brown in colour, increased in temperature and bubbled vigorously. The reaction was stirred for fifteen minutes until the bubbling had subsided and the mixture had cooled back to room temperature. The mixture was then filtered to afford a dark brown precipitate and a brown filtrate. The filtrate was immediately transferred to a Schlenk flask and stirred under 1 bar of hydrogen gas for a total of 12 days (7 days at 298 K followed by 5 days at 80° C.). The mixture was then filtered to afford a black precipitate. The precipitate was dried in vacuo ($10^{-3}$ torr) for four hours at 100° C. to afford sample VB-100 as a fine black powder (1.25 g).

Sample VB-100 was further hydrogenated at a pressure of 85 bar for two hours at 100° C. The resulting material was then dried in vacuo ($10^{-3}$ torr) for 2 hours at 100° C. and allowed to cool to room temperature to afford sample VB-100-$H_2$ as a black powder. This solid-state hydrogenation step resulted in a 19% loss in weight of the material.

Sample VB-150-$H_2$-2 hrs was obtained using a similar hydrogenation process, during which the temperature was maintained at 150° C. for 2 hours. This solid-state hydrogenation step resulted in a 17% loss in weight of the material.

Sample Characterization

Figure 12:
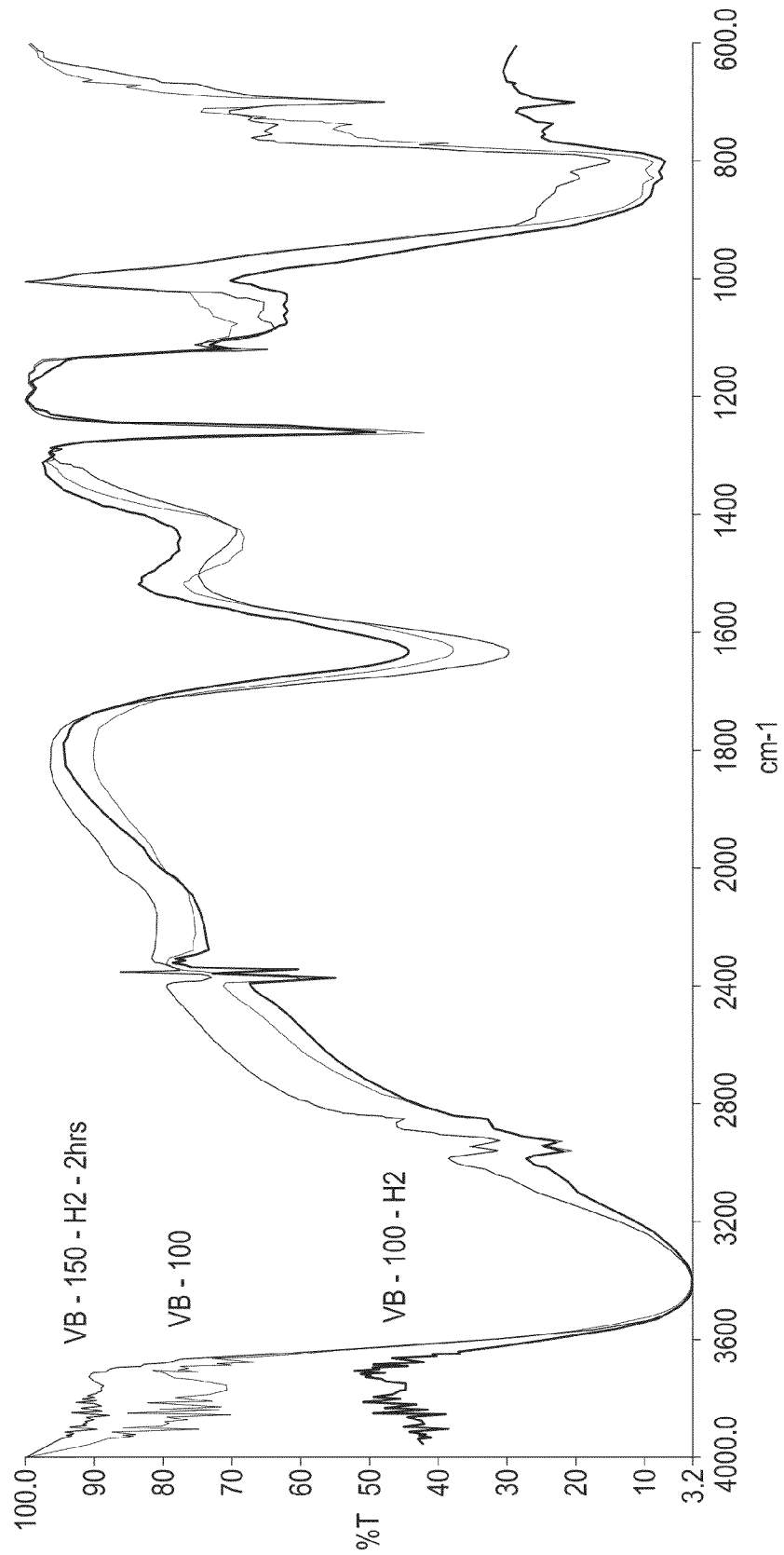
FIG. 12 depicts an IR spectrum of vanadium hydride samples VB-100, VB-100-$H_2$ and VB-150-$H_2$-2 hrs.

Infra-red (IR) spectra for samples VB-100, VB-100-$H_2$ and VB-150-$H_2$-2 hrs are shown in FIG. 12. The presence of C—H stretches at 2956 and 2925 $cm^{-1}$ shown in the IR spectra of all three samples likely indicates incomplete hydrogenolysis of the phenyl ligands. All three materials show a V-H stretch at 1634 $cm^{-1}$. With successive solid state hydrogenations, the intensity of this stretch increases, which may be attributed to further hydrogenolysis of phenyl groups creating more V—H bonds. The relative intensity of the V-H stretch at 1600 $cm^{-1}$ with respect to the C—H stretch at ca. 2900 $cm^{-1}$ also increases with progressive hydrogenation.

Nitrogen adsorption-desorption isotherms for samples VB-100, VB-100-$H_2$ and VB-150-$H_2$-2 hrs show that all three samples possess a type 2 isotherm. Samples VB-100, VB-100-$H_2$ and VB-150-$H_2$-2 hrs have a BET surface area of 0.6 $m^2$/g, 2 $m^2$/g and 2.2 $m^2$/g, respectively. All three nitrogen-adsorption isotherms show little increase in slope between 0 and 0.1 P/Po suggesting that the materials have no microporosity.

Figure 12A:
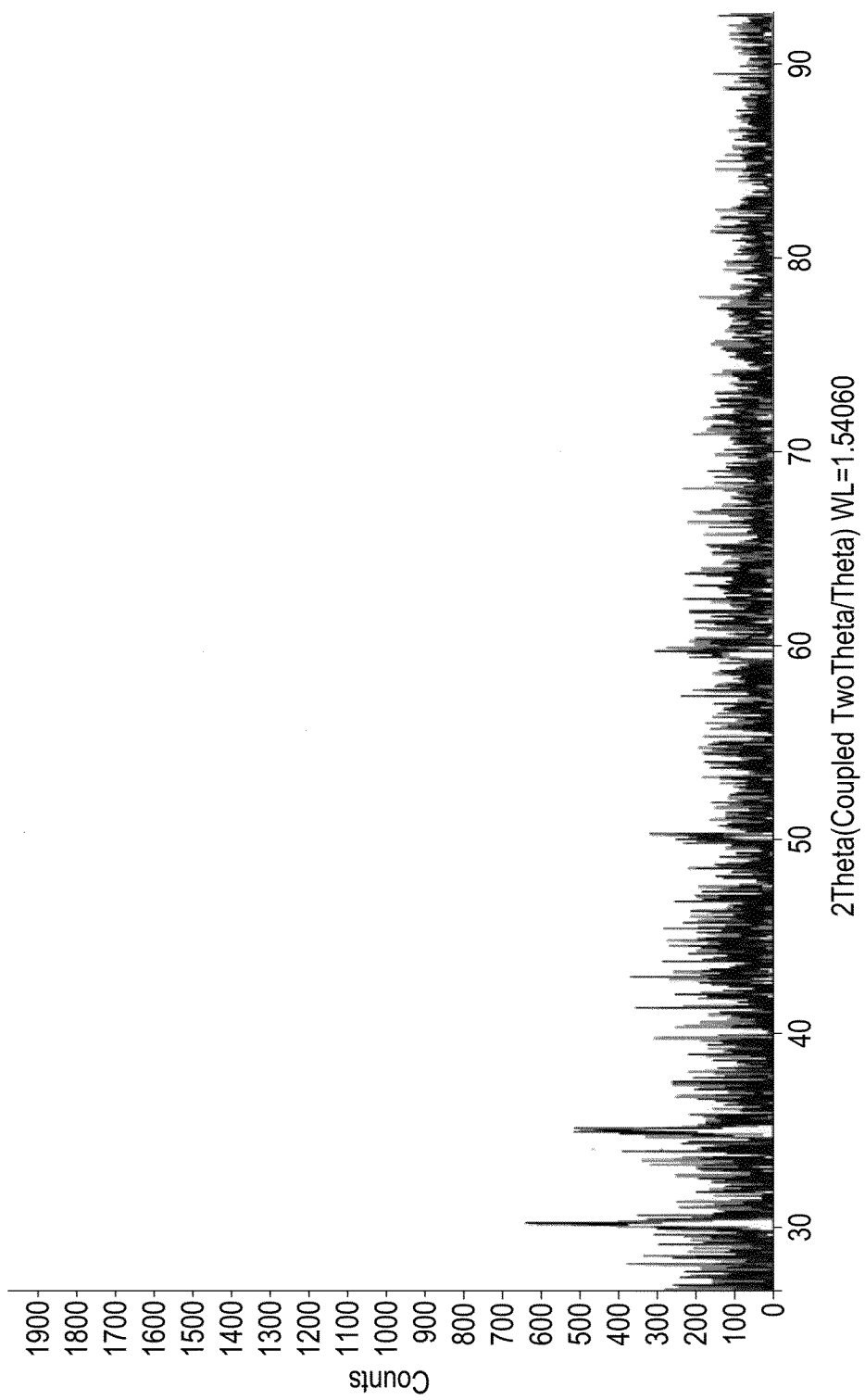
FIG. 12A depicts the X-ray powder diffraction (XRPD) spectrum for vanadium hydride sample VB-150-$H_2$-2 hrs.

FIG. 12A depicts the X-ray powder diffraction (XRPD) spectrum for vanadium hydride sample VB-150-$H_2$-2 hrs. As can be seen from FIG. 12A, sample VB-150-$H_2$-2 hrs is largely amorphous. Two small reflections are observed in the 30-35° 2θ region that could not be indexed to any known pattern.

Figure 12B:
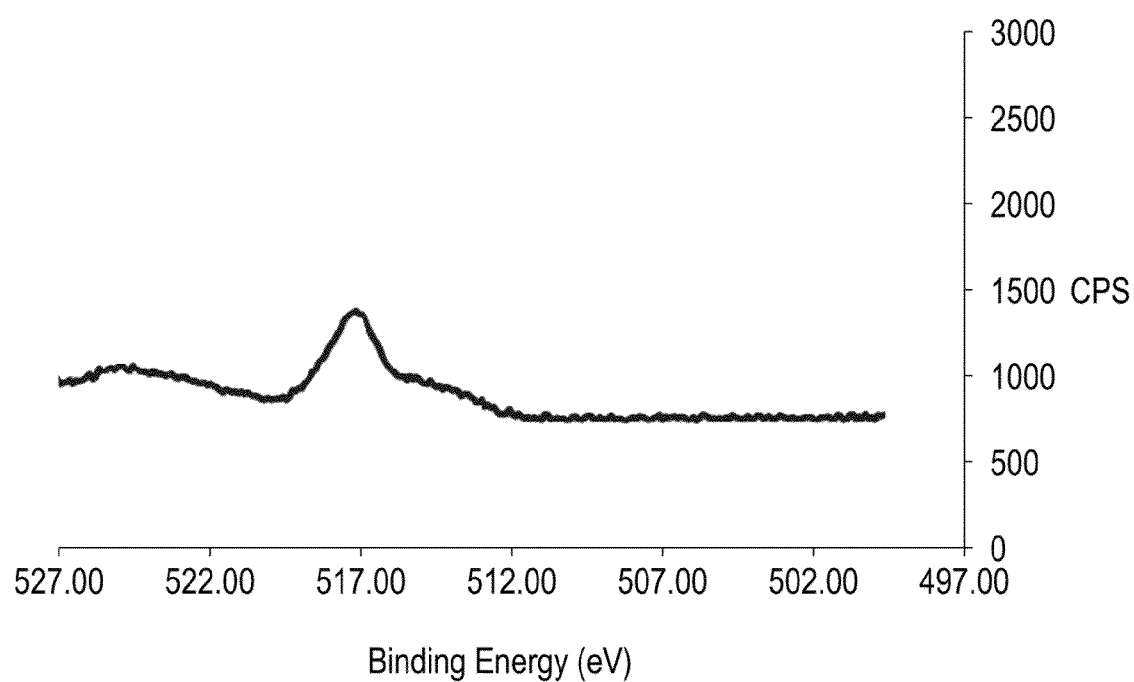
FIG. 12B depicts the X-ray photoelectron spectroscopy (XPS) spectrum (2p1/2 and 2p3/2 region) for vanadium hydride sample VB-150-$H_2$-2 hrs.

FIG. 12B depicts the X-ray photoelectron spectroscopy (XPS) spectrum for vanadium hydride sample VB-150-$H_2$-2 hrs. One major emission is observed in the 2p 3/2 region at 517.3 eV. Metallic vanadium has a 3/2 emission of 512 eV, suggesting that the vanadium precursor was not reduced to metallic vanadium. There are no 3/2, 1/2 emissions for lower oxidation states of vanadium, which would be seen at 515 and 522.3 eV, respectively, for a V(III) species (see, e.g., Horvath et al., *Z. Anorg. Allg. Chem.*, 483, 181, 1981). The emission at 517.3 eV may be assigned to a V(IV) species by comparing this value for the emission seen for $V^{4+}$ in $VO_2$ (see e.g, Nag et al., *J. Catal.*, 124, 127, 1990).

Hydrogen Adsorption-Desorption Studies

Figure 13:
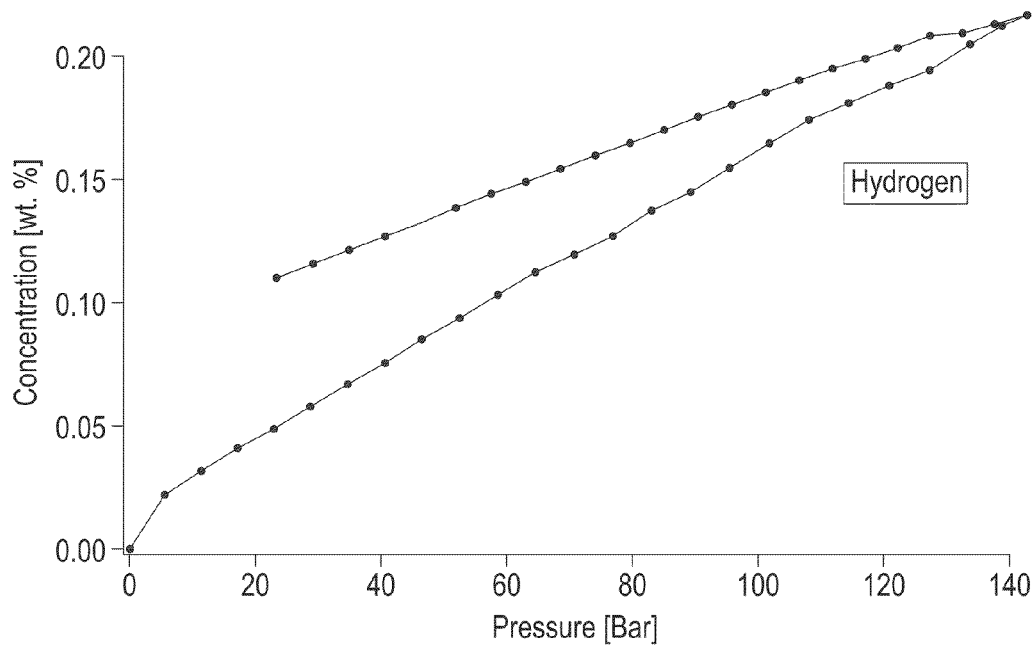
FIG. 13 depicts a hydrogen adsorption-desorption isotherm for vanadium hydride sample VB-100.
Figure 14:
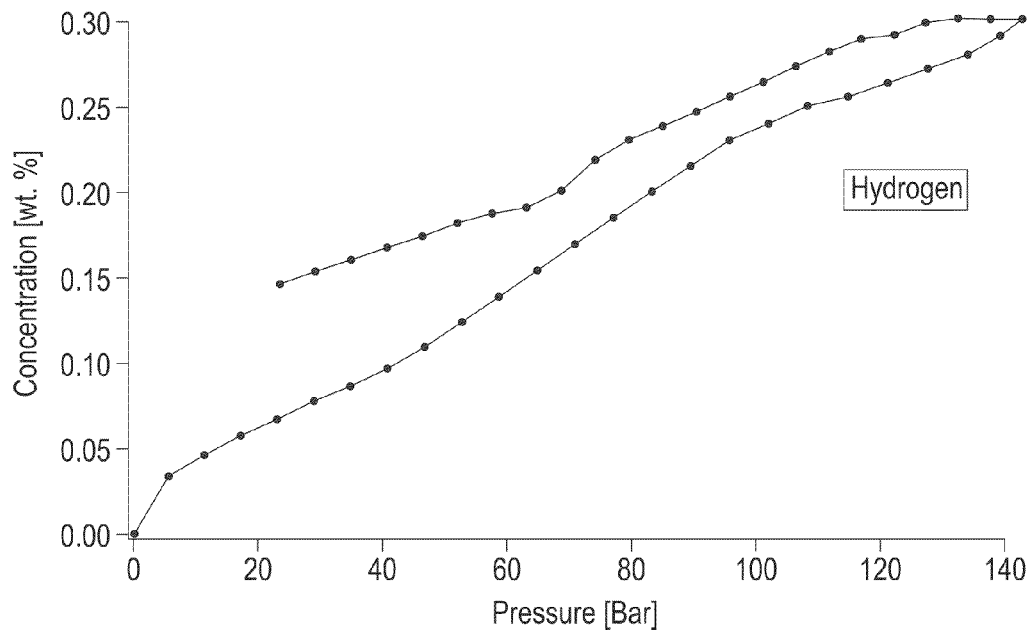
FIG. 14 depicts a hydrogen adsorption-desorption isotherm for vanadium hydride sample VB-100-$H_2$.
Figure 15:
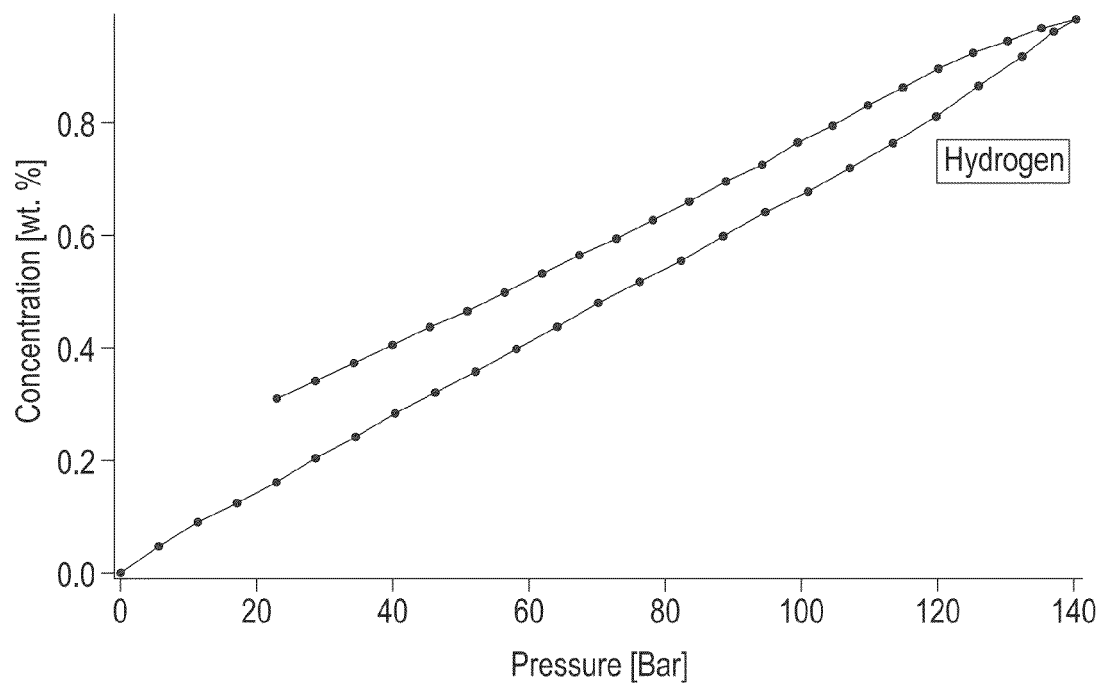
FIG. 15 depicts a hydrogen adsorption-desorption isotherm for vanadium hydride sample VB-150-$H_2$-2 hrs.

The hydrogen adsorption-desorption isotherms (298K) for samples VB-100, VB-100-$H_2$ and VB-150-$H_2$-2 hrs are shown in FIGS. 13-15, respectively. The gravimetric adsorption of samples VB100 and VB-100-$H_2$ is 0.22 and 0.3 wt %, respectively. Both of the isotherms in FIGS. 13 and 14 are roughly linear and do not reach saturation and there is some hysteresis between the adsorption and desorption isotherms. The gravimetric adsorption of sample VB-150-$H_2$-2 hrs is 1 wt % at 298K and 140 bar. There is also a reduction in the degree of hysteresis between the adsorption and desorption isotherms. The adsorption isotherm shown in FIG. 15 is linear and does not show saturation up to 140 bar, suggesting that the capacity of sample VB-150-$H_2$-2 hrs may be higher at pressures above 140 bar. Further hydrogenation for 4 h at 150° C. led to a further weight loss and a material with 1.4 wt % adsorption/desorption at 140 bar without saturation.

Example 1d $VH_4$

Synthesis $VCl_4$ (5.312 g, 27.6 mmol) was stirred in 50 mL of diethyl ether to afford a dark red solution. To this solution, 110.4 mmol, 110.4 mL of a 1.0M solution of (trimethylsilyl)methyl lithium in pentane was added dropwise and the reaction mixture changed to dark purple. Once all the reagent was added, the mixture was stirred at room temperature for 5 minutes. Filtration afforded a light purple precipitate and a dark purple filtrate. Toluene (20 mL) was added to the filtrate and the mixture was stirred under 1 bar of hydrogen gas. After 24 hours, a black precipitate formed on the walls of the flask. The mixture was stirred for a further 6 days and then filtered to afford a black precipitate. The precipitate was dried in vacuo ($10^{-3}$ torr) for four hours at 100° C. to afford sample VA-100 as a fine black powder (1.25 g, 82% yield).

Further Hydrogenation of Vanadium Hydride

A sample of vanadium hydride VA-100 was added to a computer controlled commercial Gas Reaction Controller™ manufactured by Advanced Materials Corporation, Pittsburgh, Pa. The sample was placed under hydrogen at a pressure of 85 bar at 100° C., then at 150° C. for 2 hours, followed by a 2 hour evacuation ($10^{-3}$ torr) at 100° C. to afford vanadium hydride sample VA-150 (1.03 g). The weight of sample VA-150 decreased by approximately 12% during the process.

Sample Characterization

Figure 16:
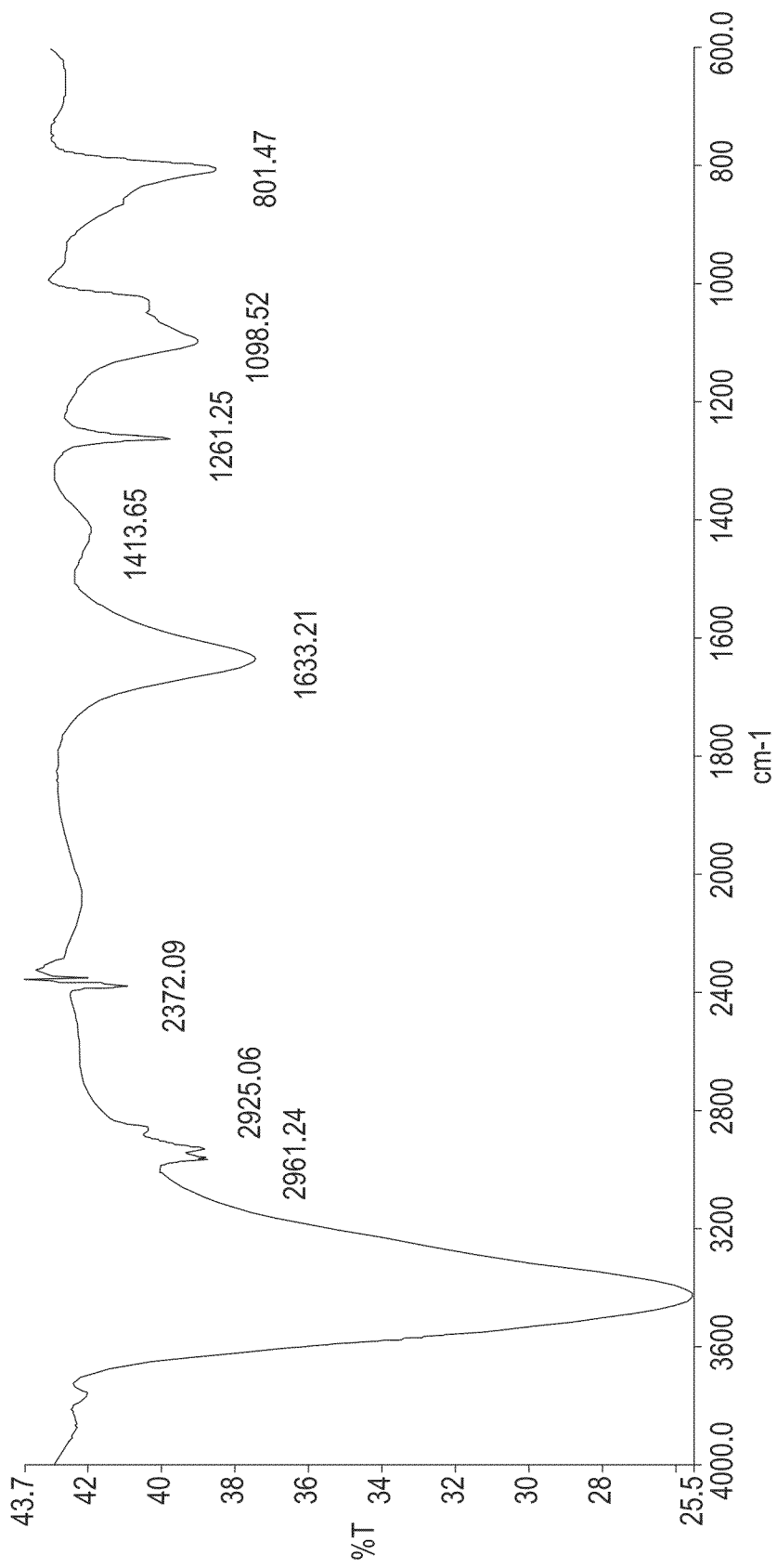
FIG. 16 depicts an IR spectrum of vanadium hydride sample VA-100.

An infra-red (IR) spectrum of vanadium hydride sample VA-100 shows the presence of C—H stretches at 2961 and 2925 cm$^{-1}$ (see FIG. 16) which likely arise from insufficient cleavage of (trimethylsilyl)methyl ligands from the vanadium alkyl precursor. As seen in FIG. 16, a stretch at 1633 cm$^{-1}$ is likely due to a V—H bond. Without wishing to be bound by theory, applicants theorize that vanadium hydride sample VA-100 is VH$_4$ containing a small amount of hydrocarbon residue. Vanadium hydride samples VA-100 and VA-150 have a BET surface area of 187 m$^2$/g and 12 m$^2$/g, respectively.

Hydrogen Adsorption-Desorption Studies

Figure 17:
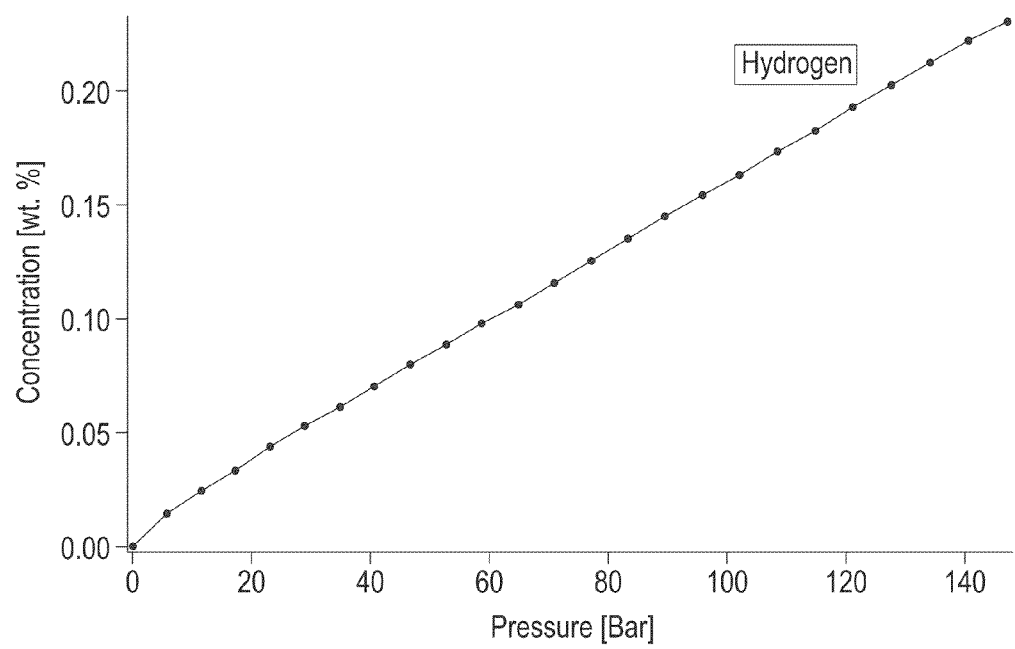
FIG. 17 depicts a hydrogen adsorption-desorption isotherm for vanadium hydride sample VA-150.

The hydrogen adsorption isotherm (298K) for vanadium hydride sample VA-150 is shown in FIG. 17. Vanadium hydride sample VA-150 reached a maximum of hydrogen adsorption of 0.23 wt % at 147 bar. The isotherm is linear and does not reach saturation, which suggests that the adsorption capacity could be increased at higher pressure.

Example 2

Titanium Hydride Samples

Synthesis 50 ml of toluene was added to 3.00 g (5.7 mmol) of Ti(CH(SiMe$_3$)$_2$)$_3$ and the mixture was stirred to afford a green solution. Hydrogen gas grade 6.0 was bubbled through the solution at room temperature. The color changed to black over 24 hours and dark green particles precipitated. After 96 hours, the resulting solid was isolated by filtration and dried in vacuo ($10^{-3}$ torr) at room temperature for 8 hours to afford sample A-25. Sample A-25 was heated in vacuo ($10^{-3}$ torr) for a further 8 hours at 100° C. to afford sample A-100. Sample A-100 was heated at 150° C. in vacuo ($10^{-3}$ torr) for a further 8 hours to afford sample A-150.

Further Hydrogenation of Sample A-100

0.3000 g of sample A-100 was added to a computer controlled commercial Gas Reaction Controller™ manufactured by Advanced Materials Corporation, Pittsburgh, Pa. The sample was placed under hydrogen at a pressure of 5 bar and the temperature was raised to 150° C. The hydrogen pressure was then adjusted to 80 bar. Maintaining these conditions for 2 hours afforded sample H-150-2 h. Maintaining these conditions for 6 hours afforded sample H-150-6 h. Sample H-180-2 h was obtained using a similar process, during which the temperature was maintained at 180° C. for 2 hours. After all hydrogenations, a vacuum ($10^{-3}$ torr) was applied and heating was continued for another 2 hours at 150° C.

Titanium Hydride Sample Characterization

Figure 18:
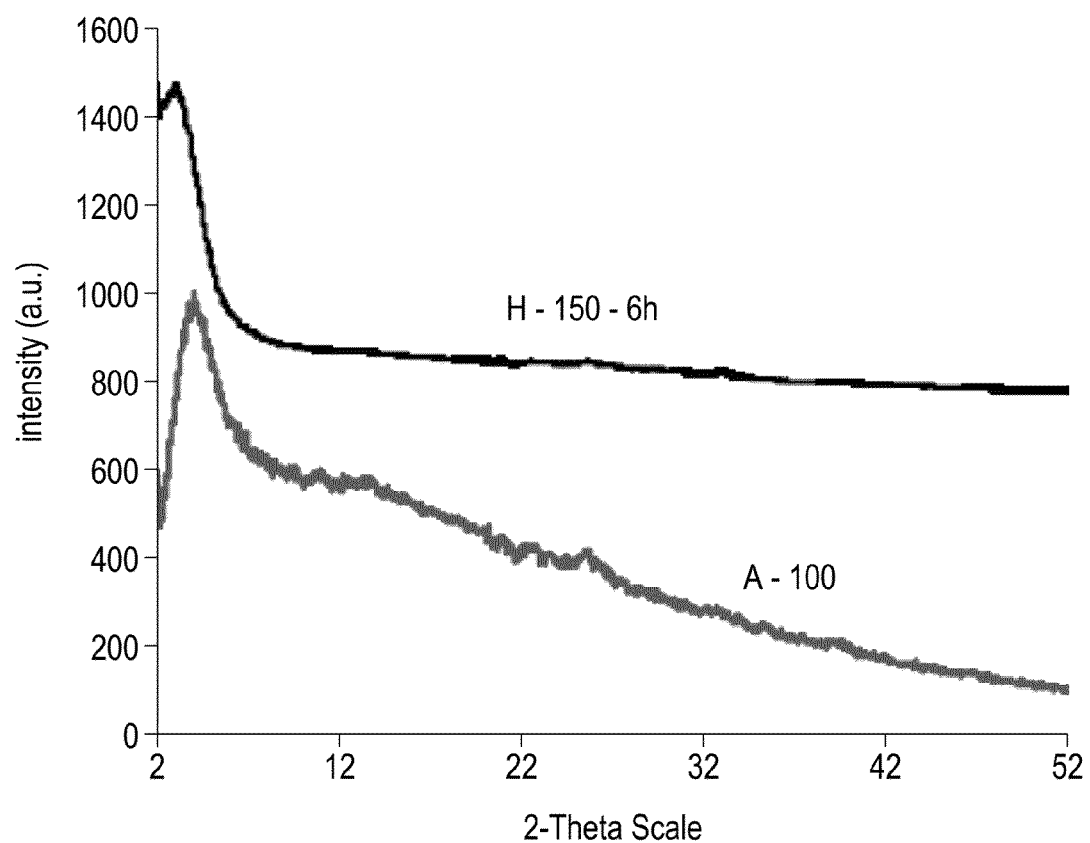
FIG. 18 depicts powder X-ray diffraction (PXRD) patterns for titanium hydride samples A-100 and H-150-6 h.

The powder x-ray diffraction (PXRD) patterns for samples A-100 and H-150-6 h are shown in FIG. 18. As can be seen from FIG. 18, the two patterns are similar and exhibit a single broad diffraction peak between 3-5° 2θ, corresponding to a d-spacing of 2.19 nm for sample A-100 and 2.91 nm for sample H-150-6 h. Without wishing to be bound by theory, Applicants theorize that the position and broadness of these reflections suggests nanoscopic periodicity, possibly related to microporosity, with a lack of long-range order. Applicants also theorize that the small broad reflections from 20-25° 2θ may be due to crystalline TiH$_3$ that has begun to form due to heating.

Figure 19:
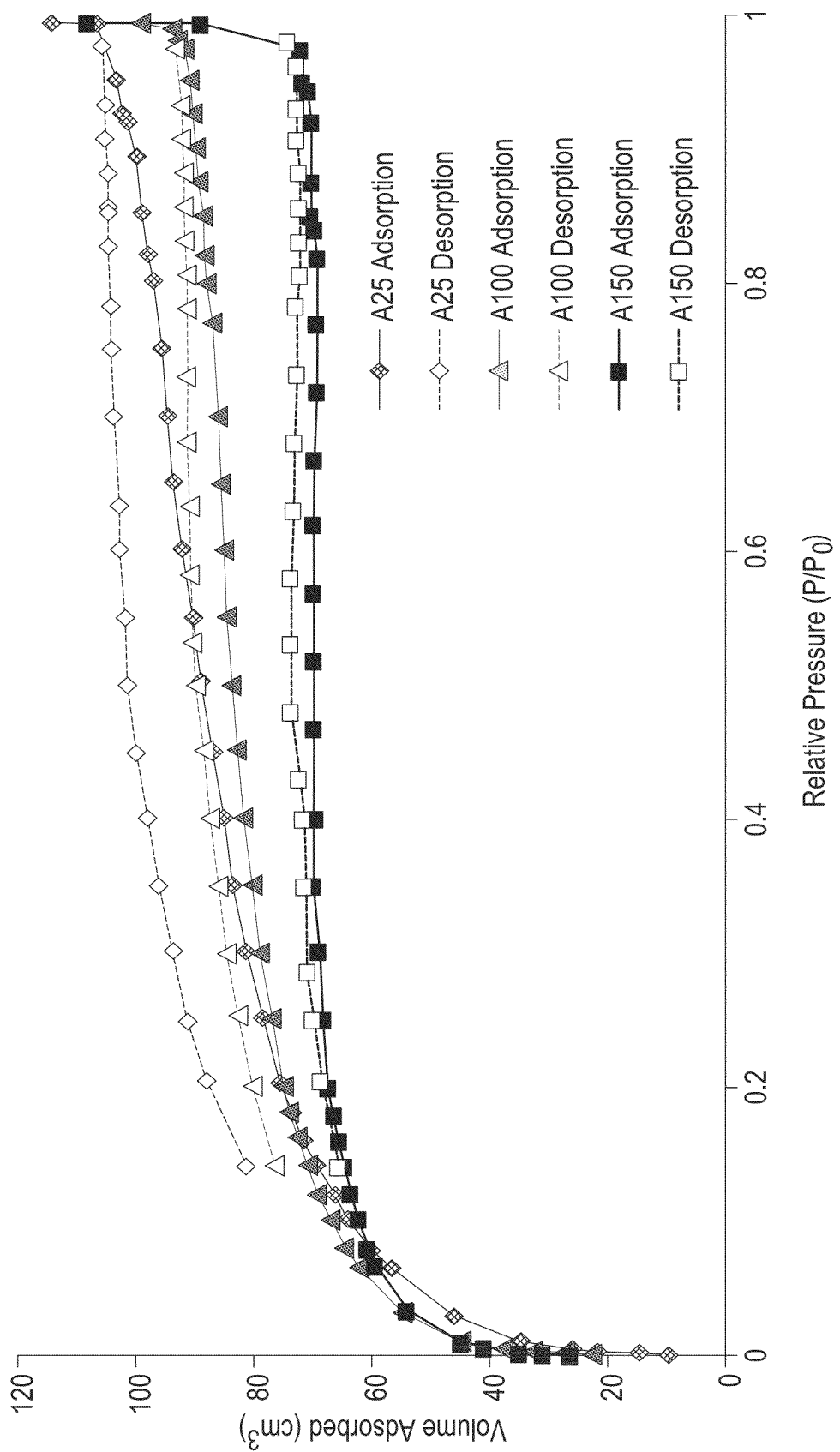
FIG. 19 depicts nitrogen adsorption-desorption isotherms for titanium hydride samples A-25, A-100 and A-150.
Figure 20:
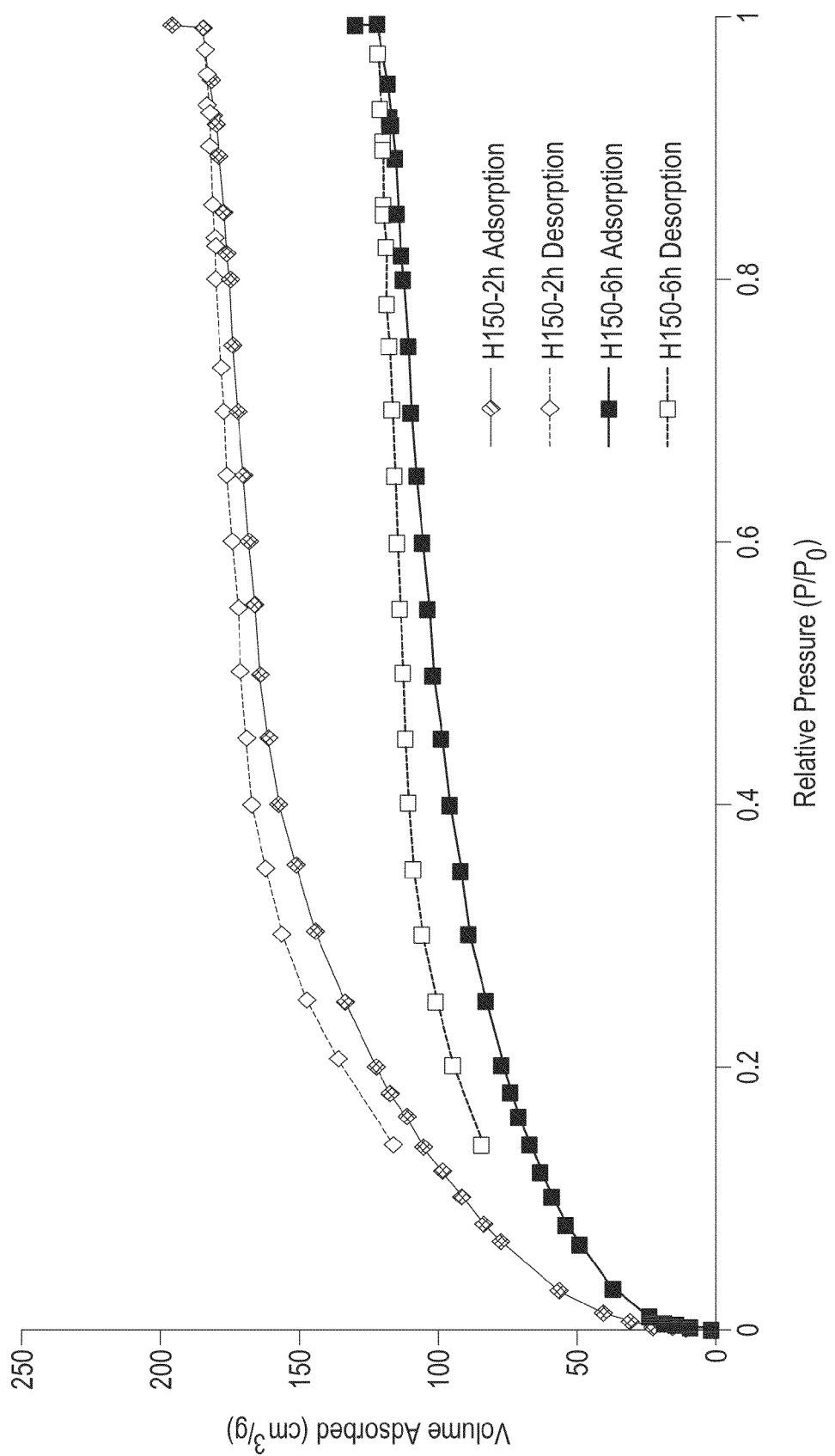
FIG. 20 depicts nitrogen adsorption-desorption isotherms for titanium hydride samples H-150-2 h an H-150-6 h.

Nitrogen adsorption-desorption isotherms for samples A-25, A-100 and A-150 recorded at 77 K are shown in FIG. 19. Nitrogen adsorption isotherms for samples H-150-2 h and H-150-6 h recorded at 77 K are shown in FIG. 20. As can be seen from FIGS. 19 and 20, the isotherms suggest that both materials before and after hydrogenation are microporous, as reflected in the steep increases in volume adsorbed at low P/P$_o$, relative pressure.

Table 1 shows the C, H and Ti elemental analysis for samples A-100 and A-150-6 h.

TABLE 1

| Material | Carbon (%) | Hydrogen (%) | Titanium (%) |
|---|---|---|---|
| A-100 | 27.74 | 6.41 | 39.82[a] |
| H-150-6h | 18.55 | 4.25 | 57.83[a] |

[a]determined from thermogravimetric analysis.

Table 2 shows the Brunauer-Emmett-Teller (BET) surface area and skeletal density for samples A-25, A-100, A-150, H-150-2 h, H-150-6 h and H-180-2 h.

TABLE 2

| Material | BET Surface Area (m$^2$/g) | Skeletal Density (g/cm$^3$) |
|---|---|---|
| A-25 | 276 | 1.4120 |
| A-100 | 265 | 1.3308 |
| A-150 | 232 | 1.5730 |
| H-150-2h | 499 | 0.9879 |
| H-150-6h | 310 | 1.2703 |
| H-180-2h | N/D | 1.1237 |

N/D: Not determined

The specific surface area of all the samples decreases with increasing drying temperature from 25 to 150° C. For example, heating sample A-25 under vacuum to 150° C. results in a decrease of the BET surface area from 276 m$^2$/g to 232 m$^2$/g. Hydrogenation, however, leads to an increase in the BET surface area. For example, hydrogenation of sample A-100 at 80 bar hydrogen pressure, 150° C., for 2 hours increases the BET surface area from 265 m$^2$/g to 499 m$^2$/g. Prolonged heating for 6 hours under these conditions, however, leads to a lowering of surface area to 310 m$^2$/g. Without wishing to be bound by theory, Applicants theorize that hydrogenation opens up pore space by eliminating alkyl groups. This is followed by slow structural collapse upon prolonged exposure to high temperatures.

Figure 21:
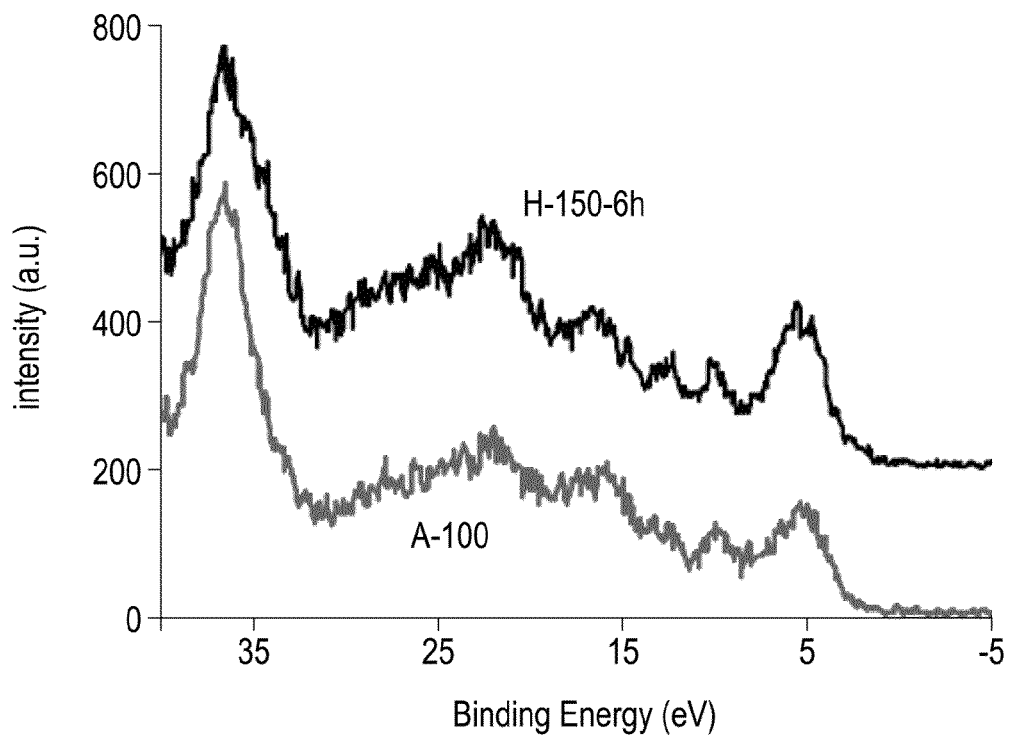
FIG. 21 depicts the valence region of an X-ray photoelectron spectroscopy (XPS) spectrum for titanium hydride samples A-100 and H-150-6 h.
Figure 22:
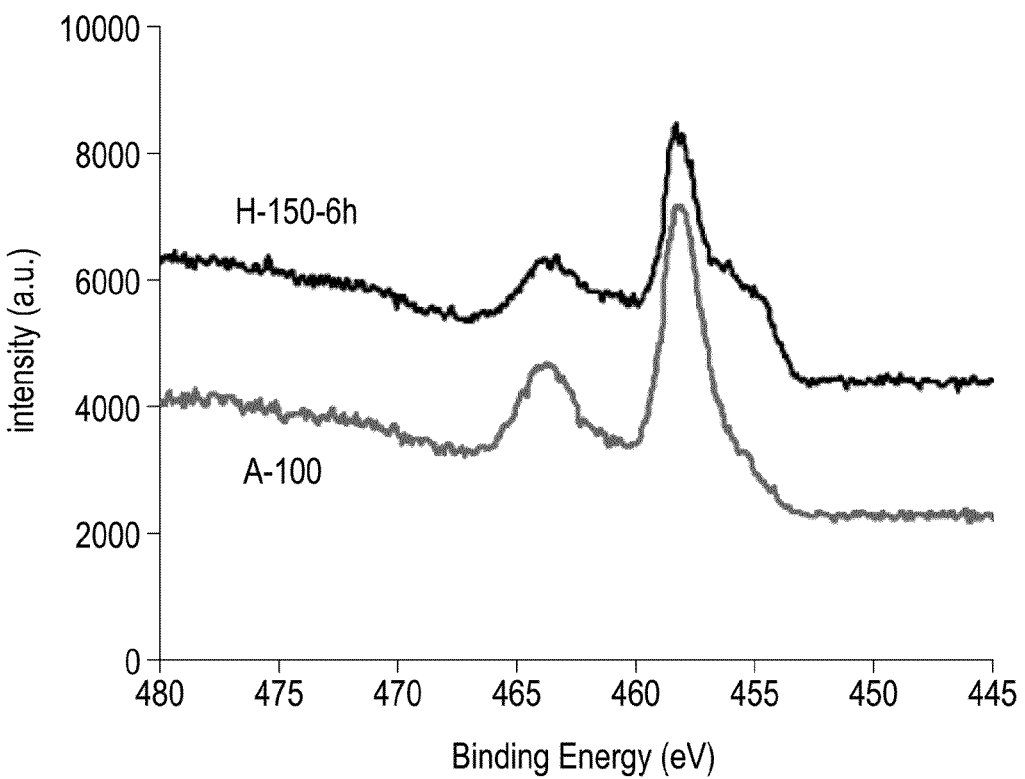
FIG. 22 depicts the titanium 2p1/2 and 2p3/2 region of the XPS spectrum for titanium hydride samples A-100 and H-150-6 h.
Figure 23:
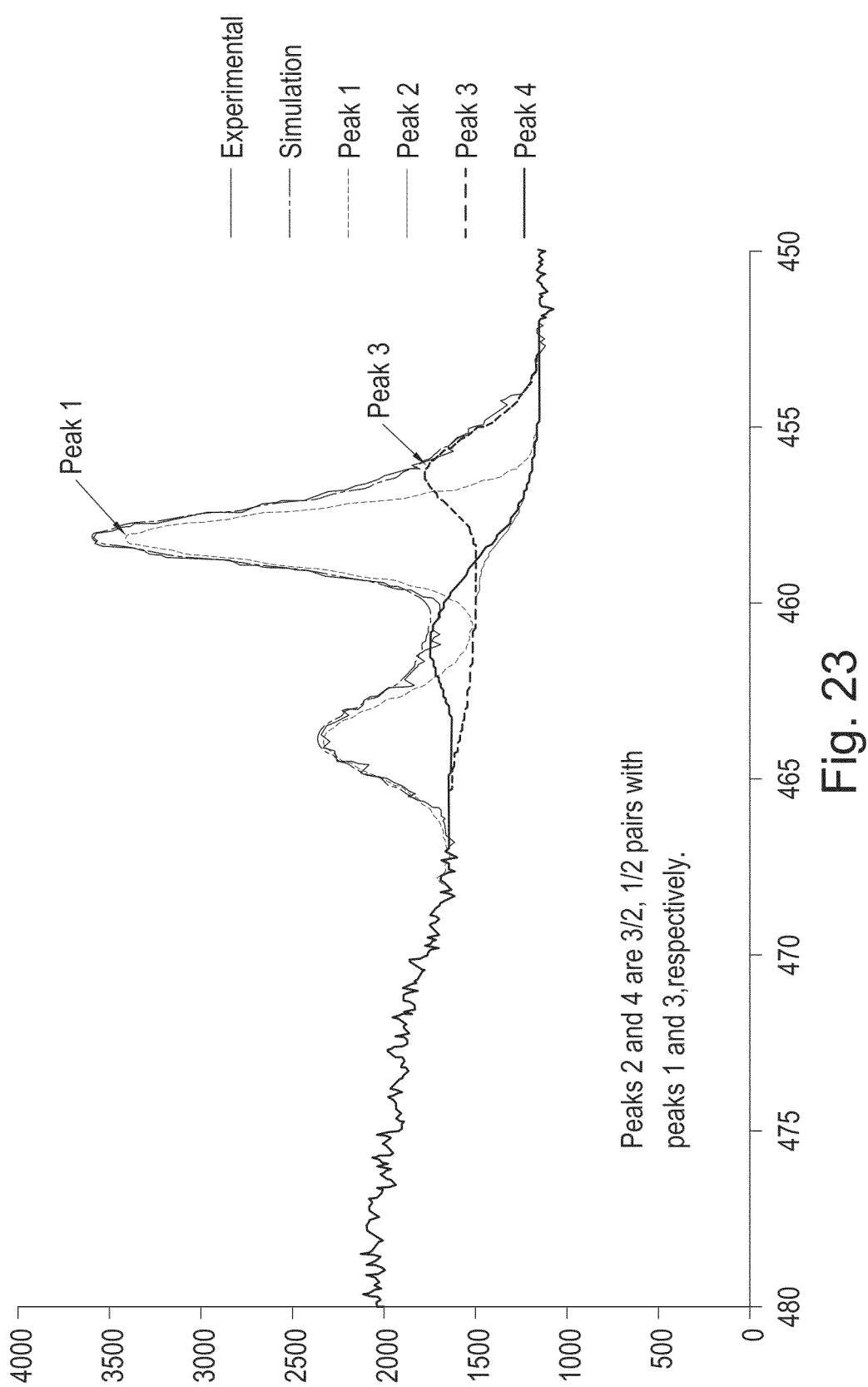
FIG. 23 depicts the peak fitting of titanium 2p1/2 and 2p3/2 emissions in the XPS spectrum for titanium hydride sample A-100.
Figure 24:
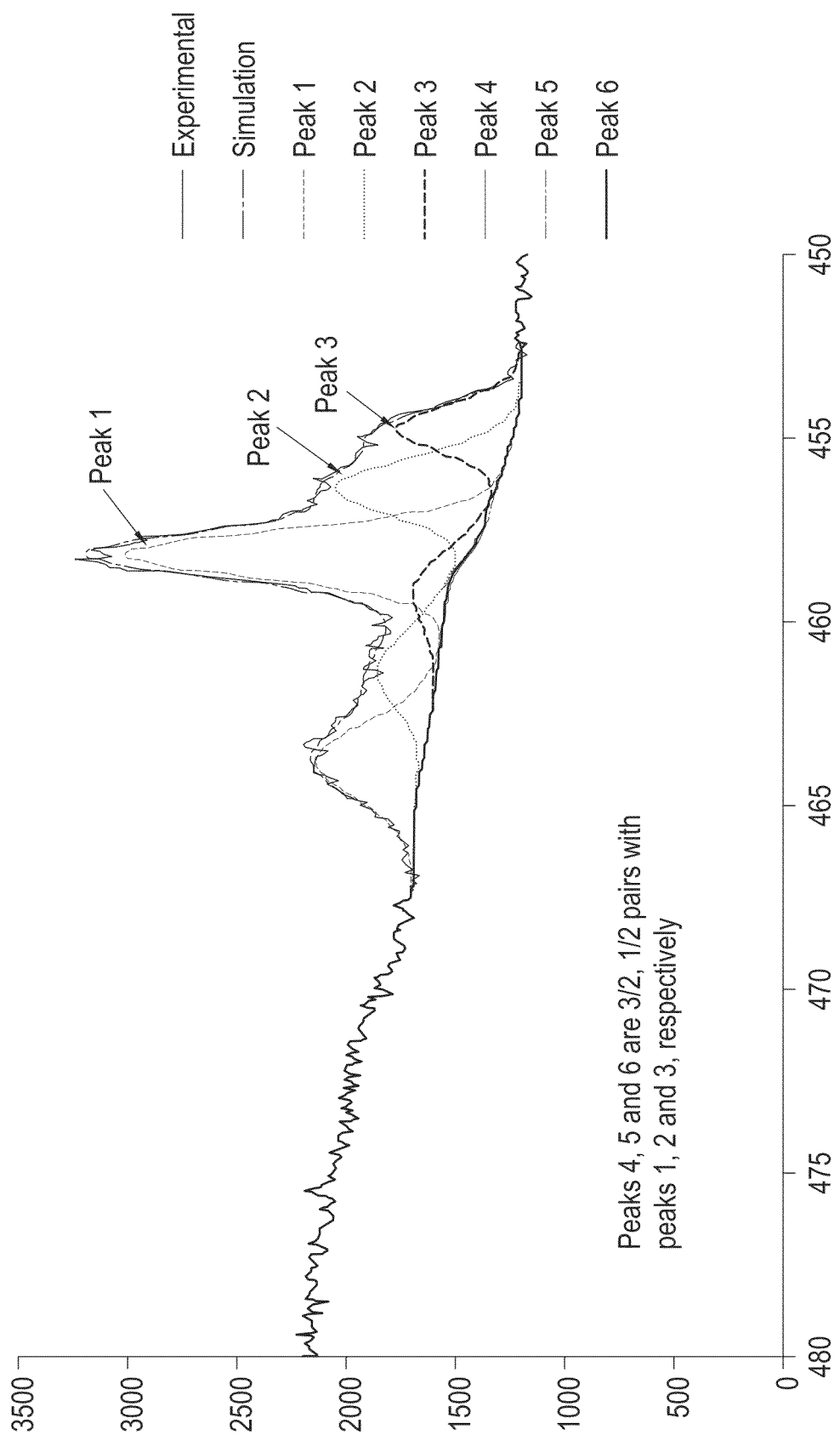
FIG. 24 depicts the peak fitting of titanium 2p1/2 and 2p3/2 emissions in the XPS spectrum for titanium hydride sample H-150-6 h.
Figure 25:
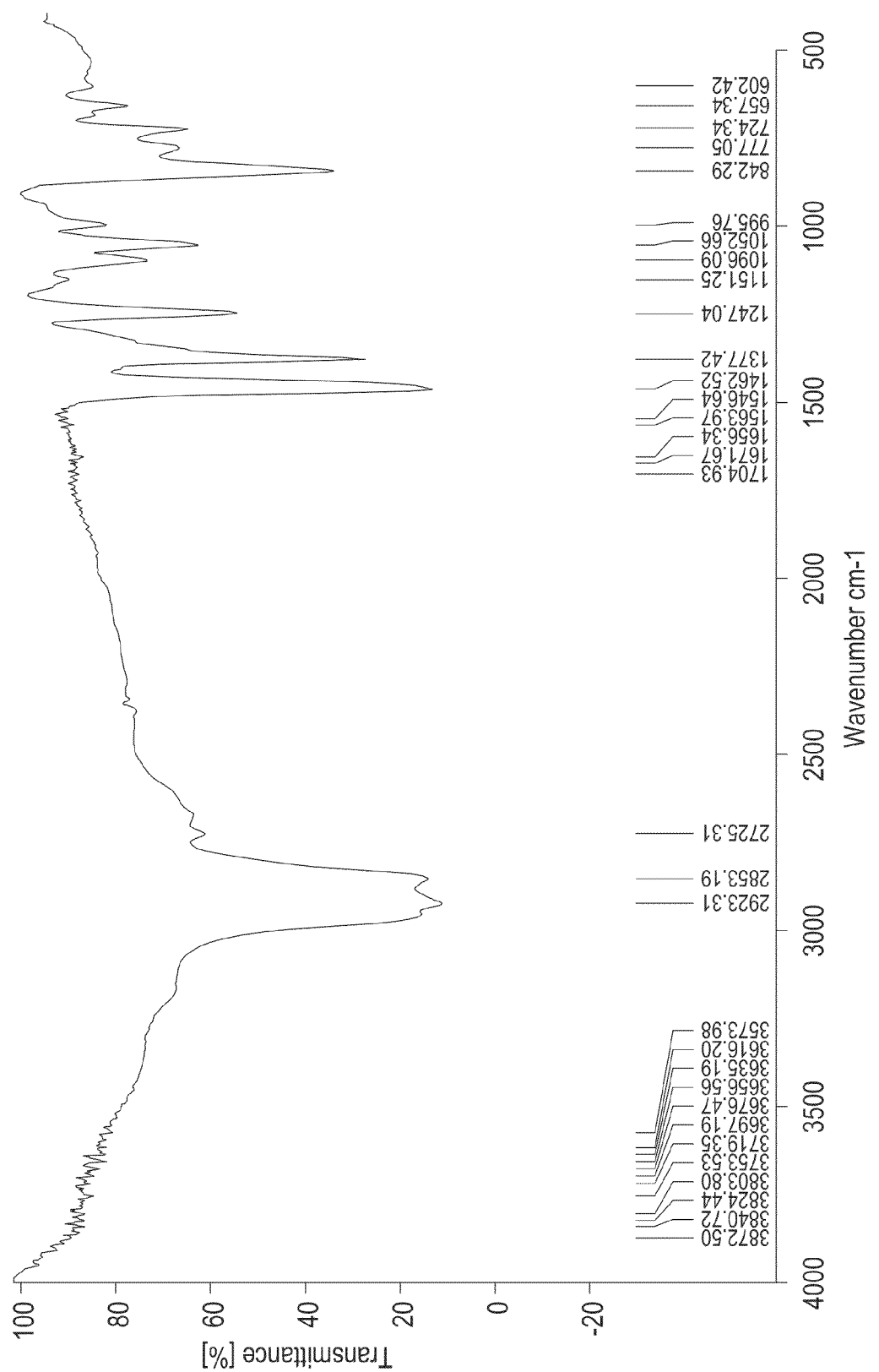
FIG. 25 depicts an infrared (IR) spectrum of titanium hydride sample A-25.
Figure 26:
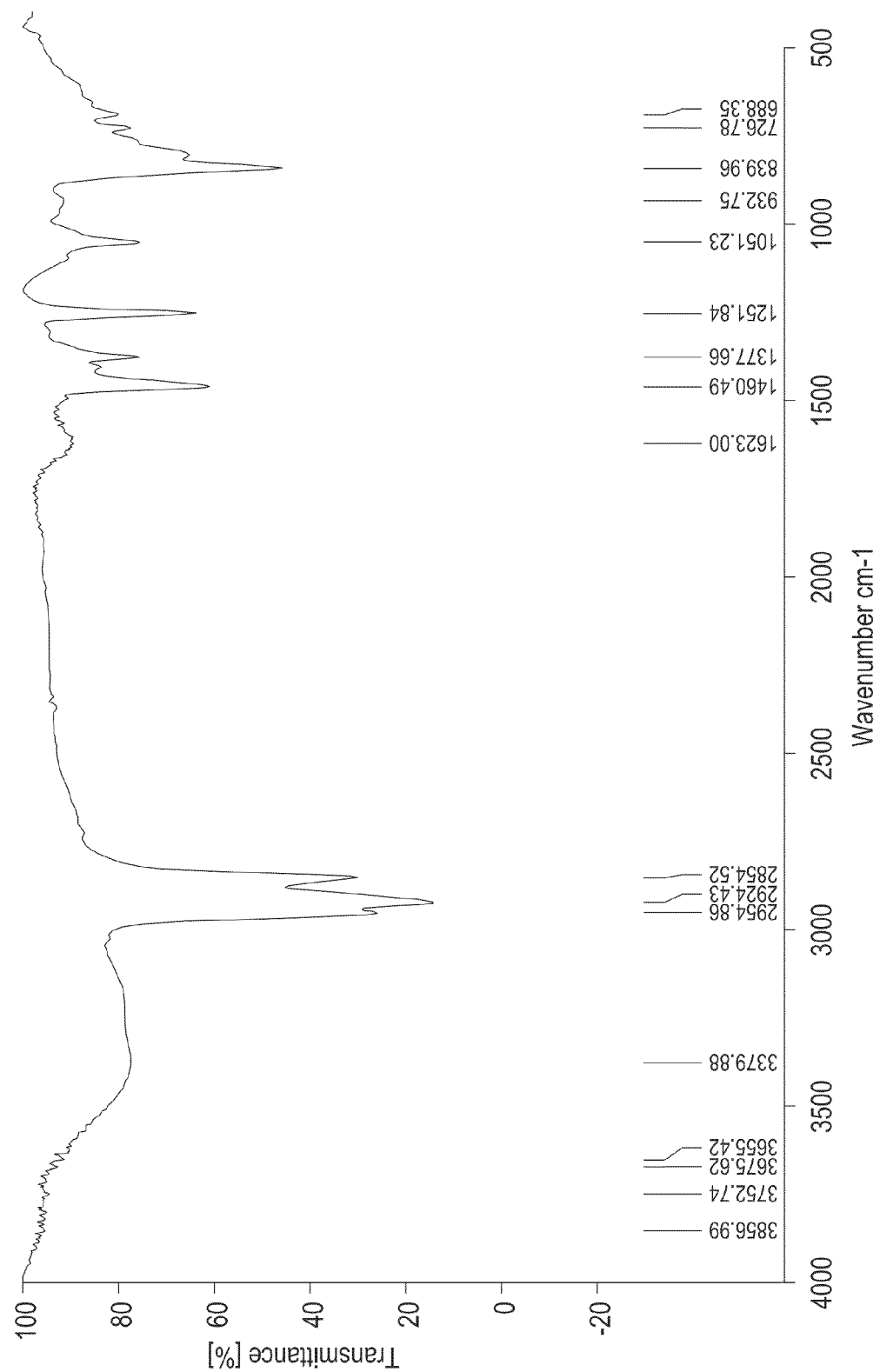
FIG. 26 depicts an IR spectrum of titanium hydride sample A-100.
Figure 27:
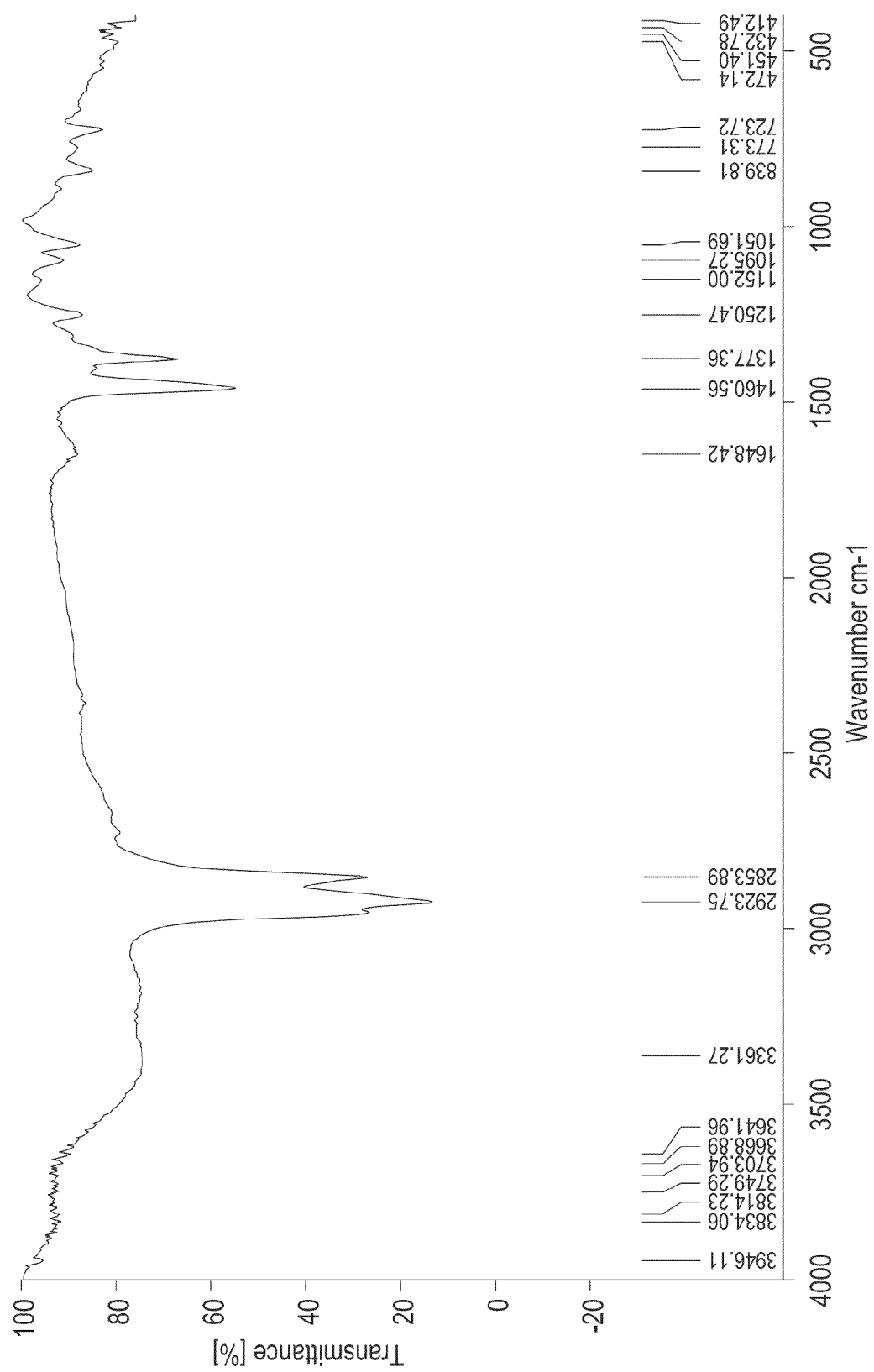
FIG. 27 depicts an IR spectrum of titanium hydride sample A-150.
Figure 28:
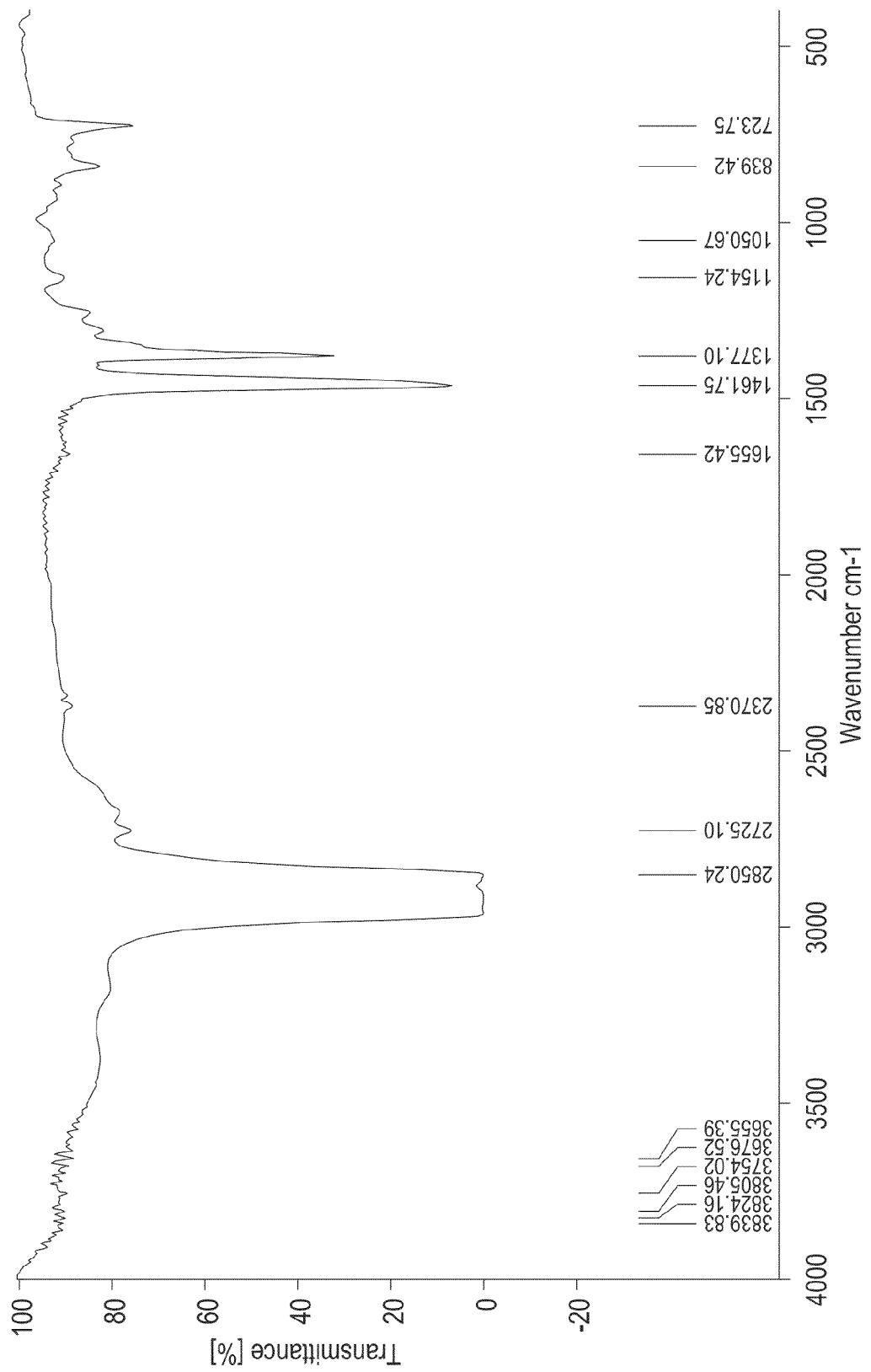
FIG. 28 depicts an IR spectrum of titanium hydride sample H-150-2 h.
Figure 29:
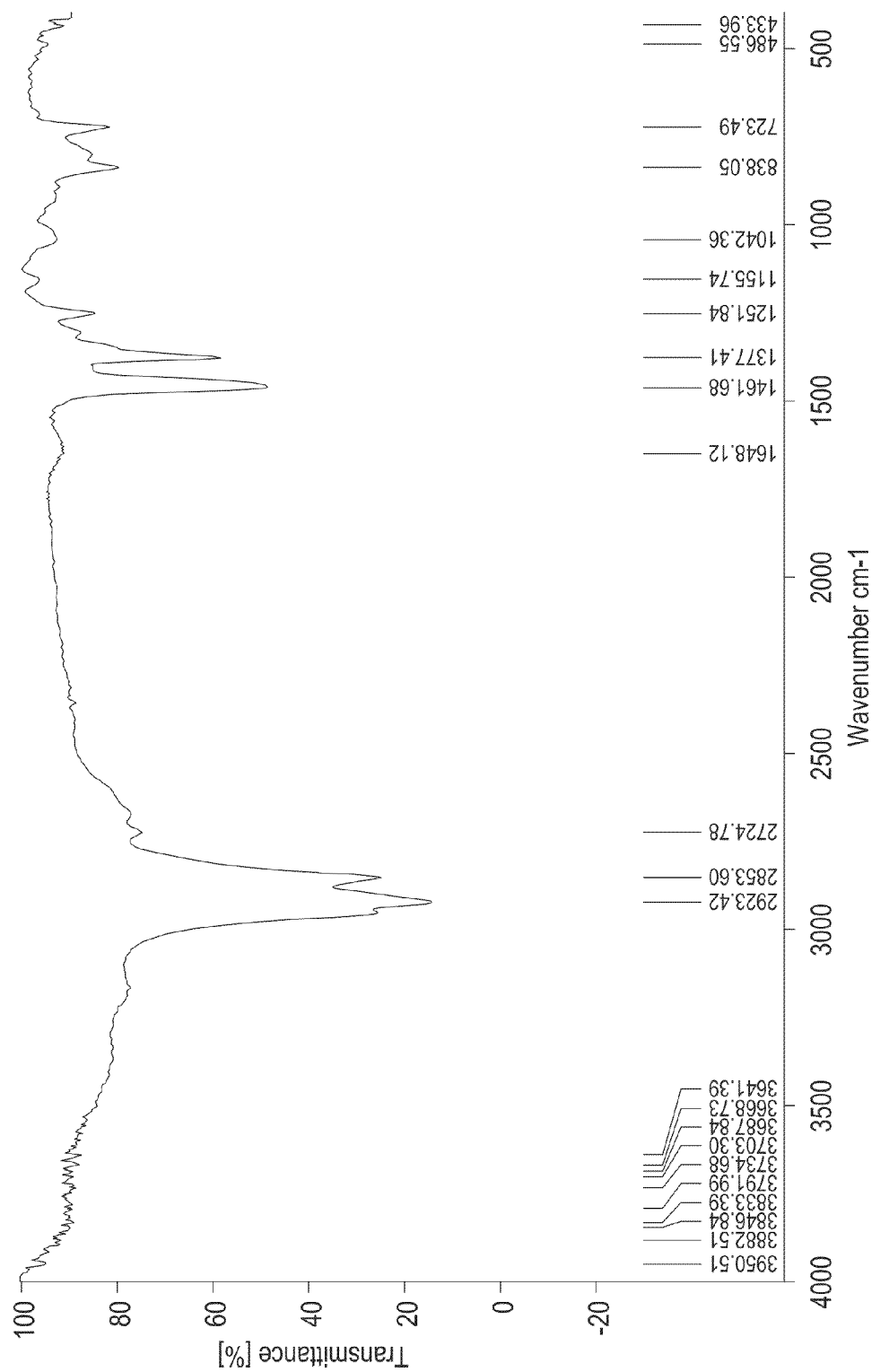
FIG. 29 depicts an IR spectrum of titanium hydride sample H-150-6 h.

X-ray Photoelectron Spectroscopy (XPS) spectra for samples A-100 and H-150-6 h are shown in FIGS. 21 and 22. No charge neutralization was required and emissions are observed close to the Fermi level, suggesting that these materials are semi-metals or semiconductors. Two major emissions are observed in the Ti 2p region, which could be resolved into two species for sample A100 (FIG. 23) and three species for sample H-150-6 h (FIG. 24) by peak fitting. By comparison with literature values (see, e.g., Vettraino et al., *J. Am. Chem. Soc.*, 124, 9567, 2002) the emissions at 458.0 eV and 463.5 eV correspond to Ti(III) species, likely containing only two hydride ligands, which is consistent with 0.22 and 0.45 alkyl groups remaining in samples H-150-6 h and A-100, respectively. The emissions at 456.1 eV and 460.9 eV can be assigned to a Ti(III) species in which all three alkyl groups have been replaced by a hydride. Without wishing to be bound by theory, Applicants theorize that this assignment to a Ti (III) species is correct because (i) the Ti 2p 3/2 emission of all Ti(IV) species fall above 458.8 eV (see, e.g., Bender et al., *Appl. Surf. Sci.*, 38, 37, 1989), (ii) the Ti 3p emission of Ti(IV) generally falls at 37.5 eV or higher (see, e.g., Riga et al., *Phys. Scripta.*, 16, 35, 1977) while an emission at 36.5 eV was observed for samples A-100 and H-1506 h (FIG. 21), (iii) the 3/2 emission of TiN is observed at 455.8 eV, and (iv) a Ti—H stretch is observed in the IR spectrum of both sample A-100 and sample H-150-6 h at ~1600 cm$^{-1}$ (FIGS. 26 and 29).

Applicants also theorize that the third 3/2, 1/2 emission observed in sample H-150-6 h at 454.5 eV and 458.8 eV may be assigned to a second Ti (III) hydride, possibly a terminal rather than a bridging hydride (see, e.g., Lisowski et al., *Surf. Interface Anal.*, 29, 292, 2000), since the metal center of a terminal metal hydride is expected to be more electron rich than that of a bridging hydride, although the possibility that this is a lower oxidation state of Ti, such as Ti (II), cannot be ruled out since ligand effects and local geometry have a large effect on the binding energies. For comparison, the Ti 2p 3/2 emission for Ti metal is observed at 453.8 eV, that of TiB$_2$ is observed at 454.3 eV, and this emission for TiO is observed at 455.1 eV. Thus, without being bound by theory, Applicants theorize that a titanium hydride described herein may be non-stoichiometric, i.e., a mixture of oxidation states, such as Ti (III) and Ti (II).

Infra-red (IR) spectra for samples A-25, A-100, A-150, H-150-2 h and H-150-6 h are shown in FIGS. 25-29, respectively.

Figure 30:
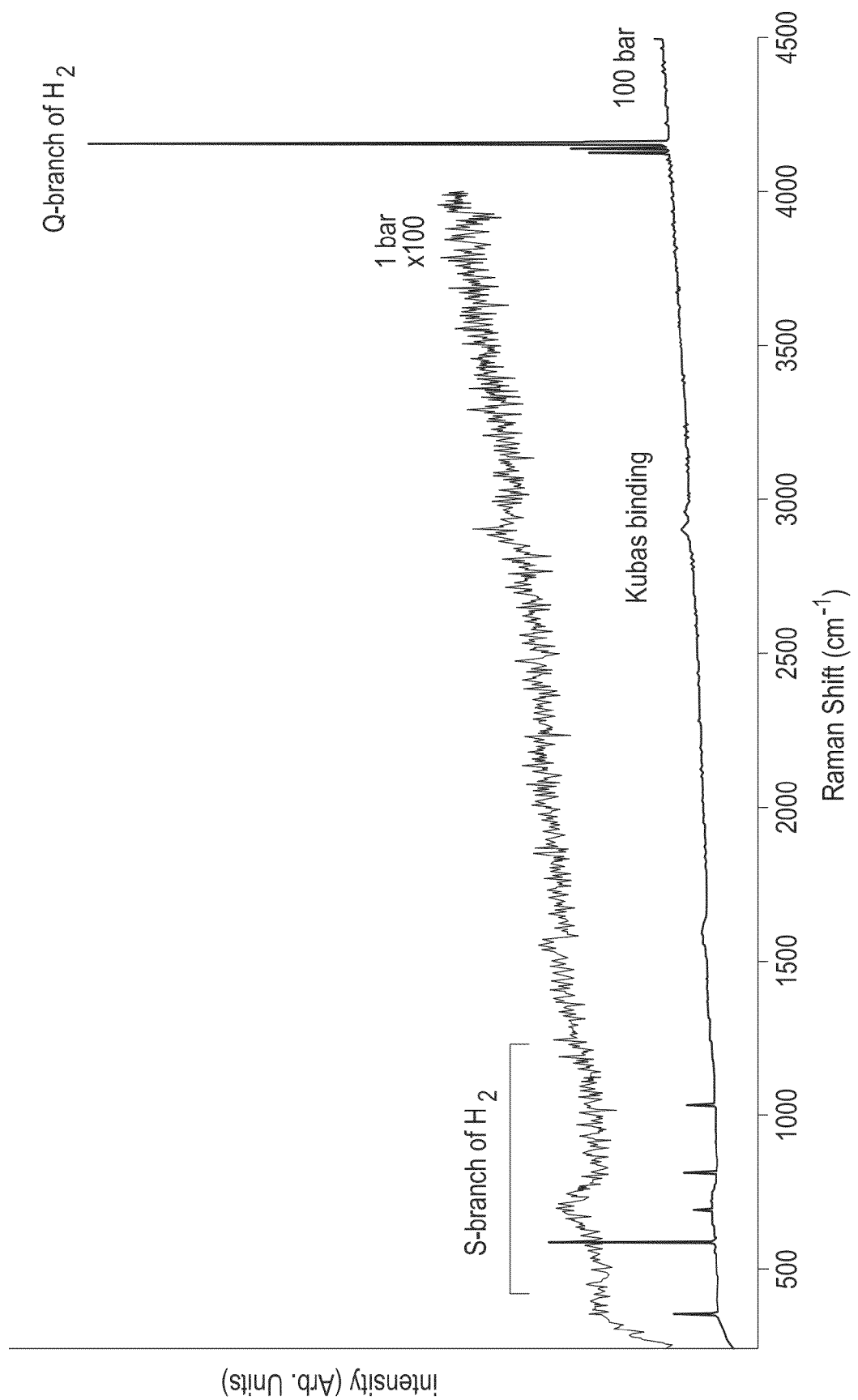
FIG. 30 depicts a high pressure Raman spectrum of titanium hydride sample H-150-6 h at 1 bar and 100 bar of hydrogen pressure.
Figure 31:
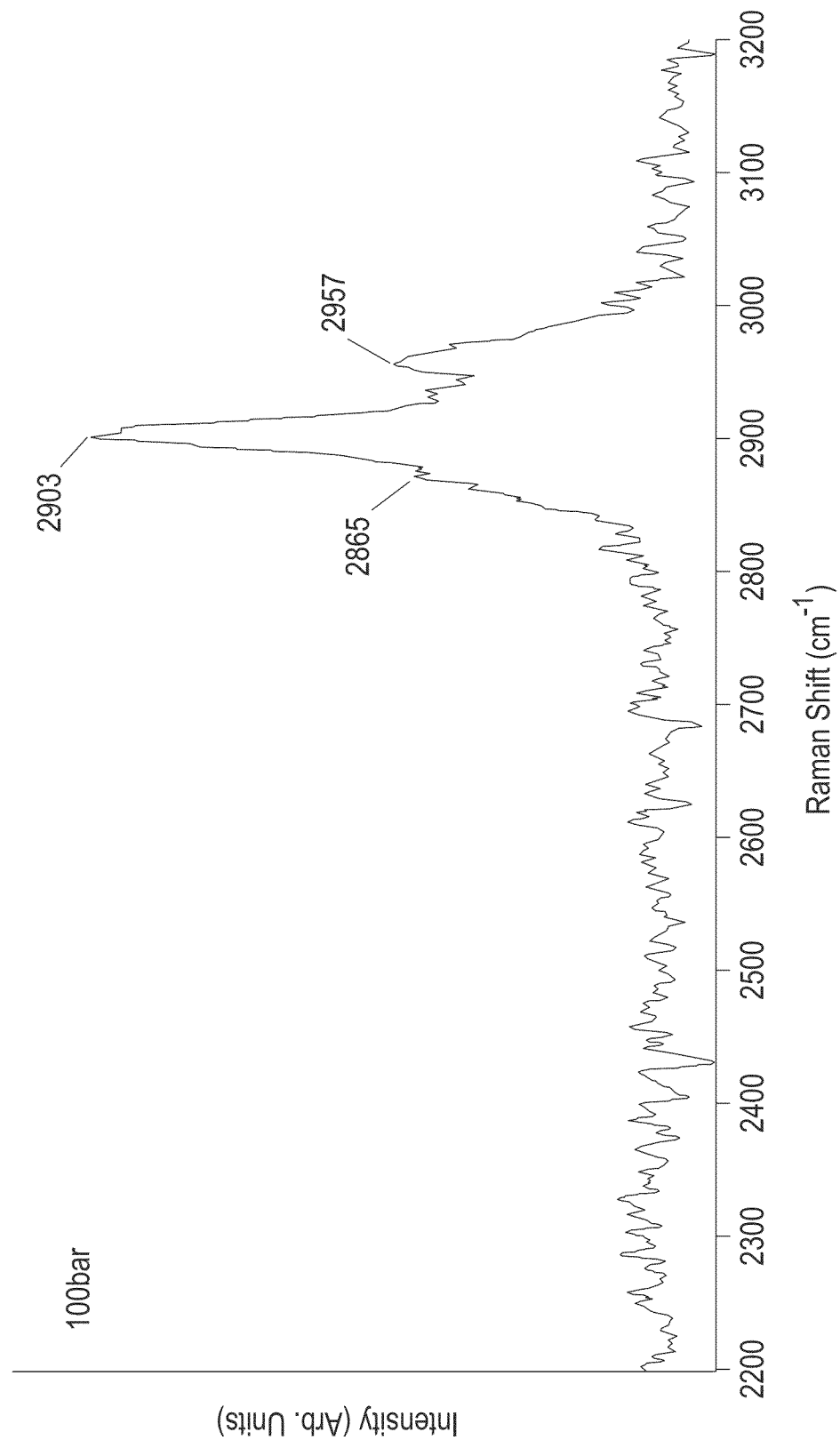
FIG. 31 depicts a high pressure Raman spectrum of titanium hydride sample H-150-6 h at 100 bar of hydrogen pressure.

In order to explore the mechanism of hydrogen binding to the titanium center, high pressure Raman studies were undertaken up to a pressure of 100 bar. FIG. 30 shows the Raman spectra for sample H-150-6 h at a pressure of 1 bar and 100 bar under high purity H$_2$. As can be seen from FIG. 30, at a pressure of 1 bar there is a very small signal centered at 2903 cm$^{-1}$, likely corresponding to a Kubas interaction H$_2$ ligand. This is known to undergo a bathochromic shift, corresponding to an increasing H—H bond length in the bound hydrogen (see, e.g., Heinekey et al., *Chem. Rev.*, 93, 913, 1993). Expansion of this section of the Raman spectrum (FIG. 31) reveals that this signal is actually three signals at 2865 cm$^{-1}$, 2903 cm$^{-1}$, and 2957 cm$^{-1}$. This suggests that three different binding sites are present and/or there are multiple H$_2$ ligands on the same metal center, as expected from the amorphous structure of the material. As the pressure is raised, the Kubas interaction resonances gradually increase in intensity until a pressure of 100 bar is reached. As can be seen from FIG. 30, the spectrum at a pressure of 100 bar exhibits the same proportion of the binding sites as the ground state structure. The Q and S branch of physisorbed hydrogen is also visible at this pressure (see, e.g., Centrone et al., Chem. Phys. Let., 411, 516, 2005). This demonstrates that there is a mixture of physisorption and Kubas interaction absorption in these materials. As the pressure is released, a decrease in the intensity of these resonances to the ground state structure is observed. Again, without wishing to be bound by theory, Applicants theorize that the Raman spectra shown in FIGS. 30 and 31 support a binding mechanism in which a twisting of the metal hydride structure as the hydrogen pressure is increased gradually opens up new Kubas type binding sites, which then close as the pressure is released and the material recoils to the ground state structure. Surprisingly, such a twisting of the structure is energetically the opposite to the binding of the H$_2$ ligands, for which computations have shown that the magnitude is comparable. Applicants theorize that the excess enthalpy of hydrogen binding (over 30 kJ/mol) is absorbed by the system and that the energy required to desorb the system at 298 K is provided by the release and recoil of the structure, making the total enthalpy of adsorption and desorption closer to thermodynamically neutral.

Hydrogen Adsorption Studies

Figure 32:
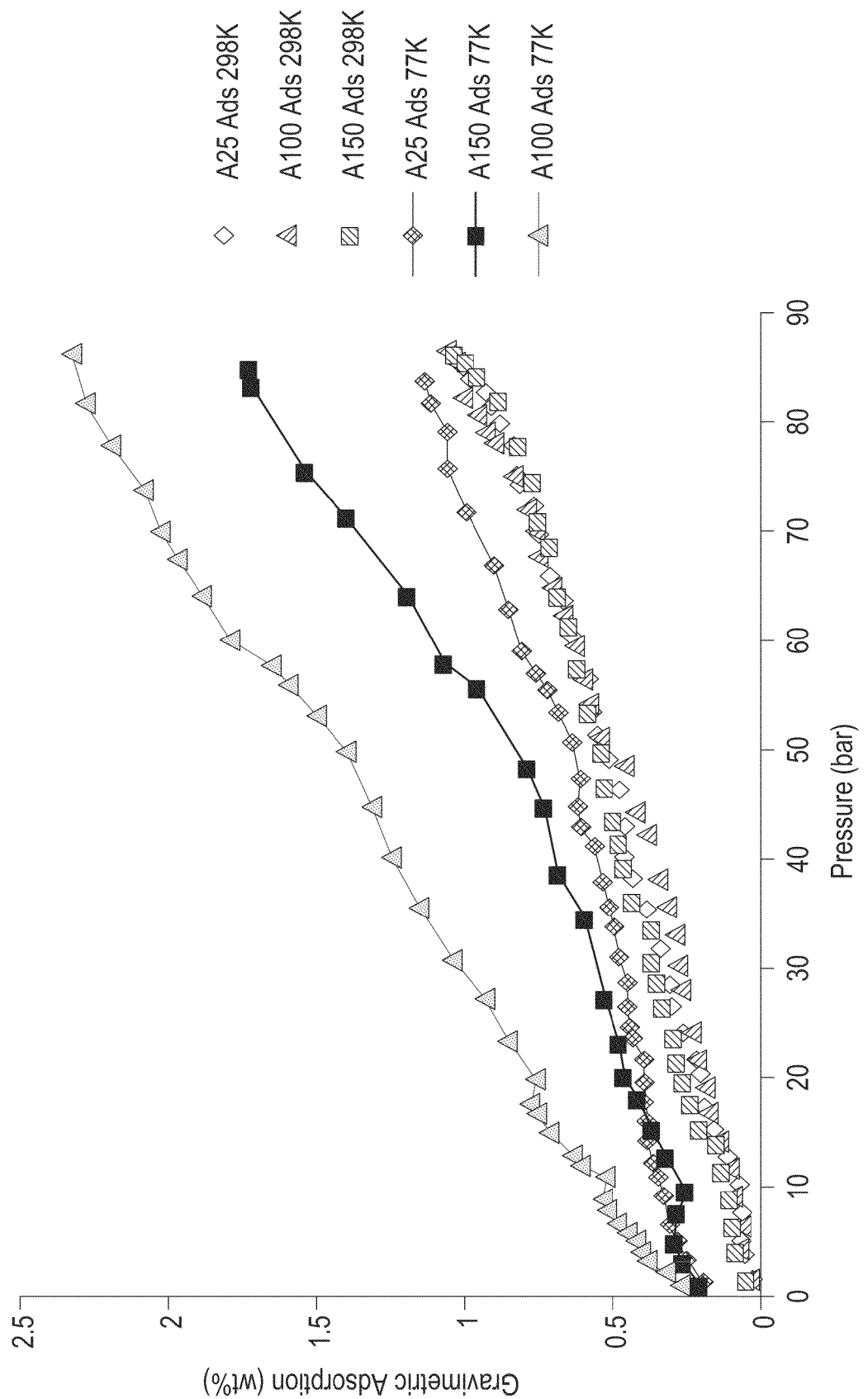
FIG. 32 depicts hydrogen adsorption isotherms for titanium hydride samples A25, A100 and A150 at 77K and 298 K. Desorption isotherms have been omitted for clarity.
Figure 33:
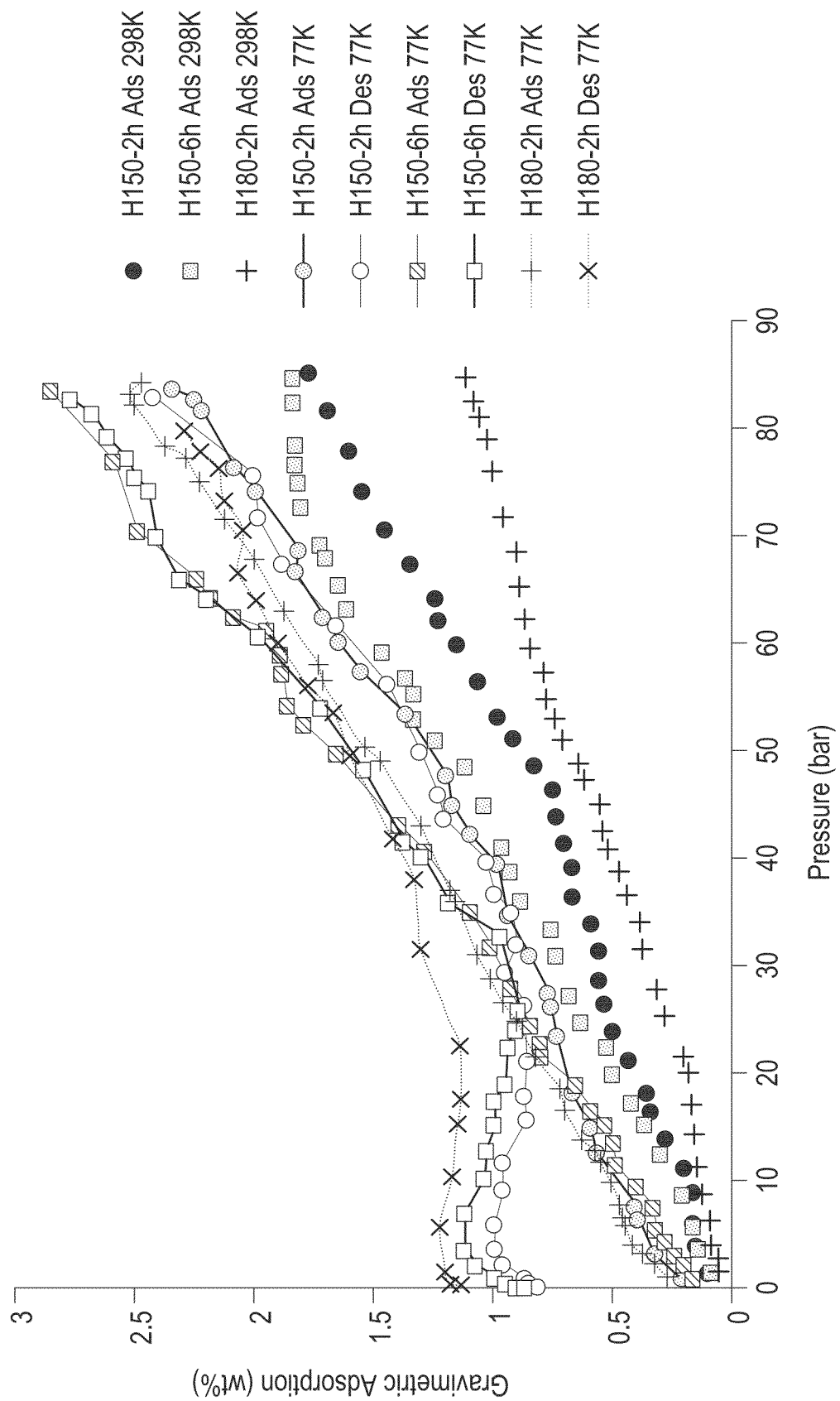
FIG. 33 depicts hydrogen adsorption-desorption excess storage isotherms for titanium hydride samples H150-2 h, H150-6 h and H180-2 h.

The excess gravimetric storage isotherms for samples A-25, A-100 and A-150 are shown in FIG. 32. The excess gravimetric storage isotherms for samples H-150-2 h, H-150-6 h and H-180-2 h are shown in FIG. 33. As can be seen from FIGS. 32 and 33, linear adsorption behavior versus pressure is observed for all titanium hydride samples in A- and H-series, both at 77 K and 298 K.

Table 3 summarizes the excess storage results (gravimetric adsorption, true volumetric adsorption and percent retention) for samples A-25, A-100, A-150, H-150-2 h, H-150-6 h and H-180-2 h. Unless otherwise indicated, all data is measured at a hydrogen pressure of 85 bar. Comparative data for carbon AX-21, an amorphous high surface area carbon available from, e.g., Anderson Development Co., Adrian, Mich. (BET surface area of 3224 m$^2$/g and skeletal density of 2.1030 g/cm$^3$) and MOF-5 (BET surface area of 3534 m$^2$/g) is also provided.

TABLE 3

| Material | Gravimetric Adsorption (wt. %) | True Volumetric Adsorption (kg H$_2$/m$^3$) | Retention (%) |
|---|---|---|---|
| A-25 | 1.13 (at 77 K) | 16 (at 77 K) | 88 |
|  | 1.00 (at 298 K) | 14.1 (at 298 K) |  |
| A-100 | 2.32 (at 77 K) | 31 (at 77 K) | 46 |
|  | 1.06 (at 298 K) | 14.1 (at 298 K) |  |
| A-150 | 1.72 (at 77 K) | 27 (at 77 K) | 60 |
|  | 1.03 (at 298 K) | 16.2 (at 298 K) |  |
| H-150-2h | 2.34 (at 77 K) | 23 (at 77 K) | 76 |
|  | 1.77 (at 298 K) | 17.5 (at 298 K) |  |
| H-150-6h | 2.80 (at 77 K) | 36 (at 77 K) | 66 |
|  | 1.84 (at 298 K) | 23.4 (at 298 K) |  |
| H-180-2h | 2.76 (at 77 K) | 31 (at 77 K) | 39 |
|  | 1.09 (at 298 K) | 12.2 (at 298 K) |  |
| AX-21 | 4.2 (at 77 K) (65 bar) | 14 (at 77 K) (65 bar) | 13 |
|  | 0.55 (at 298 K) (65 bar) |  |  |
| MOF-5[a] | 5.10 (at 77 K) | — | 5.5 |
|  | 0.28 (at 298 K) |  |  |

[a]See, *Science*, 2003, Vol. 300, No. 5622, 1127-1129, 2003

The gravimetric and volumetric adsorption (without saturation) of sample H-150-6 h is 1.84 wt. % at 298 K, with a volumetric density of 23.4 kg H$_2$/m$^3$. This value is over three times that of compressed gas under the same conditions. At 77 K, sample H-150-6 h adsorbs 2.80 wt. %, with a volumetric density of 36 kg H$_2$/m$^3$. This volumetric performance is greater than the value of 32 kg H$_2$/m$^3$ observed for MOF-177 (see Orimo et al., *Chem. Rev.*, 107, 4111-4132, 2007, and Wong-Foy et al. *J. Am. Chem. Soc.*, 128, 3494, 2006). Hysteresis was observed on all samples in the H-series at 77 K. Application of a vacuum (10$^{-3}$ torr for 5 minutes) was required to drive out the ~35% adsorption capacity remaining at the end of adsorption-desorption cycles. No vacuum was required at 298 K.

By comparing the gravimetric adsorption at 298 K and 77 K, the retention of excess adsorption capacities can be calculated. As can be seen from Table 3, the retention values range from 39% to 88%. This is much higher than the retention values observed for MOF-5 and carbon AX-21, which retain 5.5% and 13.2%, respectively.

Figure 34:
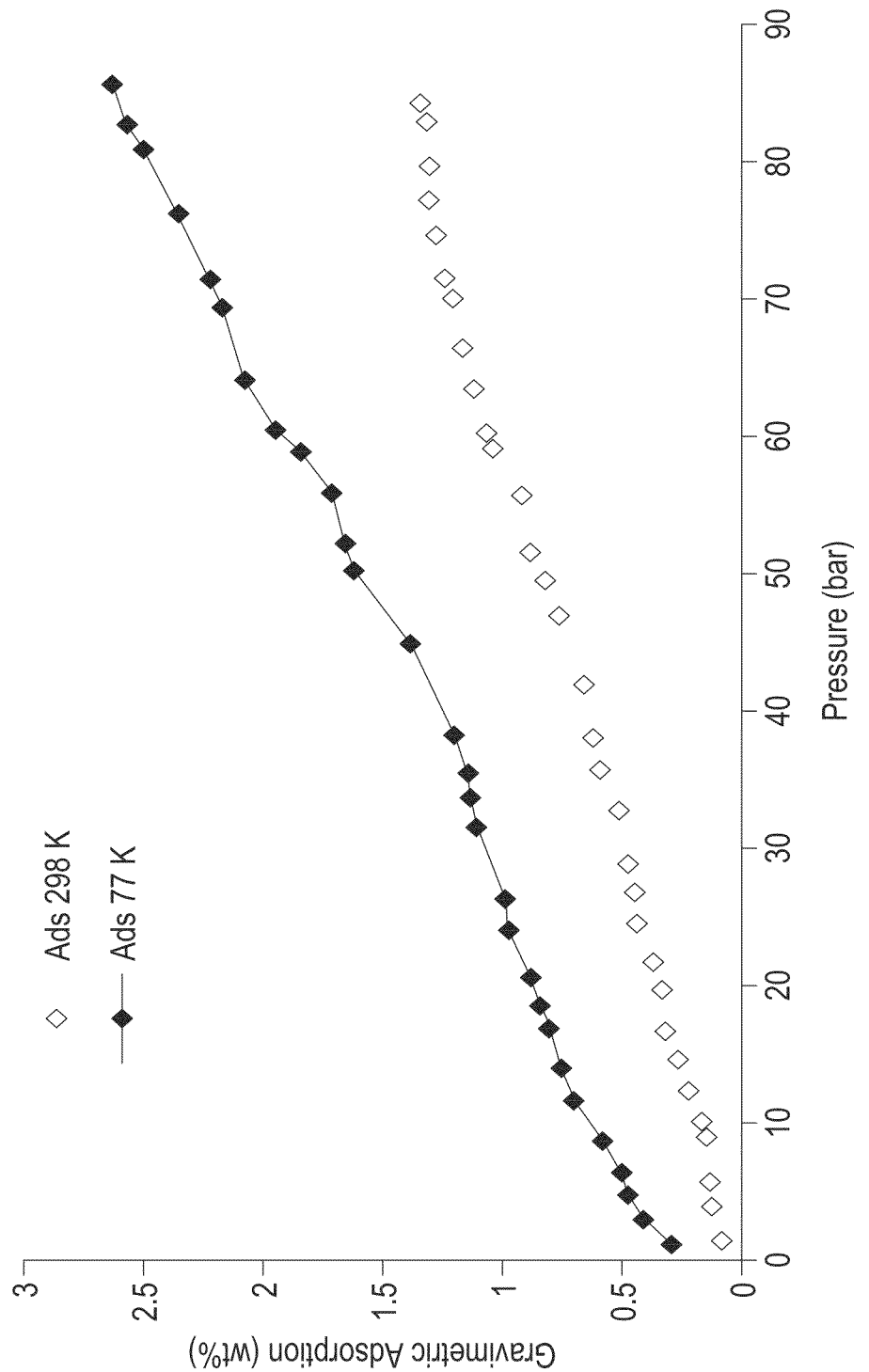
FIG. 34 depicts hydrogen adsorption excess storage isotherms at 77K and 298K for a pellet of titanium hydride sample H150-6 h compressed at 500 psi.

Void space was removed from sample H-150-6 h by compression at 500 psi. The compressed material exhibits 1.34 wt. % and 2.63 wt. % gravimetric adsorption at 298 K and 77 K, respectively (85 bar). See FIG. 34. Without wishing to be bound to any particular theory, Applicants theorize that enhanced performance is not observed for the compressed sample due to loss of surface area or collapse of the structure. The average number of $H_2$ molecules adsorbed per Ti site for sample A-100 were 1.39 (77K) and 0.64 (298K). The average number of $H_2$ molecules adsorbed per Ti site for sample A-150-6 h were 1.16 (77K) and 0.76 (298K).

Figure 35:
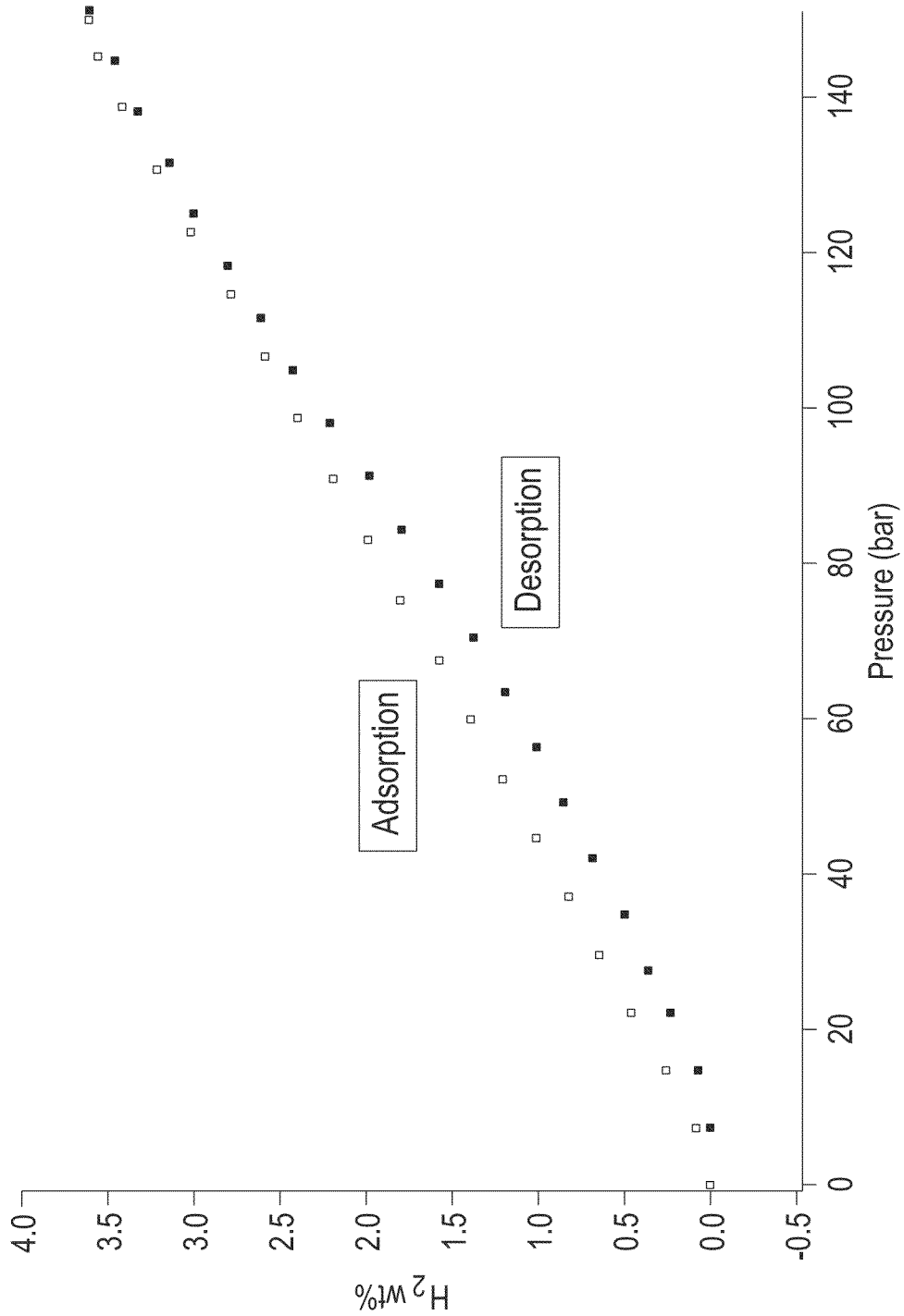
FIG. 35 depicts a hydrogen adsorption desorption isotherm at 298 K for titanium hydride sample H-150-6 h up to a hydrogen pressure of 140 bar.

FIG. 35 shows the excess storage isotherms up to 140 bar for sample H-150-6 h. As can be seen from FIG. 35, the gravimetric adsorption of sample H-150-6 h at 140 bar and 298 K is 3.49 wt. %, rising in a linear fashion without any evidence of saturation. This corresponds to a volumetric density of 44.3 kg/m$^3$, 3.88 times greater than compressed hydrogen at the same conditions (11.4 kg/m$^3$ according to the ideal gas law).

Figure 36:
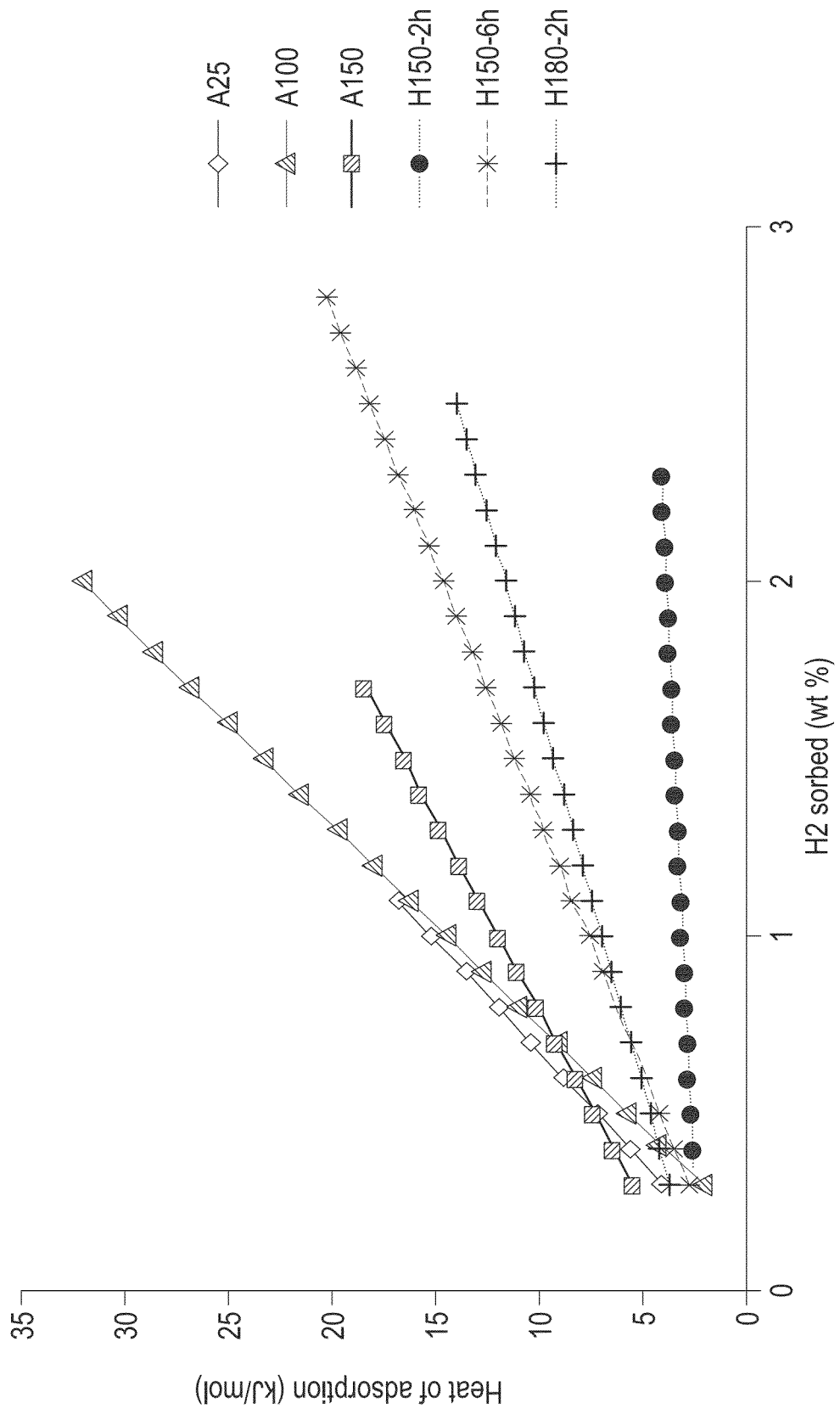
FIG. 36 depicts the heat of hydrogen adsorption for titanium hydride samples A25, A100, A150, H150-2 h, H150-6 h and H180-2 h.

By fitting the adsorption isotherms at 77 K and 87 K into the Clapeyron-Clausius equation, the isosteric heats of hydrogen adsorption can be calculated for both the A- and H-series samples. As can be seen from FIG. 36, the isoteric heat of adsorption for all the samples rises from a low of ~3 kJ/mol $H_2$ for sample A25 up to a maximum of 32 kJ/mol $H_2$ for sample A100. This contrasts strongly to the behavior of AX-21, which has enthalpies which decrease from 6 kJ/mol $H_2$ to 3.3 kJ/mol $H_2$, typical of physisorption. Without wishing to be bound by theory, Applicants theorize that a mechanism in which rising hydrogen pressure deforms the amorphous structure of the metal hydride, thereby progressively opening up more Kubas interaction binding sites which then close as the pressure is released and the material recoils to the ground state structure. This may explain the linear isotherms observed, as well as the rising enthalpies, which may thus be rationalized as a shifting weighted average between physisorption and Kubas interaction binding.

Example 3

Chromium Hydride Samples

Example 3a

Synthesis 50 ml of toluene was added to 6.043 g (26.69 mmol) of $Cr(CH(SiMe_3)_2)_2$ and the mixture was stirred to afford a dark purple solution. Hydrogen gas grade 6.0 was bubbled through the solution at room temperature. The residue was stirred in toluene/petroleum ether, then the resulting dark purple liquid was filtered to afford a green powder which was heated in vacuo 10$^{-3}$ torr for a further 4 hours at 100° C. to afford sample C-100A (BET surface area=24 m$^2$/g)

Repeating the process described above in the presence of 0.5 molar equivalents of methanol afforded sample C-100B as a dark grey solid (BET surface area=377 m$^2$/g).

Sample C-100A exhibits a gravimetric hydrogen adsorption of 0.16 wt. % at 122 bar. Sample C-100A was then charged with $H_2$ (85 bar) at 150 C for 2 hours, and evacuated (10$^{-3}$ torr) at 100° C. for 2 hours to afford sample C-100A2. The resulting material lost 222 mg in weight, indicating the likely removal of organic trimethylsilyl methyl groups. Sample C-100A2 has a BET surface area of 165 m$^2$/g and exhibits a gravimetric hydrogen adsorption of 0.37 wt. % at 120 bar.

Sample C-100B exhibits a gravimetric hydrogen adsorption of 0.36 wt. % at 140 bar. Sample C-100B was then charged with $H_2$ (85 bar) at 150° C. for 2 hours, and evacuated (10$^{-3}$ torr) at 100° C. for 2 hours to afford sample C-100B2. The resulting material lost 260 mg in weight, indicating the likely removal of organic trimethylsilylmethyl groups.

Sample C-100B2 has a BET surface area of 391 m$^2$/g and exhibits a gravimetric hydrogen adsorption of 0.49 wt. % at 133 bar.

Example 3b $CrH_2$

Synthesis

To a stirred suspension of $CrCl_3(THF)_3$ (9.433 g, 25.18 mmol) in 40-60° C. petroleum ether, was added a solution of (trimethylsilyl)methyl lithium (75.54 mmol, 75.54 mL of a 1.0 M solution in hexane/pentane). The colour of the slurry immediately changed to dark purple. The mixture was then stirred at room temperature for 3 hours, then filtered, and the residue was washed with three portions of hexane (10 ml each). The dark purple filtrate was concentrated and dried at room temperature in vacuo (10$^{-3}$ torr) for 24 hours to afford bis[(trimethylsilyl)methyl]chromium (II) as a dark purple crystalline solid (4.5324 g, 80% yield).

Bis[(trimethylsilyl)methyl]chromium (II) (4.5235 g, 20.03 mmol) was stirred in 50 mL of dry toluene to give a dark purple solution. The reaction was stirred under 1 bar of hydrogen gas at room temperature for 14 days. The reaction mixture was filtered to afford a green precipitate and a dark purple filtrate. The precipitate was washed with 3×10 mL portions of 40-60° petroleum ether and dried in vacuo (10$^{-3}$ torr) at 100° C. to afford sample CrH-100 as a green powder (1.2151 g).

Sample CrH-100 was hydrogenated at a pressure of 85 bar for two hours at 150° C. (resulting in a 26% loss in weight of the sample) to afford sample CrH-150-$H_2$.

Sample Characterization

Figure 37:
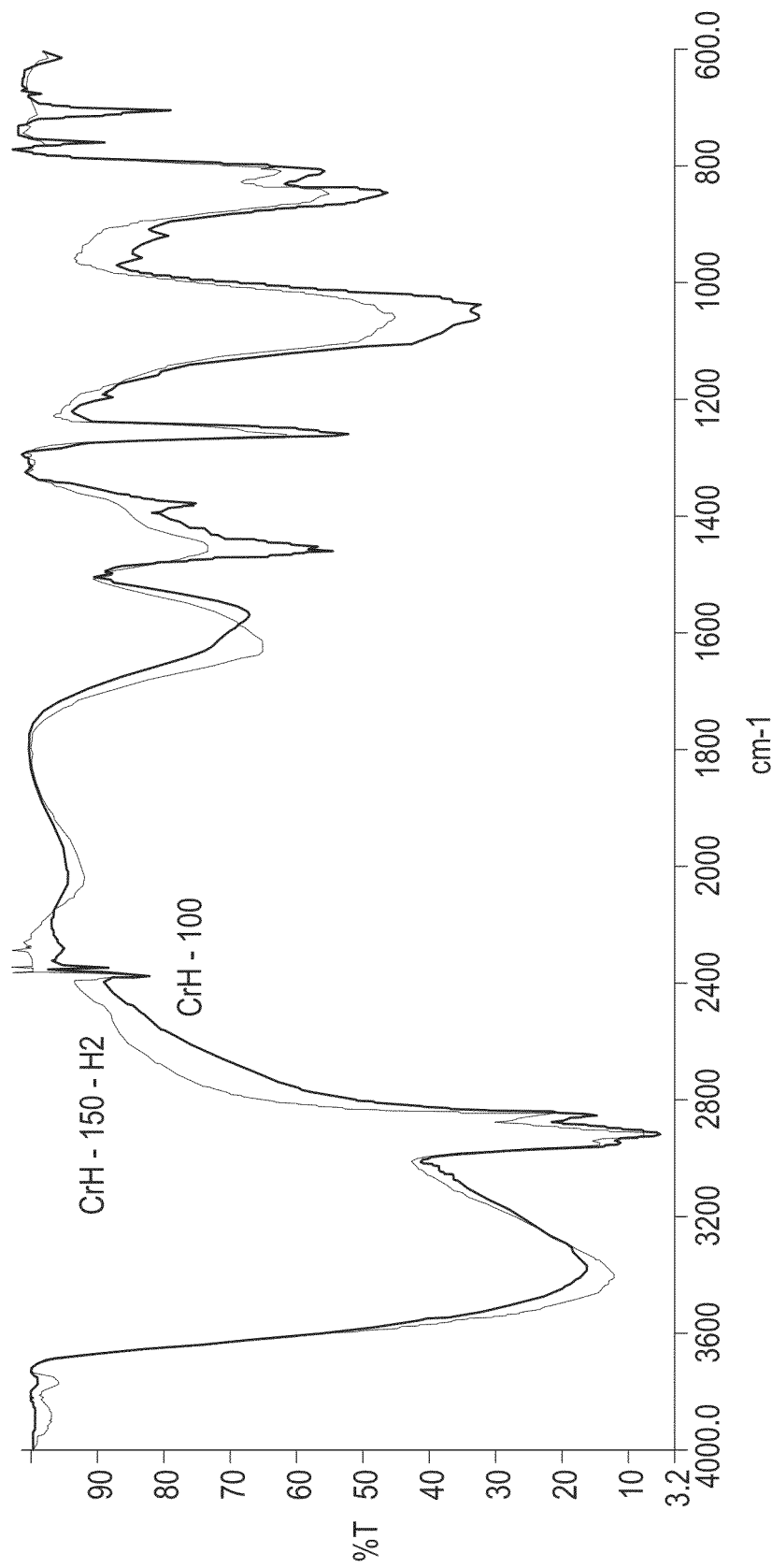
FIG. 37 depicts an IR spectrum of chromium hydride samples CrH-100 and CrH-150-$H_2$.

Infra-red (IR) spectra for samples CrH-100, CrH-150-$H_2$ are shown in FIG. 37. The presence of C—H stretches at 2855 and 2925 cm$^{-1}$ likely indicates incomplete hydrogenolysis of the bis(trimethylsilyl)methyl ligands.

Figure 37A:
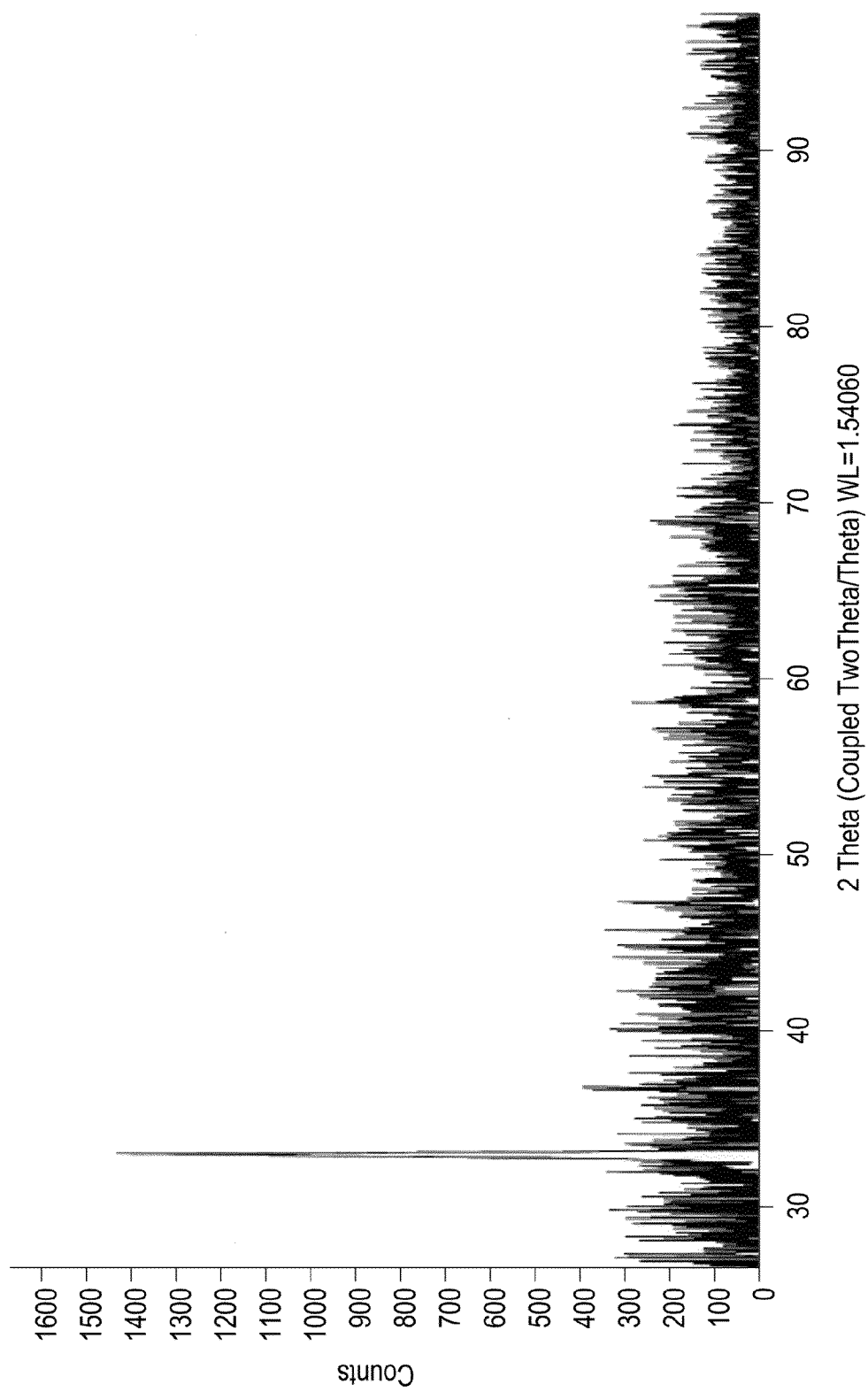
FIG. 37A depicts the X-ray powder diffraction (XRPD) spectrum for chromium hydride sample CrH-150-$H_2$.

FIG. 37A depicts the X-ray powder diffraction (XRPD) spectrum for chromium hydride sample CrH-150-$H_2$. As can be seen from FIG. 37A, there is one reflection in the 30-35° 2θ region, which could not be indexed to any known diffraction pattern, likely suggesting a new chromium (II) hydride species. However, the bulk of the material still appears to be amorphous.

Figure 37B:
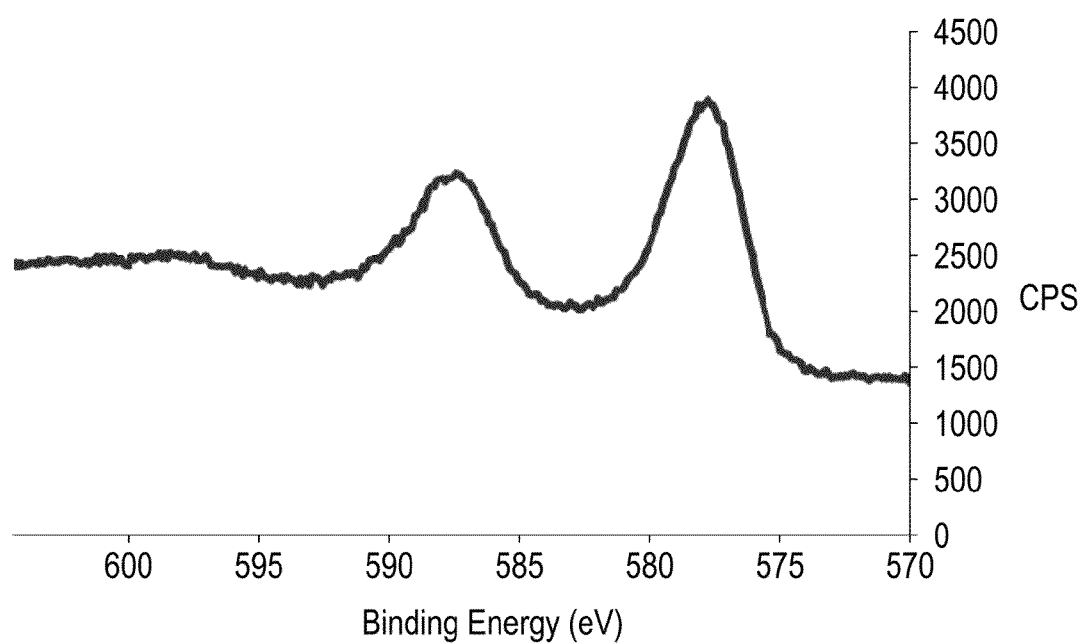
FIG. 37B depicts the X-ray photoelectron spectroscopy (XPS) spectrum (2p1/2 and 2p3/2 region) for chromium hydride sample CrH-150-$H_2$.

FIG. 37B depicts the X-ray photoelectron spectroscopy (XPS) spectrum (2p1/2 and 2p3/2 region) for chromium hydride sample CrH-150-$H_2$. The symmetrical 2p3/2 emission at 576.3 eV corresponds to Cr(II) which is close to the emission at 576.1 eV observed for Cr(II)Cl$_2$C$_5$H$_5$ (see, e.g., *Handbook of X-ray Photoelectron Spectroscopy*: Physical Electronics Division, Perkin-Elmer Corp.: Eden Prairie, Minn., 1979).

Nitrogen Adsorption-Desorption Studies

Nitrogen adsorption-desorption isotherms for samples CrH-100 and CrH-150-$H_2$ both show a type 2 isotherm. Samples CrH-100 and CrH-150-$H_2$ have a BET surface area of 377 m$^2$/g and 391 m$^2$/g, respectively, which may indicate greater loss of bis(trimethylsilyl)methyl ligands from the material at higher temperature creating new porous pathways in the structure. In both samples there is hysteresis between the adsorption and desorption isotherms which likely means that the materials are not non-porous. There is a fairly steep increase between 0 and 0.1 P/Po, which likely means there is some level of microporosity (~20% of the total volume adsorbed). The moderate increase in slope between 0.1 and 0.8 P/Po may arise from mesoporosity and the increasing slope between 0.8 and 1.0 P/Po may arise from textural porosity.

Hydrogen Adsorption-Desorption Studies

Figure 38:
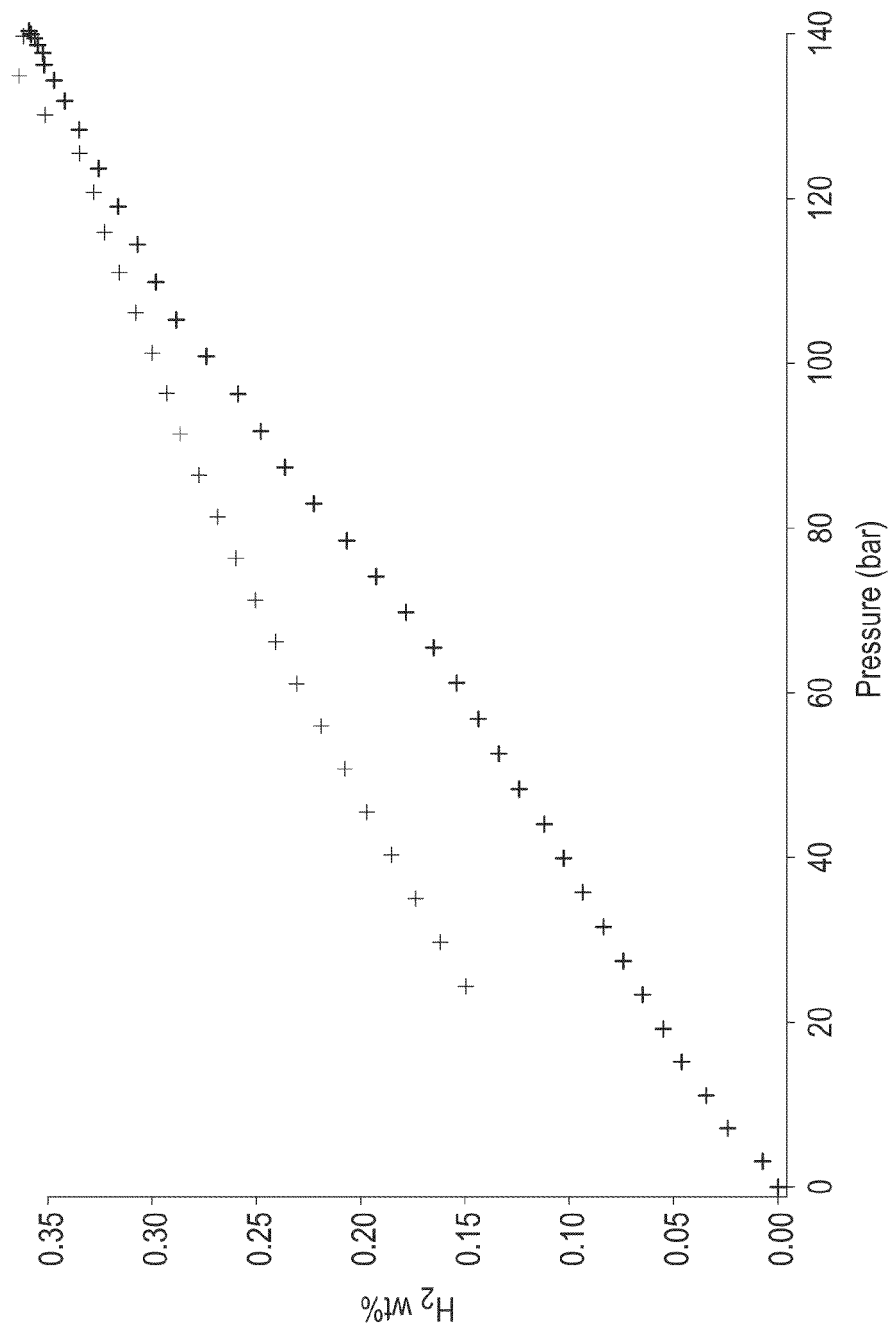
FIG. 38 depicts a hydrogen adsorption isotherm at 298 K for chromium hydride sample CrH-100.
Figure 39:
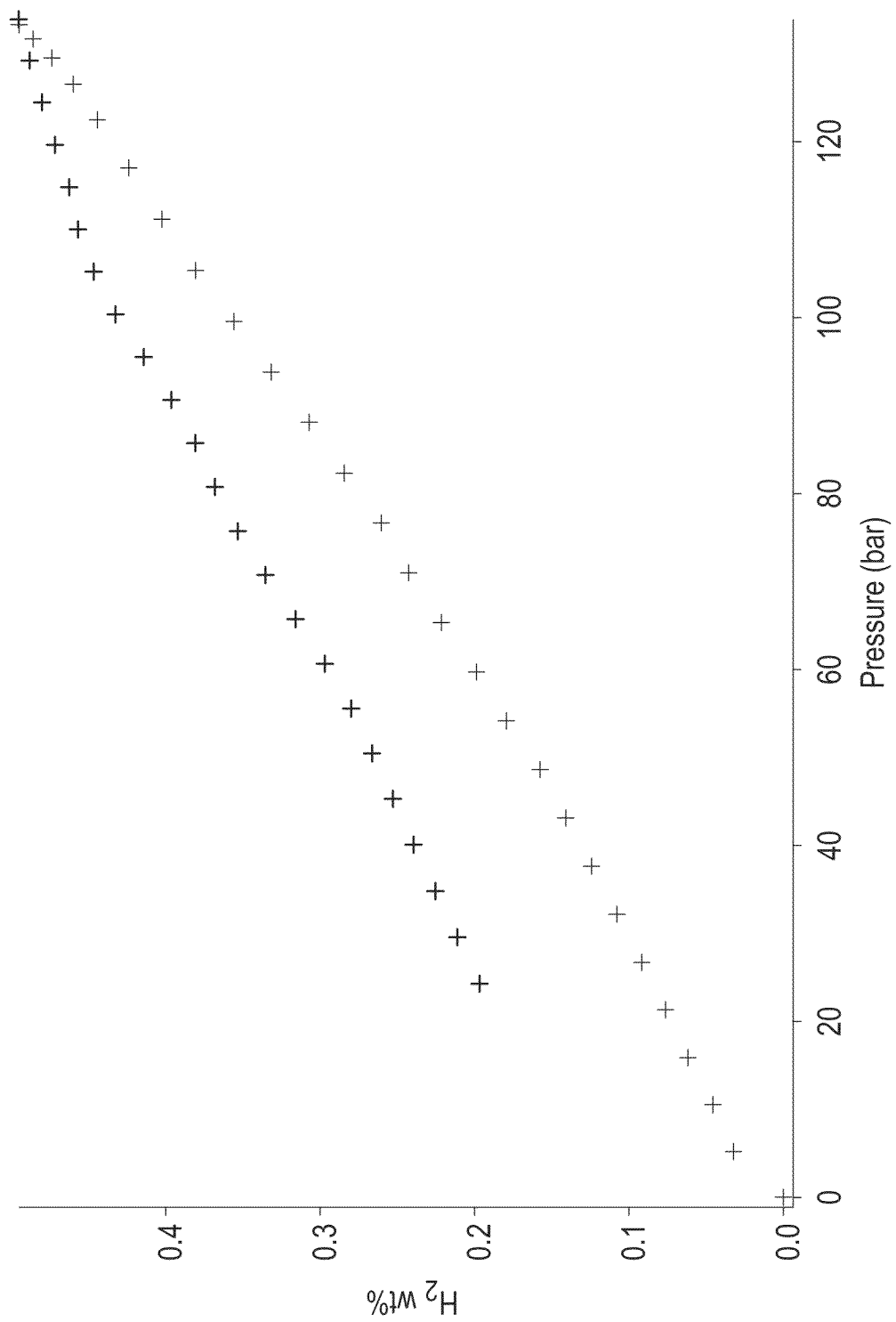
FIG. 39 depicts a hydrogen adsorption isotherm at 298 K for chromium hydride sample CrH-150-$H_2$.

The hydrogen adsorption-desorption isotherms (298K) for samples CrH-100 and CrH-150-H$_2$ are shown in FIGS. 38 and 39, respectively. The gravimetric adsorption of sample CrH-100 is 0.35 wt % at 140 bar. The isotherm is linear and does not reach saturation. There is some hysteresis between the adsorption and desorption isotherms. The gravimetric adsorption of sample CrH-150-H$_2$ is 0.5 wt % at 298K and 135 bar. The adsorption isotherm is linear and does not show saturation up to 135 bar indicating that the capacity of the material may be higher at pressures above 135 bar. There is also a degree of hysteresis between the adsorption and desorption isotherms.

Example 4

Manganese Hydride Samples

Synthesis

1) Synthesis of [Mes(THF)Mn(μ-Mes)]$_2$

MnCl$_2$ (6.16 g, 48.95 mmol) was stirred in 20 mL of THF to afford a pale pink suspension which was subsequently cooled to −78° C. Mesityl magnesium bromide (MesMgBr) (97.9 mmol, 97.9 mL of a 1.0M solution in THF) was added and the resulting brown suspension was allowed to warm to room temperature. The reaction was stirred overnight, then 50 mL of dioxane was added and the reaction stirred for a further 3 hours. The resulting suspension was allowed to settle for two hours then filtered to afford a white precipitate and an orange-brown filtrate. The filtrate was concentrated in vacuo (10$^{-3}$ torr) until a green solid formed. The green solid was stirred in warm toluene (40 mL) with 0.5 mL of THF and, after being allowed to cool to room temperature, yellow-green crystals of sample MnA were isolated (8.5 g, 59%), See, e.g., Fischer et al., *J. Organomet. Chem.*, 694, 1107-1111, 2009.

2) Synthesis of Mn(mes)$_2$

Route 1

6.0312 g (47.92 mmol) of MnCl$_2$ was stirred in 30 mL of dry THF at room temperature to afford a pale pink slurry. To this, 95.85 mL of 1M MesMgBr in THF was added dropwise. The slurry slowly turned dark brown. The reaction mixture was stirred for 12 hours at room temperature. 50 mL of dioxane was then added and the mixture was stirred for a further 3 hours. The reaction mixture was filtered and the dark brown filtrate was concentrated in vacuo (10$^{-3}$ torr) to afford an orange powder. The orange powder was recrystallized three times from hot toluene to afford brown crystals of sample MnB. See, e.g., Gambarotta et al., *J. Chem. Soc. Chem. Commun.*, 20, 1128-1129, 1983.

Route 2

MnI$_2$ (3.87 g, 12.535 mmol) was stirred in 30 mL of diethyl ether at 298 K to afford a pink suspension. Mesityl lithium (3.1616 g, 25.07 mmol) was dissolved in 50 mL of diethyl ether and the resulting solution was added dropwise to the pink suspension. The resulting mixture was stirred overnight to afford an orange solution with a small amount of a light coloured precipitate. Volatiles were removed in vacuo (10$^{-3}$ torr) to afford a pale brown oily solid which was heated at 50° C. in vacuo (10$^{-3}$ torr) overnight to remove excess diethyl ether. The resulting product was extracted into hot toluene. Filtration afforded a white precipitate (lithium iodide, 25.70 mmol) and a maroon filtrate (sample MnC).

3) Preparation of Manganese Hydride Samples (MnH$_2$)

In a typical experiment, a bis(mesityl) manganese compound (sample MnA, MnB or MnC) was stirred in toluene at room temperature under an atmosphere of hydrogen gas for 5-7 days to afford, after work up, samples MnA-100, MnB-100 and MnC-100, respectively. For example, 0.5060 g (1.73 mmol) of sample MnB was stirred in dry toluene at room temperature. Hydrogen gas was bubbled through the reaction mixture at a steady flow rate of 1 mL per minute for 5 days until a dark brown precipitate formed and the solution was colourless. The reaction mixture was filtered to afford a dark brown powder which was washed with 3×10 mL dry 40-60° petroleum ether. The brown powder was dried in vacuo 10$^{-3}$ torr at 100° C. for 4 hours to afford sample MnB-100.

4) Further Hydrogenation of Manganese Hydrides

Sample MnA-100

Sample MnA-100 was added to a computer controlled commercial Gas Reaction Controller™ manufactured by Advanced Materials Corporation, Pittsburgh, Pa. The sample was placed under hydrogen at a pressure of 85 bar at 100° C., then at 150° C. for 2 hours, followed by a 2 hour evacuation (10$^{-3}$ torr) at 100° C. to afford sample MnA-150-H$_2$-2 hrs. The weight of sample MnA-150-H$_2$-2 hrs decreased by approximately 15% during the process. Sample MnA-150-H$_2$-6 hrs was obtained using a similar process at a temperature of 150° C. for 6 hours.

Sample MnB-100

0.1090 g of sample MnB-100 was added to a computer controlled commercial Gas Reaction Controller™ manufactured by Advanced Materials Corporation, Pittsburgh, Pa. The sample was placed under hydrogen at a pressure of 85 bar at 100° C. Maintaining these conditions for 2 hours, followed by a 2 hour evacuation (10$^{-3}$ torr) at 100° C. afforded sample MnB-100-H$_2$-2 hrs. The weight of sample MnB-100-H$_2$-2 hrs decreased by approximately 16% during the process.

Sample MnB-150-H$_2$-2 hrs was obtained using a similar process at a hydrogen pressure of 85 bar, during which the temperature was maintained at 150° C. for 2 hours, followed by a 2 hour evacuation (10$^{-3}$ torr) at 100° C. The weight of sample MnB-150-H$_2$-2 hrs decreased by approximately 21% during the process.

Sample MnC-100

Sample MnC-100 was added to a computer controlled commercial Gas Reaction Controller™ manufactured by Advanced Materials Corporation, Pittsburgh, Pa. The sample was placed under hydrogen at a pressure of 85 bar at 100° C., then at 150° C. for 2 hours, followed by a 2 hour evacuation (10$^{-3}$ torr) at 100° C. to afford sample MnC-150-H$_2$-2 hrs. The weight of sample MnC-150-H$_2$-2 hrs decreased by approximately 43% during the process.

Sample MnC-150-H$_2$-6 hrs was obtained using a similar process at a temperature of 150° C. for 6 hours.

Sample Characterization

Figure 40:
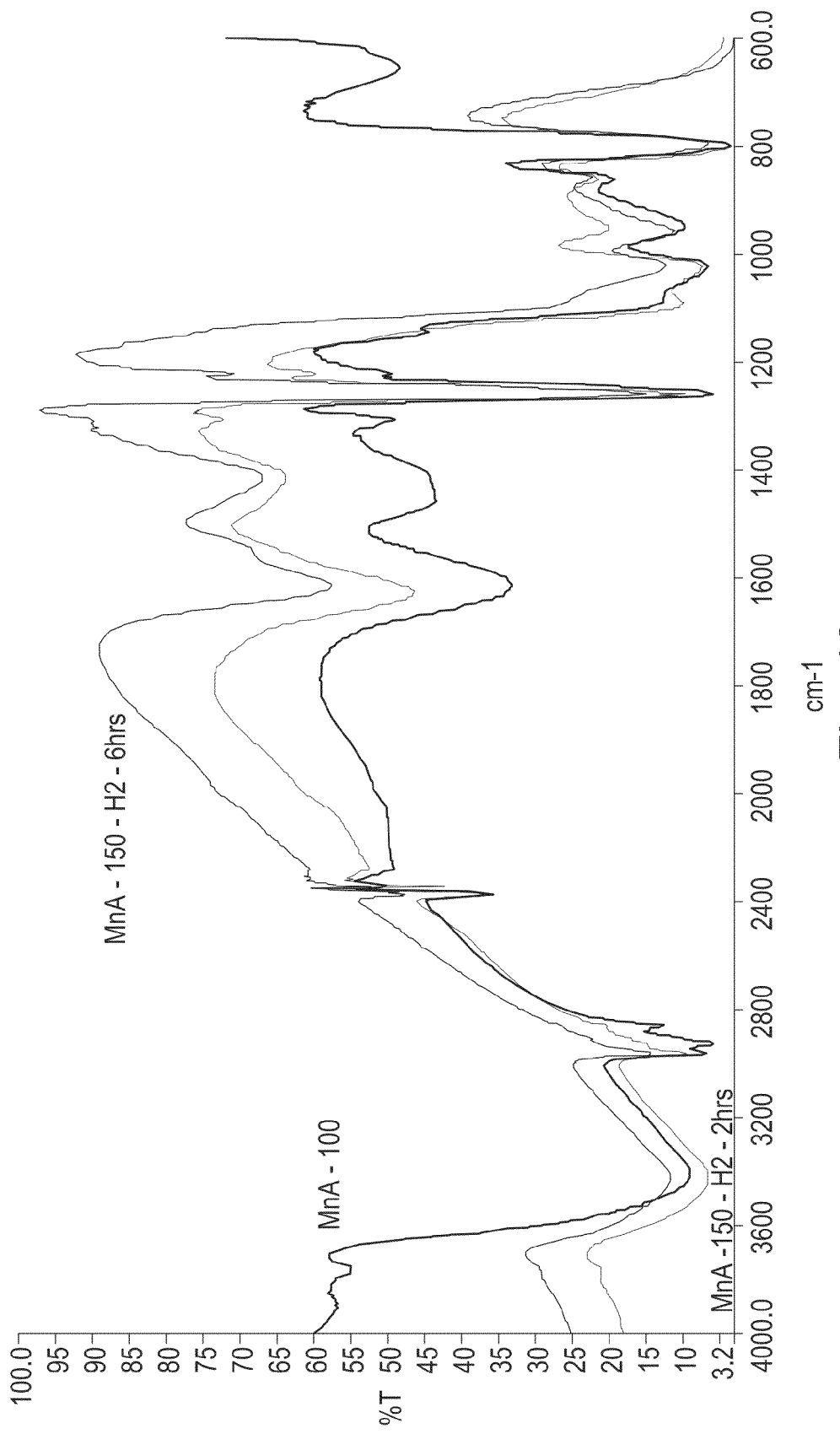
FIG. 40 depicts an IR spectrum of manganese hydride samples MnA-100, MnA-150-$H_2$-2 hrs and MnA-150-$H_2$-6 hrs.

Infra-red (IR) spectra for samples MnA-100, MnA-150-H$_2$-2 hrs and MnA-150-H$_2$-6 hrs are shown in FIG. 40. Sample MnA-150-H$_2$-6 hrs possesses a BET surface area of 6 m$^2$/g.

Figure 41:
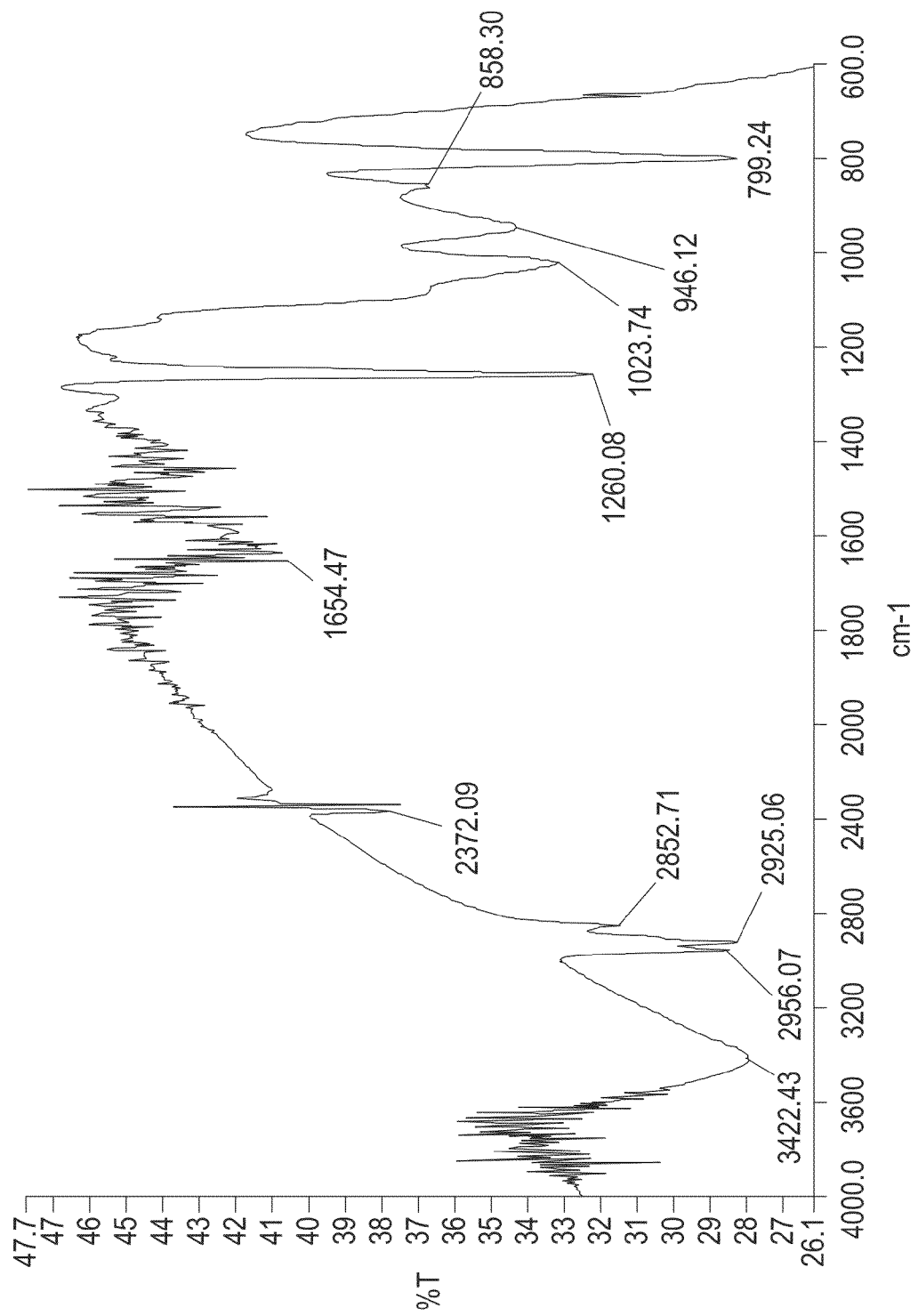
FIG. 41 depicts an IR spectrum of manganese hydride sample MnB-100.
Figure 42:
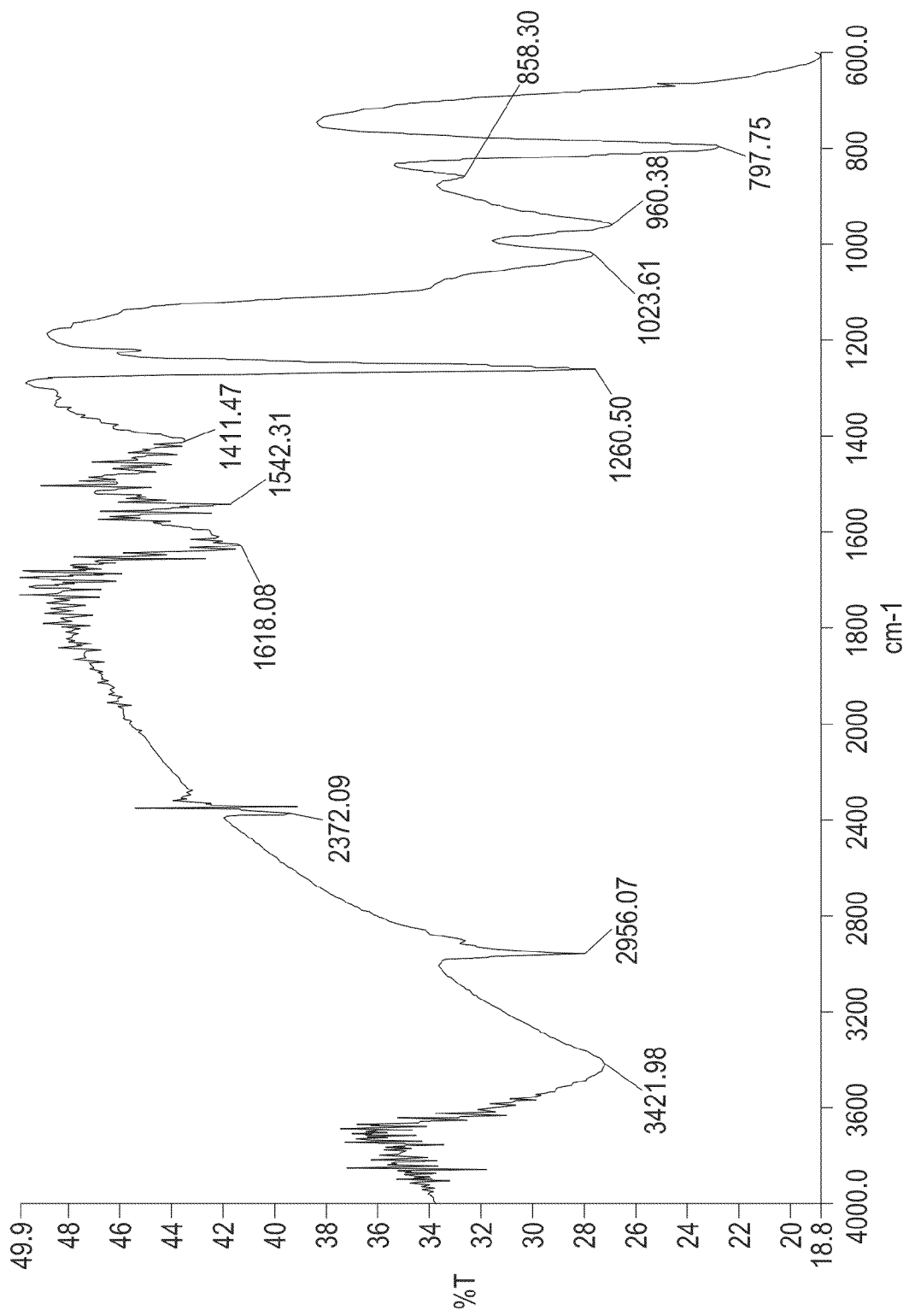
FIG. 42 depicts an IR spectrum of manganese hydride sample MnB-100-$H_2$-2 hrs.
Figure 43:
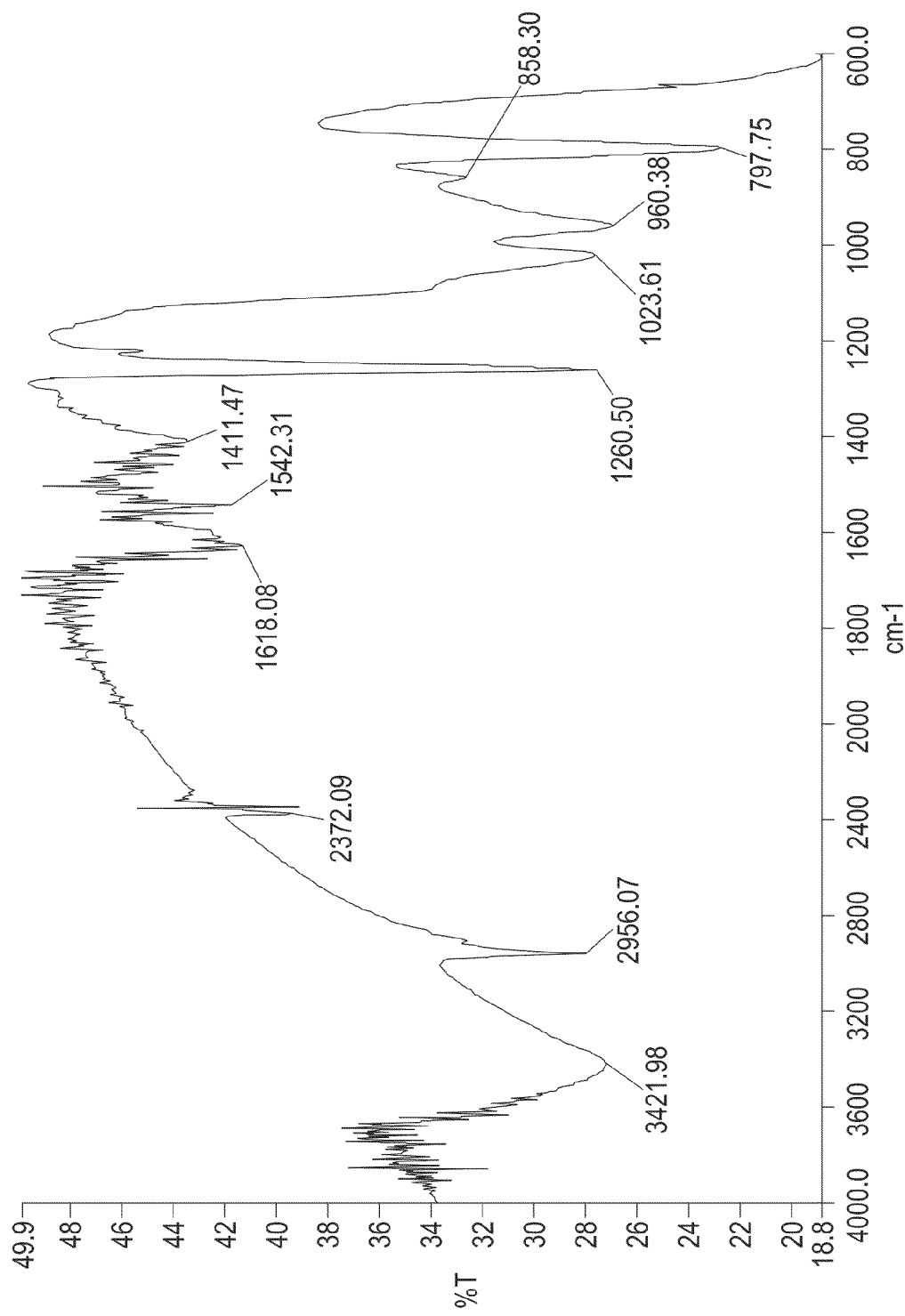
FIG. 43 depicts an IR spectrum of manganese hydride sample MnB-150-$H_2$-2 hrs.
Figure 44:
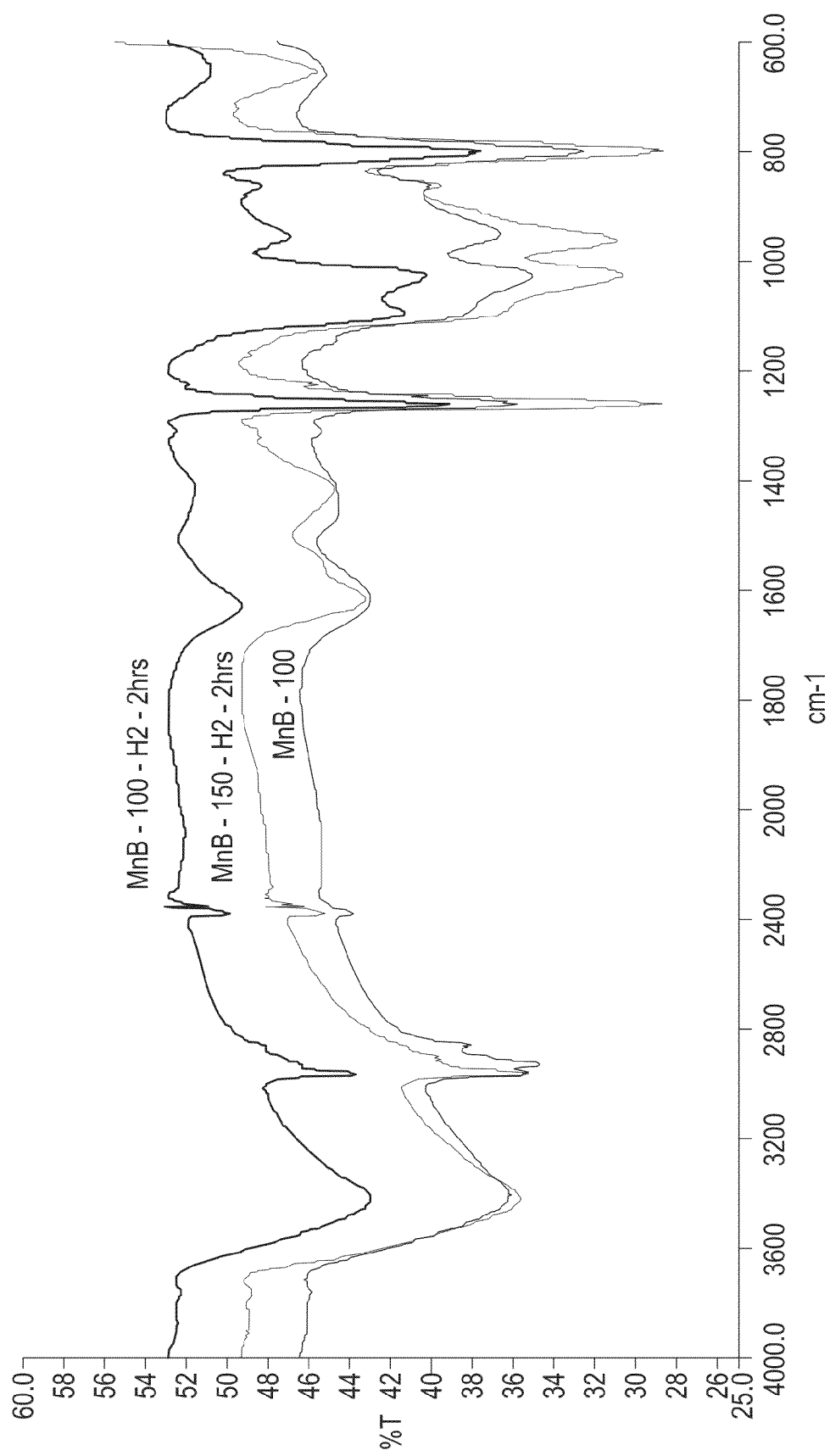
FIG. 44 depicts IR spectrum of manganese hydride samples MnB-100, MnB-100-$H_2$-2 hrs and MnB-150-$H_2$-2 hrs.
Figure 45:
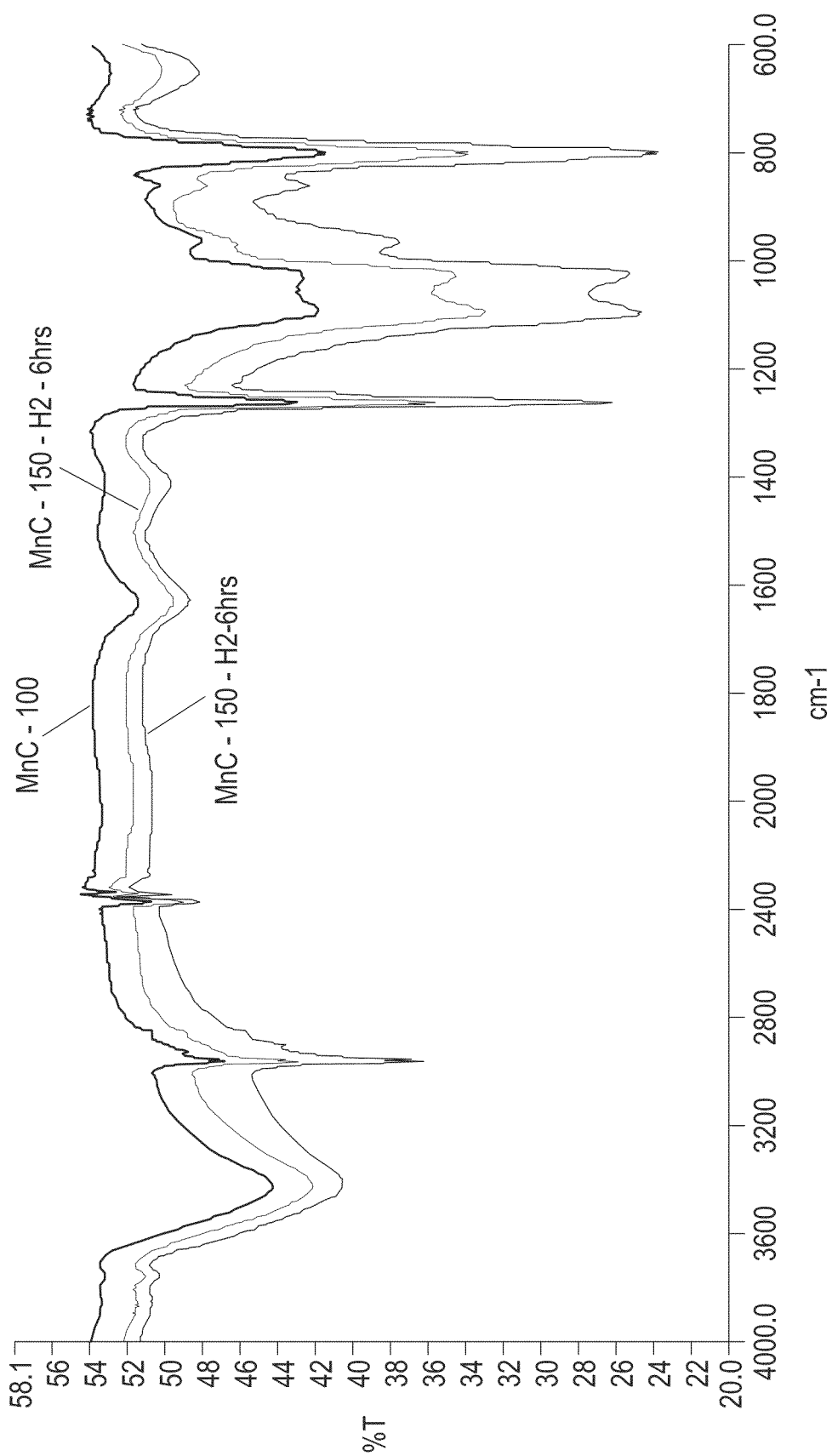
FIG. 45 depicts an IR spectrum of manganese hydride samples MnC-100, MnC-150-$H_2$-2 hrs and MnC-150-$H_2$-6 hrs.

Infra-red (IR) spectra for samples MnB-100, Mn-B-100-H$_2$-2 hrs and MnB-150-H$_2$-2 hrs are shown in FIGS. 41-43, respectively. A combination IR spectrum for samples MnB-100, Mn-B-100-H$_2$-2 hrs and MnB-150-H$_2$-2 hrs is shown in FIG. 44. Sample MnB-150-H$_2$-2 hrs possesses a BET surface area of 257 m$^2$/g Infra-red (IR) spectra for samples Mn-C-100, Mn-C-150-H$_2$-2 hrs and Mn-C-150-H$_2$-2 hrs are shown in FIG. 45. Sample Mn-C-150-H$_2$-6 hrs possesses a BET surface area of 66 m$^2$/g.

Figure 45A:
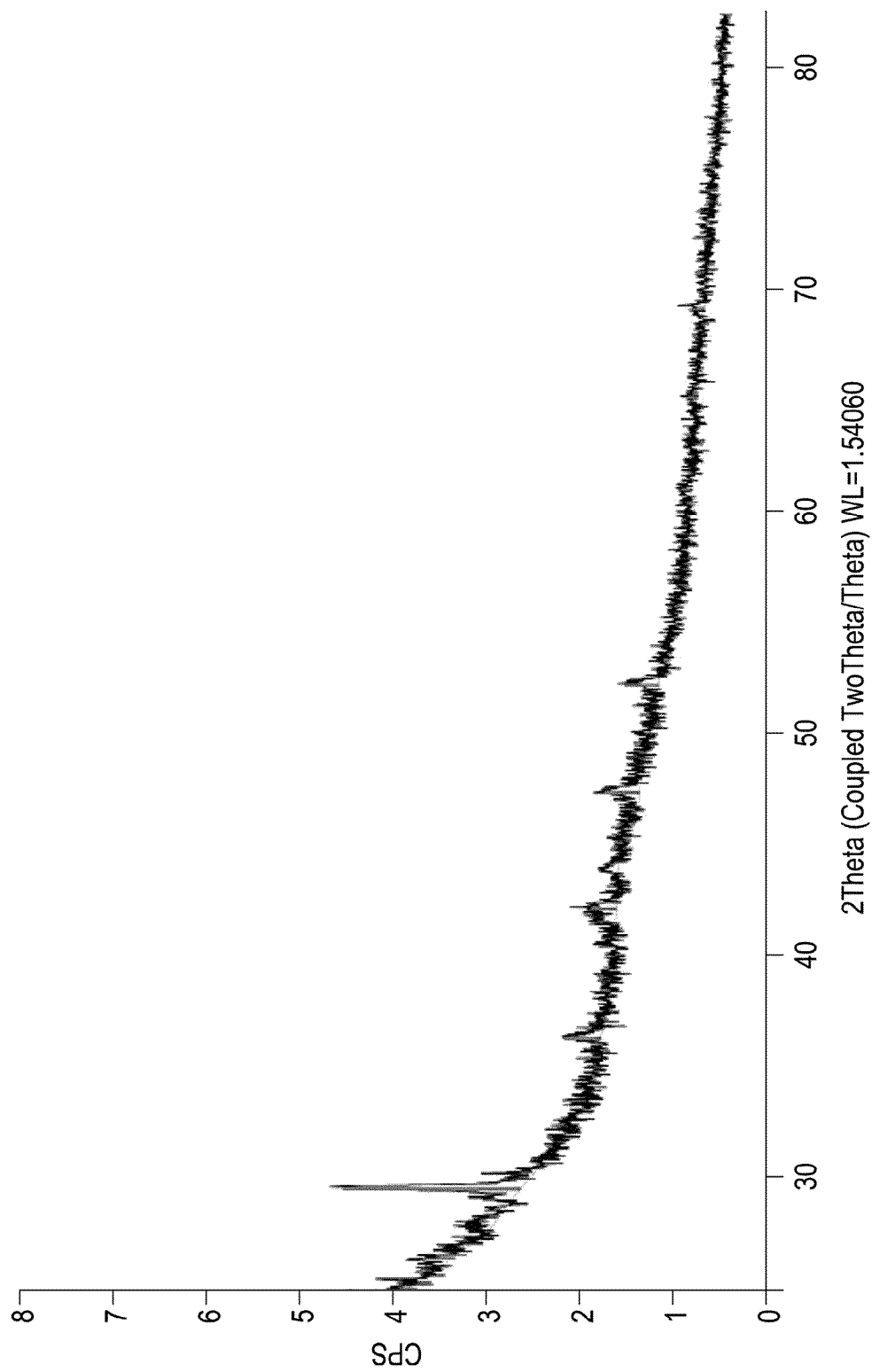
FIG. 45A depicts the X-ray powder diffraction (XRPD) spectrum for manganese hydride sample MnC-150-$H_2$-6 hrs.

FIG. 45A depicts the X-ray powder diffraction (XRPD) spectrum for manganese hydride sample MnC-150-H$_2$-6 hrs. One reflection in the 25-30° 2θ region and some minor reflections in the 35-55° 2θ region are observed. These peaks may be attributed to trace contamination with lithium iodide. Since the theoretical amount of iodide was removed from the precursor during synthesis, this likely corresponds to trace lithium iodide on the manganese hydride surface on the surface. The remainder of the material, and therefore the principal $MnH_2$ phase, is amorphous.

Figure 45B:
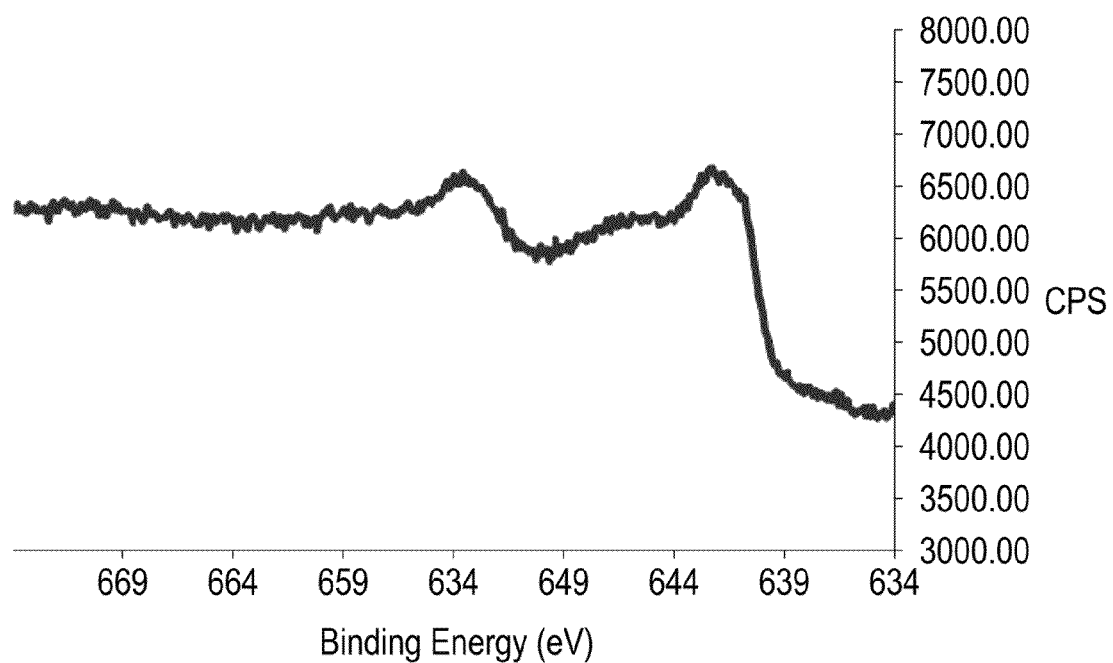
FIG. 45B depicts the X-ray photoelectron spectroscopy (XPS) spectrum (2p1/2 and 2p3/2 region) for manganese hydride sample MnC-150-$H_2$-6 hrs.

FIG. 45B depicts the X-ray photoelectron spectroscopy (XPS) spectrum (2p1/2 and 2p3/2 region) for manganese hydride sample MnC-150-$H_2$-6 hrs. The material is not metallic, and no emissions are observed that correspond to manganese metal (640 and 651.6 eV). The main 2p 3/2 emission is quite broad suggesting that there are at least two manganese species present: one species observed at 641 eV and a second species observed at 642.6 eV, which likely correspond to two Mn(II) species in different environments (see, e.g., Escard et al., *Inorg. Chem.*, 13, 695, 1974), although the second emission may also be assigned to a higher oxidation state of Mn such as Mn(IV) (see, e.g., Ivanov-Emin et al., *Zh. Neorg. Khimii.*, 27, 3101, 1982).

Hydrogen Adsorption-Desorption Studies

Figure 46:
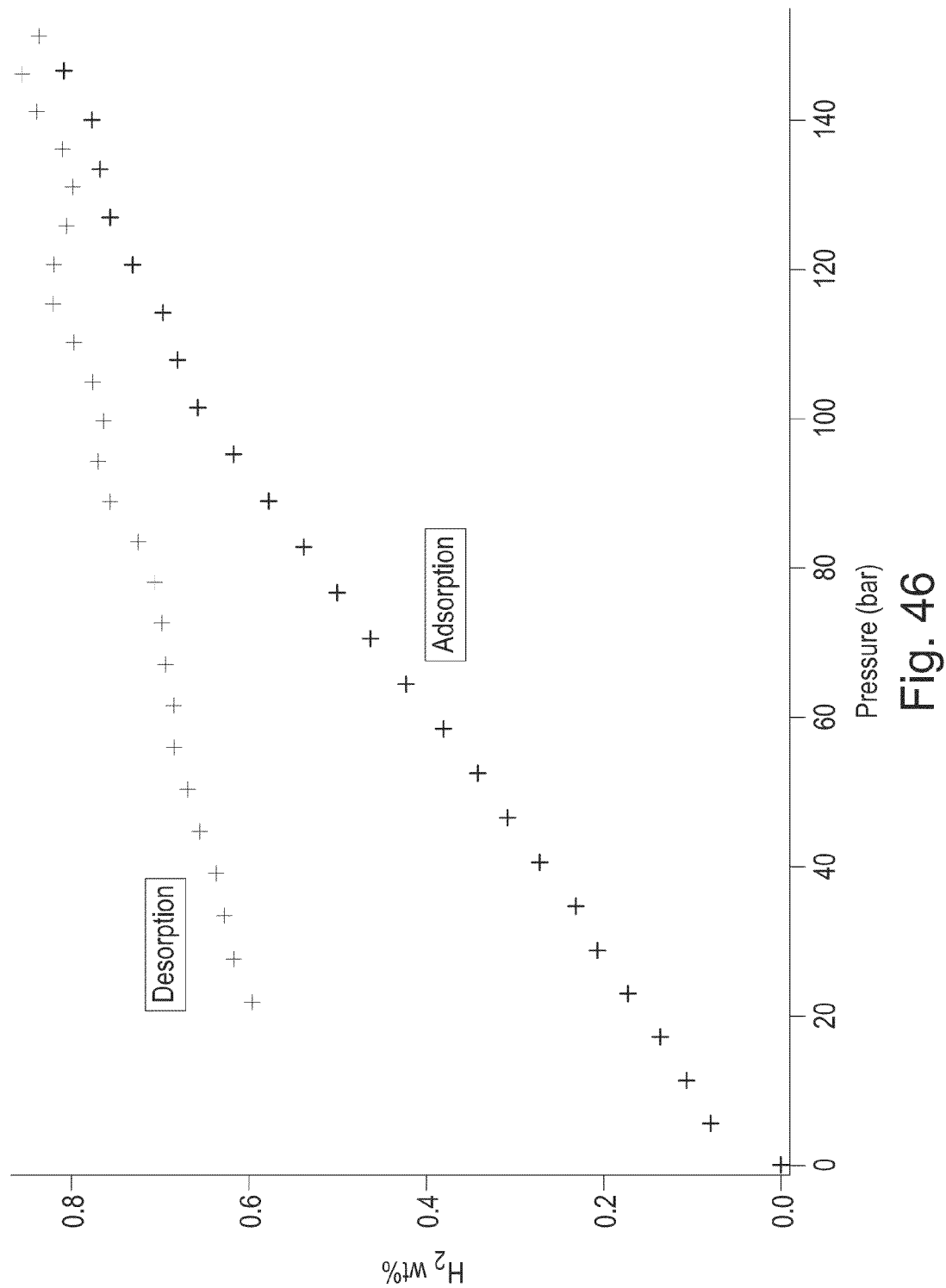
FIG. 46 depicts a hydrogen adsorption isotherm at 298 K for manganese hydride sample MnA-150-$H_2$-6 hrs.

The gravimetric adsorption of sample MnA-150-$H_2$-2 hrs is 0.6 wt. % (150 bar) at 298 K. The gravimetric adsorption of sample MnA-150-$H_2$-6 hrs is 0.84 wt. % (150 bar) at 298 K. The hydrogen adsorption-desorption excess isotherm for sample MnA-150-$H_2$-6 hrs is shown in FIG. 46. Without wishing to be bound by theory, Applicants theorize that the results shown in FIG. 46 may be due to THF groups present on the manganese precursor, that are not fully removed during hydrogenolysis, thereby blocking potential $H_2$ coordination sites and decreasing the hydrogen storage gravimetric performance.

Figure 47:
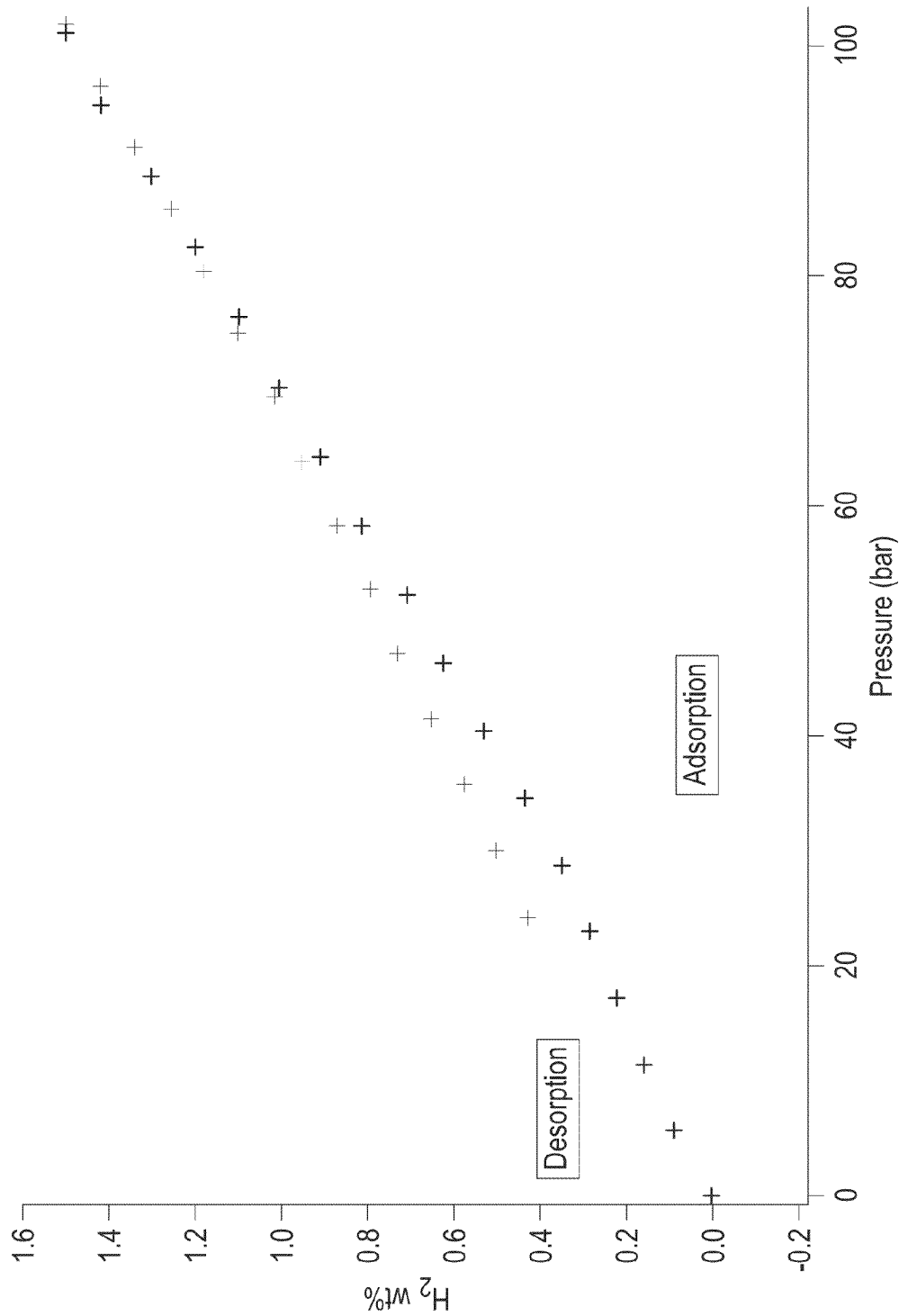
FIG. 47 depicts a hydrogen adsorption-desorption isotherm for manganese hydride sample MnB-100.
Figure 48:
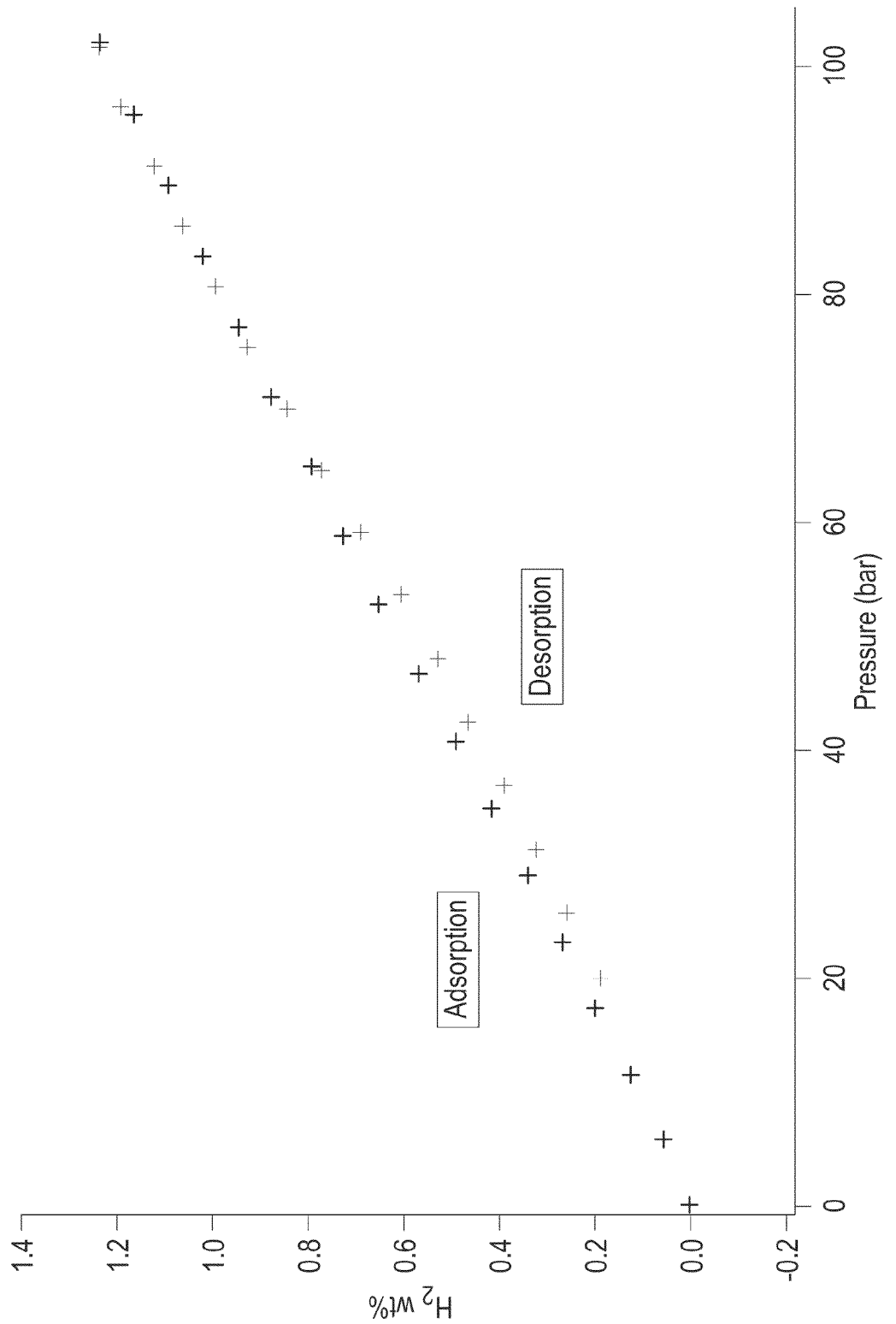
FIG. 48 depicts a hydrogen adsorption-desorption isotherm for manganese hydride sample MnB-100-$H_2$-2 hrs.
Figure 49:
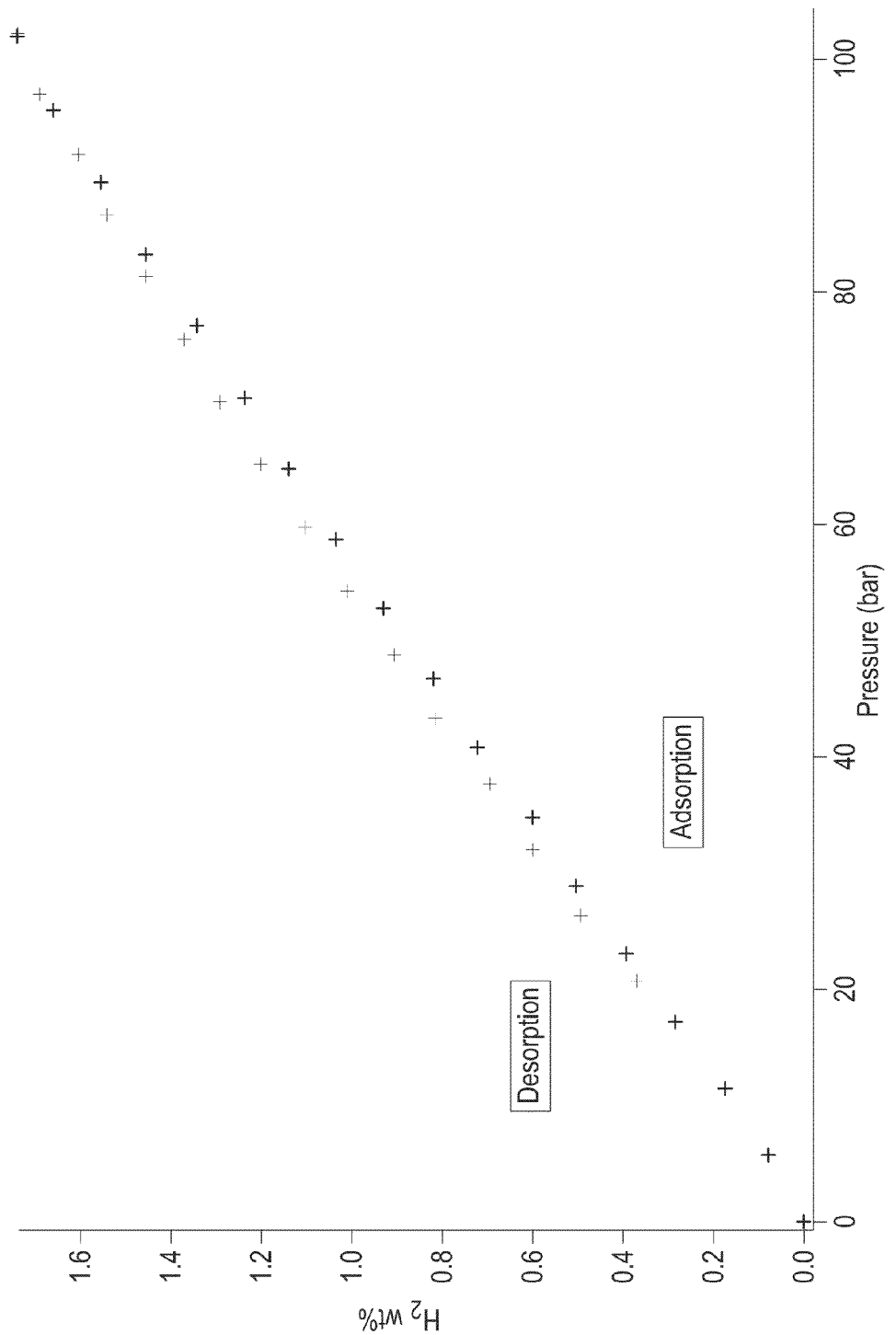
FIG. 49 depicts a hydrogen adsorption-desorption isotherm for manganese hydride sample MnB-150-$H_2$-2 hrs.

The hydrogen adsorption-desorption excess isotherms for samples MnB-100, MnB-100-$H_2$-2 hrs and MnB-150-$H_2$-2 hrs are shown in FIGS. 47-49.

The gravimetric adsorption (without saturation) of sample MnB-100 is 1.49 wt. % (100 bar) at 298 K. As can be seen from FIG. 47, there is some hysteresis between the adsorption and desorption isotherms. The gravimetric adsorption (without saturation) of sample MnB-100-$H_2$-2 hrs is 1.24 wt. % (100 bar) at 298 K. As can be seen from FIG. 48, there is a slight hysteresis between the adsorption and desorption isotherms. The gravimetric adsorption (without saturation) of sample MnB-150-$H_2$-2 hrs is 1.74 wt. % (100 bar) at 298 K. As can be seen from FIG. 49, there is no hysteresis between the adsorption and desorption isotherms, indication that hydrogen adsorption is fully reversible.

Figure 50:
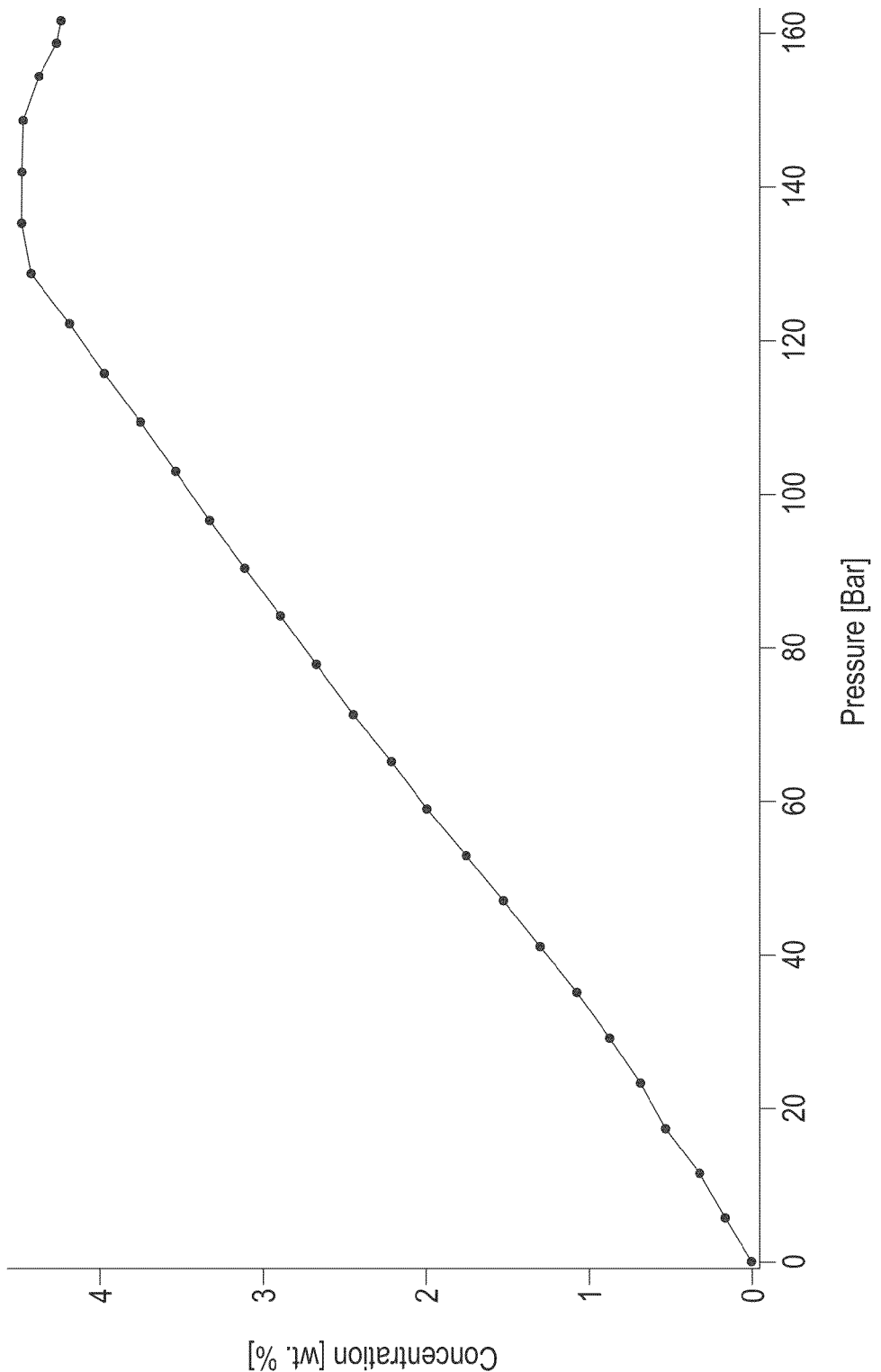
FIG. 50 depicts a hydrogen adsorption isotherm for manganese hydride sample MnC-150-$H_2$-6 hrs.

The gravimetric adsorption of sample MnC-150-$H_2$-2 hrs is 1.9 wt. % (165 bar) at 298 K. The hydrogen adsorption isotherm for sample MnC-150-$H_2$-6 hrs is shown in FIG. 50. The gravimetric adsorption of sample MnC-150-$H_2$-6 hrs is 4.4 wt. % (130 bar) at 298 K. This is also very close to the U.S. Department of Energy's (DOE) 2017 target for gravimetric capacity of 5.5 wt %. As can be seen from FIG. 50, the isotherm increases in a linear fashion, until a saturation point is reached. The saturation and subsequent plateau behaviour suggest that there is no volume calibration error (which would result in a linear plot indefinitely).

Example 5

Iron Hydride Samples ($FeH_2$)

Synthesis
1) Synthesis of bis(mesityl) iron (II)

$FeCl_2$ (5.0416 g, 39.77 mmol) was stirred in 50 mL of dry THF to afford a pale orange suspension. To this, 79.54 mmol, 79.54 mL of a 1.0M solution of mesityl magnesium bromide in THF was added dropwise. The reaction mixture turned dark red/brown. After stirring for 30 minutes at room temperature, 60 mL of dioxane was added to precipitate the magnesium salts and the reaction was stirring overnight. After standing for two hours, the mixture was filtered to afford a white precipitate. The red dark filtrate was concentrated in vacuo ($10^{-3}$ torr) and recrystallized at −20° C. from diethyl ether to afford bis(mesityl) iron (II) as a dark red/ purple crystalline solid (4 g, 34%). See, e, g., Machelett, B. *Z. Chem.*, 16, pp 116, 1976; Ferguson, et al., *Organometallics*, 12, 2414-2416, 1993; and Muller et al., *J. Organomet. Chem.*, 445, 1-2, pp 133-136, 1993).

2) Synthesis of Iron Hydride Samples

Bis(mesityl) iron (II) (4 g, 13.6 mmol) was stirred in 50 mL of dry toluene to afford a dark red solution. The solution was stirred under an atmosphere of hydrogen for 72 hours. The colour of the reaction mixture changed to black and a black precipitate formed on the walls of the flask along with some silvery-grey metallic residue. The reaction was filtered to afford a black oil. The oil was dried in vacuo ($10^{-3}$ torr) at 100° C. for 4 hours to afford 0.8 g of sample FeH-100 as a magnetic fine black powder.

3) Further Hydrogenation of Iron Hydride

A sample of FeH-100 was added to a computer controlled commercial Gas Reaction Controller™ manufactured by Advanced Materials Corporation, Pittsburgh, Pa. The sample was placed under hydrogen at a pressure of 85 bar at 100° C. for 2 hours then at 150° C. for 2 hours to afford sample FeH-150-$H_2$.

Sample Characterization

Figure 51:
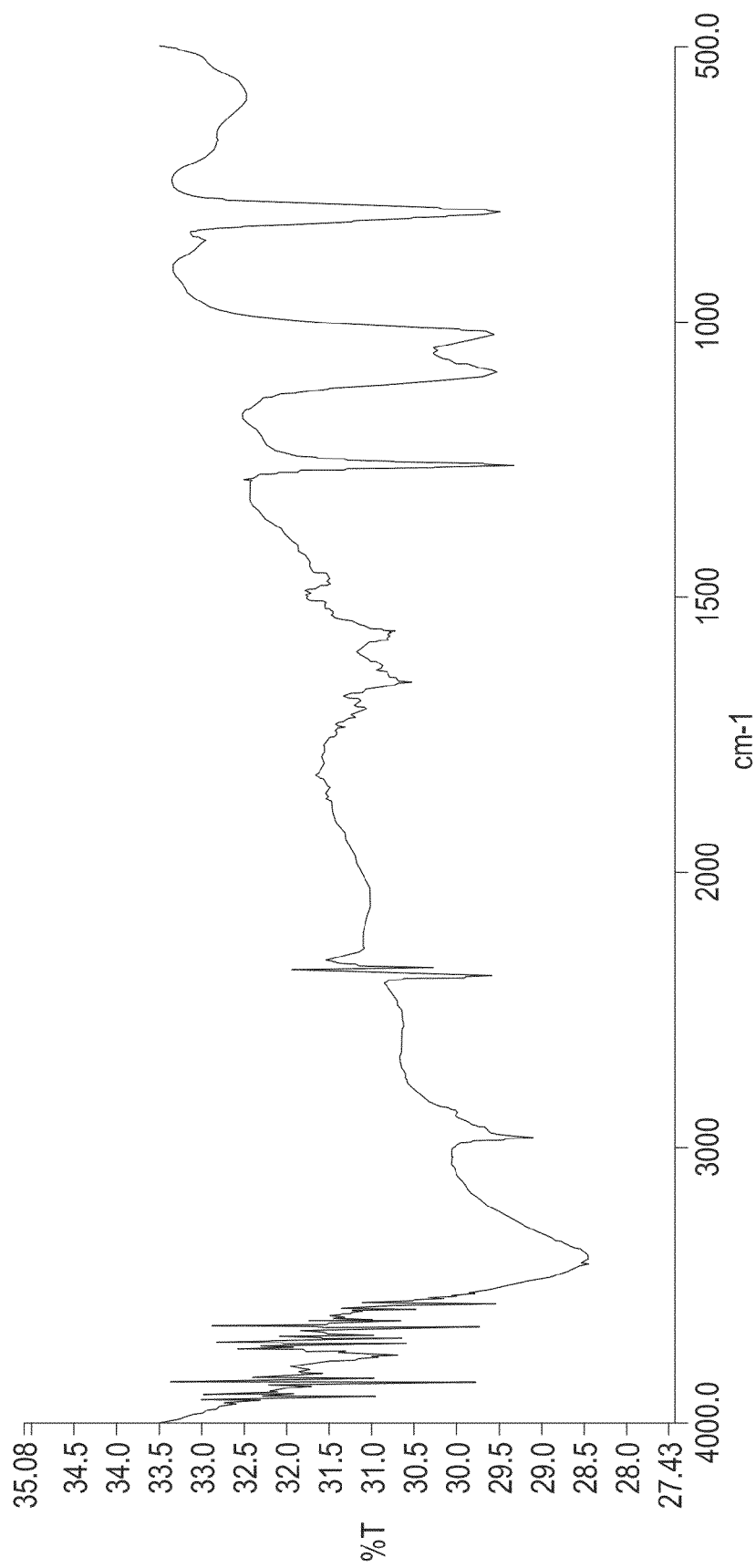
FIG. 51 depicts an IR spectrum of iron hydride sample FeH-100.

The infra-red (IR) spectra for sample FeH-100 is shown in FIG. 51. The nitrogen adsorption-desorption isotherm for sample FeH-100 is shown in 52. Sample FeH-100 possesses a BET surface area of 14 $m^2/g$. Hysteresis is observed between the adsorption and desorption isotherms which indicates that the material is not non-porous. There is a slight increase in slope between 0 and 0.1 P/Po suggesting that there is no or very little microporosity. The increasing slope between 0.8 and 1.0 P/Po in both isotherms likely arises from textural porosity.

Figure 52:
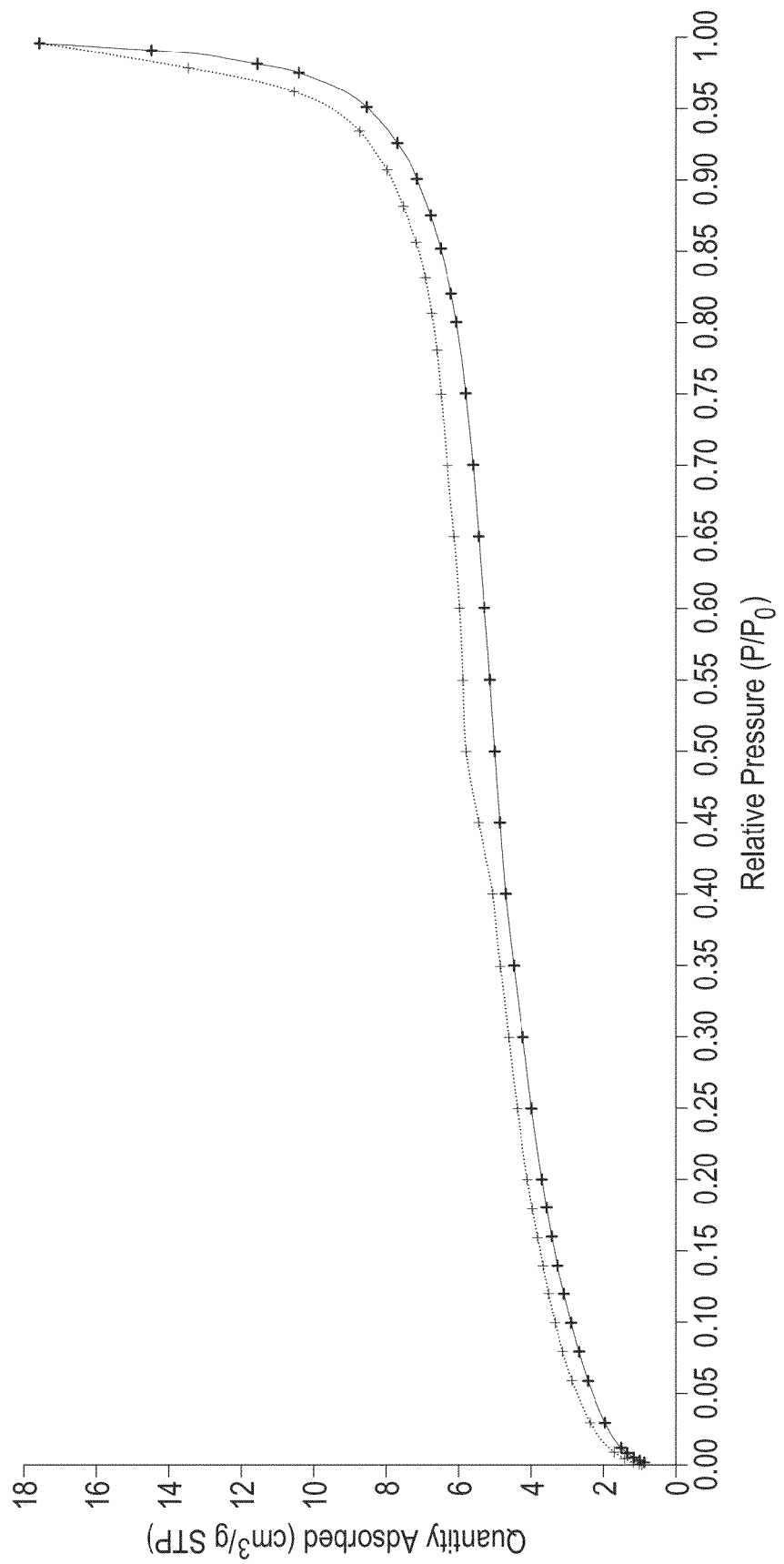
FIG. 52 depicts a nitrogen adsorption-desorption isotherm for iron hydride sample FeH-100.
Figure 52A:
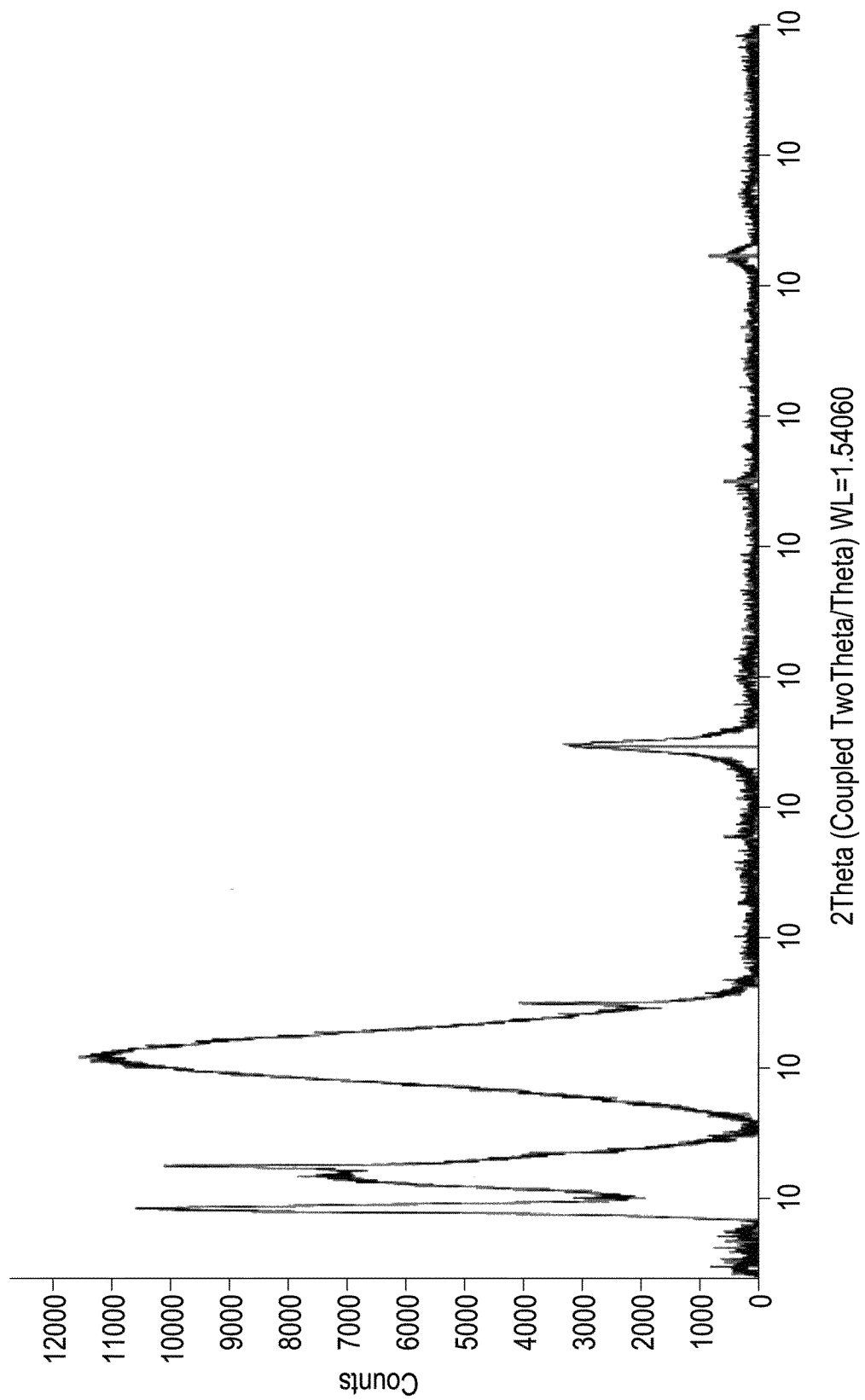
FIG. 52A depicts the X-ray powder diffraction (XRPD) spectrum for iron hydride sample Fe-150-$H_2$.

FIG. 52A depicts the X-ray powder diffraction (XRPD) spectrum for iron hydride sample Fe-150-$H_2$. The reflections in the 0-30° 2θ region correspond to the glass sample holder and the glue used to fix the powdered sample to the glass plate. The peaks in the 30-85° 2θ region correspond to metallic iron, with the rest of the iron hydride material being amorphous.

Figure 52B:
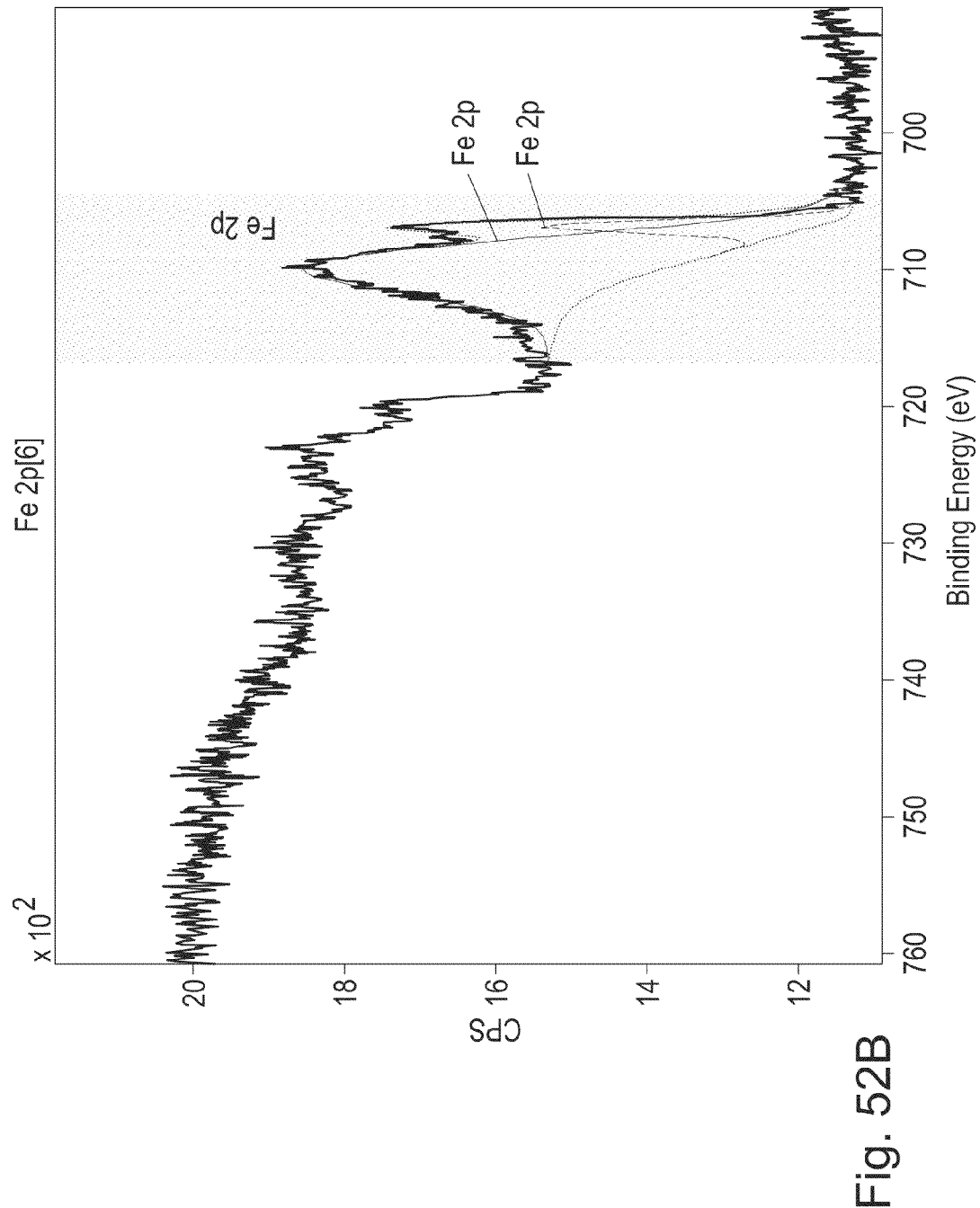
FIG. 52B depicts the X-ray photoelectron spectroscopy (XPS) spectrum (2p1/2 and 2p3/2 region) for iron hydride sample Fe-150-$H_2$.

FIG. 52B depicts the X-ray photoelectron spectroscopy (XPS) spectrum (2p1/2 and 2p3/2 region) for iron hydride sample Fe-150-$H_2$. The XPS spectrum shows two emissions in the 2p3/2 region at 707.2 eV and 710.2 eV. The 707.2 eV emission corresponds to the metallic $Fe(0)^9$ present in the material (see., e.g., Sinha et al., *J. Less-common Metals*, 125, 85, 1986). The other, much more intense emission at 710.2 eV may be assigned to a Fe(II) hydride species, as the emission is close to that seen for FeO (710.3 eV) (see, e.g., Allen et al., *J. Chem. Soc. Dalton Trans*, 1525, 1974). The intensity of the emission for metallic iron is much less than that for the Fe(II) hydride emission, likely indicating that the material contains a higher proportion of iron(II) hydride species than metallic iron. Formation of metallic iron may likely be suppressed by conducting the hydrogenation at higher pressures.

Hydrogen Adsorption-Desorption Studies

Figure 53:
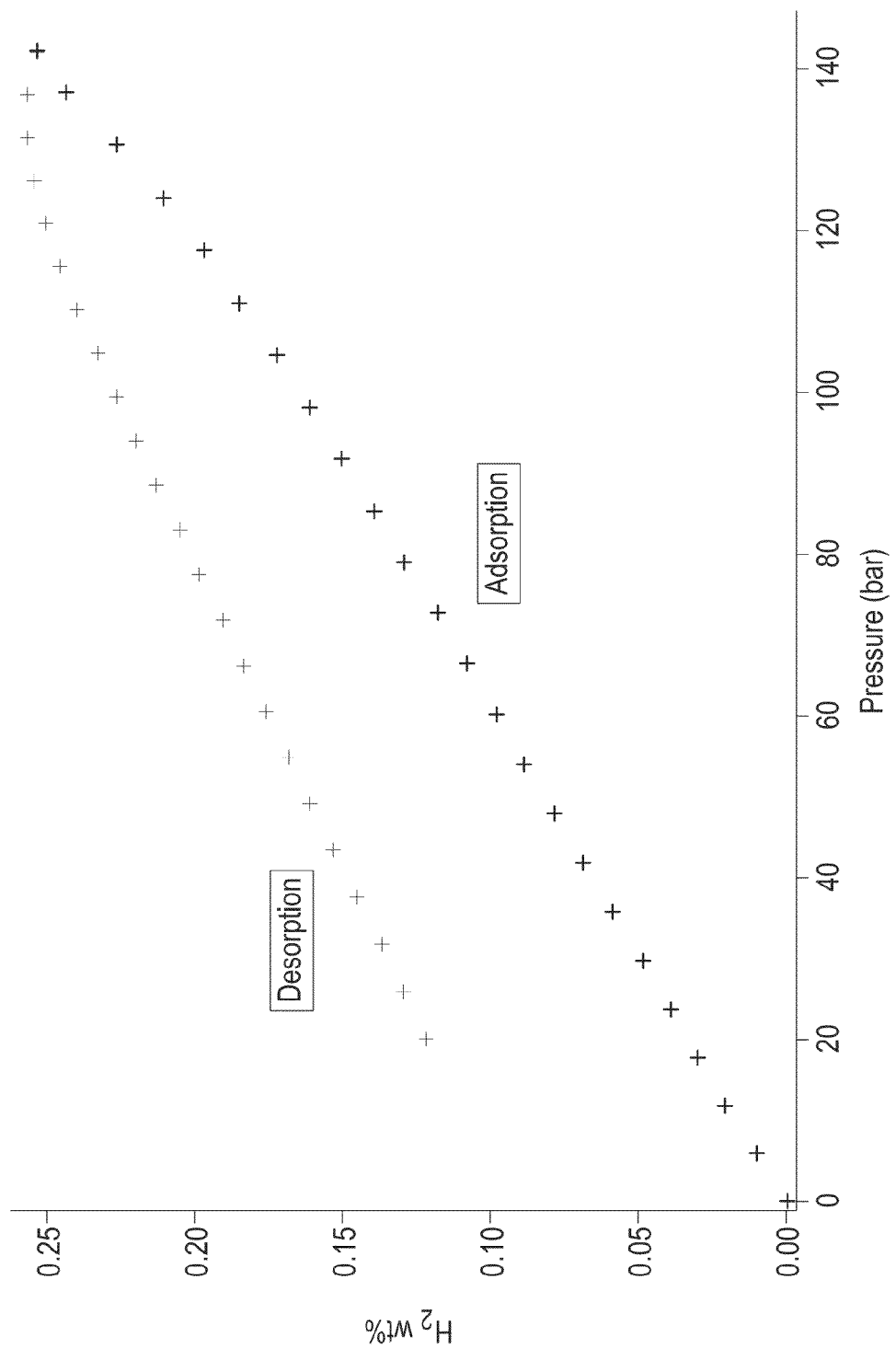
FIG. 53 depicts a hydrogen adsorption-desorption isotherm for iron hydride sample FeH-100.

The hydrogen adsorption-desorption excess isotherm for sample FeH-100 is shown in FIG. 53. The gravimetric adsorption of sample FeH-100 is 0.25 wt. % (140 bar) at 298 K. Sample FeH-100-H$_2$ shows a similar adsorption profile.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

Patents, patent applications, publications, product descriptions, and protocols are cited throughout this application, the disclosures of which are incorporated herein by reference in their entireties for all purposes.

What is claimed is:

1. A bulk solid consisting essentially of a metal hydride of the formula (I):

$$M^1(M^2)_zH_xR_y \qquad (I)$$

wherein
M$^1$ is a first metal selected from titanium, vanadium, chromium, manganese, iron, cobalt, nickel, and copper;
M$^2$ is one or more additional metals that have a total content of z;
R, if present, is an organic group;
x is about 0.5 to about 4.5; and
y is 0 to about 0.5, and
z is 0 to about 0.2;
wherein
(a) when M$^1$ is vanadium, x is at least 2.4,
(b) when M$^1$ is copper, x is at least 1.0,
(c) when M$^1$ is titanium, x is at least 2.4, and
(d) when M$^1$ is nickel, x is at least 1.6; and wherein
(i) R, when present, is bound to the metal center via a carbon atom in the R group;
(ii) the metal hydride is stable as a bulk solid at room temperature; and
(iii) the metal hydride is capable of absorbing and reversibly releasing hydrogen.

2. The bulk solid of claim 1, wherein the metal hydride is a compound of formula (IA):

$$M^1H_xR_y \qquad (IA)$$

wherein:
M$^1$ is selected from titanium, vanadium, chromium, manganese, iron, cobalt, nickel, and copper;
R, if present, is an organic group;
x is about 0.5 to about 3.6; and
y is 0 to about 0.5.

3. The bulk solid according to claim 1, wherein the metal hydride is selected from the group consisting of TiH$_a$, VH$_b$, CrH$_c$, CrH$_d$, MnH$_e$, FeH$_f$, CoH$_g$, NiH$_h$ and CuH$_i$,
wherein:
each of a, b, and c is independently from 2.4 to about 3.6;
each of d, e, f, g, and h is independently from 1.6 to about 2.4;
i is 1.0 to about 1.2; and
the metal hydride optionally contains one or more organic groups.

4. The bulk solid according to claim 3, wherein the metal hydride is selected from the group consisting of TiH$_a$, VH$_b$, CrH$_c$, CrH$_d$, MnH$_e$, FeH$_f$, CoH$_g$, NiH$_h$ and CuH$_i$,
wherein:
each of a, b, and c is independently from about 2.7 to about 3.3;

each of d, e, f, g, and h is independently from about 1.8 to about 2.2; and
i is 1.0 to about 1.1.

5. The bulk solid according to claim 1, wherein the metal hydride is selected from TiH$_{(a-y)}$R$_y$, VH$_{(b-y)}$R$_y$, CrH$_{(c-y)}$R$_y$, CrH$_{(d-y)}$R$_y$, MnH$_{(e-y)}$R$_y$, FeH$_{(f-y)}$R$_y$, CoH$_{(g-y)}$R$_y$, NiH$_{(h-y)}$R$_y$ and CuH$_{(i-y)}$R$_y$,
wherein:
each of a, b, and c is independently from 2.4 to about 3.6;
each of d, e, f, g, and h is independently from 1.6 to about 2.4;
i is 1.0 to about 1.2;
each occurrence of R, if present, is independently, an organic group; and
each occurrence of y is, independently, 0 to about 0.5.

6. The bulk solid according to claim 5,
wherein
each of a, b, and c is independently from about 2.7 to about 3.3;
each of d, e, f, g, and h is independently from about 1.7 to about 2.2; and
i is 1.0 to about 1.1.

7. The bulk solid of claim 1, wherein the metal hydride is a compound of the formula (D), (E), (F), (G) or (H):

$$VH_x^aR_y \qquad \text{(Formula D)}$$
$$VH_x^bR_y \qquad \text{(Formula E)}$$
$$TiH_x^cR_y \qquad \text{(Formula F)}$$
$$MnH_x^dR_y \qquad \text{(Formula G)}$$
$$FeH_x^eR_y \qquad \text{(Formula H)}$$

wherein
each occurrence of R, when present, independently is an organic group,
x$^a$ is about 3.5 to about 4.5;
x$^b$ and x$^c$ are each, independently, about 2.5 to about 3.5;
x$^d$ are x$^e$ each, independently, about 1.5 to about 2.5; and
y is 0 to about 0.5.

8. The bulk solid according to claim 1, wherein: (i) y is 0 to about 0.22; (ii) y is 0 to 0.2; or (iii) y is 0.

9. The bulk solid according to claim 1, wherein the metal hydride is MnH$_{(e-y)}$(mesityl)$_y$, MnH$_{(e-y)}$(neopentyl)$_y$, MnH$_{(e-y)}$(CH$_2$Si(CH$_3$)$_3$)$_y$, or MnH$_{(e-y)}$(CH(Si(CH$_3$)$_3$)$_2$)$_y$,
wherein:
e is about 1.7 to about 2.2; and
y is 0 to about 0.5.

10. The bulk solid according to claim 1, wherein the organic group, when present, is selected from bis(trimethylsilyl)methyl, trimethylsilylmethyl, mesityl, allyl, 1,3-dimethyl allyl, benzyl, neopentyl, phenyl, and combinations thereof.

11. The bulk solid according to claim 1, further comprising one or more H$_2$ molecules coordinated to a metal center in the metal hydride.

12. The bulk solid according to claim 11, wherein the interaction between the H$_2$ molecule(s) and a metal center in the metal hydride is a Kubas interaction.

13. A metal hydride storage material comprising a bulk solid of claim 1, the material having sufficient microporosity to permit (i) H$_2$ to diffuse in and out of the material and the active binding sites of the metal hydride, (ii) the metal to coordinate with H$_2$ via a Kubas interaction, and (iii) absorption of H$_2$ in an amount of about 2.0% to about 12.0% (based upon 100% total weight of the metal hydride without hydrogen stored in it).

14. A process for preparing a bulk solid according to claim 1 comprising:
(i) hydrogenating an alkyl transition metal compound; and
(ii) applying a vacuum to the product of step (i); and, optionally:
(iii) hydrogenating the product obtained in step (ii); and
(iv) applying a vacuum to the product of step (iii).

15. The process according to claim 14, wherein the alkyl transition metal compound has the formula $M^1R$, $M^1R_2$, $M^1R_3$ or $M^1R_4$, wherein:
$M^1$ is selected from titanium, vanadium, chromium, manganese, iron, cobalt, nickel, and copper; and
each R group is, independently, selected from alkyl, silylated alkyl, alkenyl, arylalkyl and aryl.

16. The process according to claim 15, wherein each R group in the alkyl transition metal compound is an alkyl group.

17. The process according to claim 15, wherein step (i) is conducted in an organic solvent.

18. The process of claim 14, where step (i) further comprises isolating the product of step (i) prior to step (ii).

19. A bulk solid, prepared by the process of claim 14.

20. A method of storing hydrogen comprising:
(i) providing a bulk solid according to claim 1;
(ii) adding hydrogen to the bulk solid; and
(iii) allowing the hydrogen to coordinate to the bulk solid.

21. The method of claim 20, further comprising releasing the hydrogen from the bulk solid by reducing the pressure of the hydrogen.

22. A hydrogen storage system comprising a storage system and a bulk solid according to claim 1 within the storage system.

23. A battery or fuel cell comprising a bulk solid according to claim 1.

24. The battery or fuel cell according to claim 22, wherein (i) the metal hydride is a compound of the formula $VH_x^aR_y$, wherein R, if present, is an organic group, $x^a$ is about 3.5 to about 4.5; and y is 0 to about 0.5, or (ii) the metal hydride is a compound of the formula $MnH_x^aR_y$, wherein R, if present, is an organic group, $x^a$ is about 1.5 to about 2.5, and y is 0 to about 0.5.

25. The bulk solid of claim 1, wherein the metal hydride contains one or more organic groups up to a total content of 0.5 moles per mole of metal.

* * * * *